United States Patent
Lee et al.

(10) Patent No.: US 12,438,661 B2
(45) Date of Patent: Oct. 7, 2025

(54) ELECTRONIC DEVICE PERFORMING COMMUNICATION USING BANDWIDTH PART, NETWORK, AND METHOD FOR OPERATING THE SAME

(71) Applicant: SAMSUNG ELECTRONICS CO., LTD., Suwon-si (KR)

(72) Inventors: Kyunghoon Lee, Suwon-si (KR); Hyejeong Kim, Suwon-si (KR); Moongyo Bae, Suwon-si (KR); Soomin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 427 days.

(21) Appl. No.: 17/966,824

(22) Filed: Oct. 15, 2022

(65) Prior Publication Data

US 2023/0124671 A1    Apr. 20, 2023

Related U.S. Application Data

(63) Continuation of application No. PCT/KR2022/015596, filed on Oct. 14, 2022.

(30) Foreign Application Priority Data

Oct. 15, 2021  (KR) .................. 10-2021-0137363

(51) Int. Cl.
*H04W 72/04* (2023.01)
*H04L 5/00* (2006.01)
(Continued)

(52) U.S. Cl.
CPC .......... *H04L 5/0048* (2013.01); *H04W 36/06* (2013.01); *H04W 72/0453* (2013.01); *H04W 72/23* (2023.01); *H04W 76/27* (2018.02)

(58) Field of Classification Search
CPC .............. H04L 5/0048; H04W 36/06; H04W 72/0453; H04W 72/23; H04W 76/27
See application file for complete search history.

(56) References Cited

U.S. PATENT DOCUMENTS 11,388,585 B2      7/2022  Kim et al.
2019/0104543 A1*   4/2019  Park ................... H04W 74/006
(Continued)

FOREIGN PATENT DOCUMENTS

EP      3823413       5/2021
JP      2021518060    7/2021
(Continued)

OTHER PUBLICATIONS

Extended European Search Report dated Oct. 18, 2024 issued in European Patent Application No. 22881403.4.
(Continued)

*Primary Examiner* — Fahmida S Chowdhury
(74) *Attorney, Agent, or Firm* — NIXON & VANDERHYE P.C.

(57) ABSTRACT

According to various embodiments, an electronic device comprises at least one processor. The at least one processor may be configured to: receive, from a network, a radio resource control (RRC) reconfiguration message including information about at least one bandwidth part (BWP) available to the electronic device, perform communication with the network using a first BWP among the at least one BWP, control the electronic device to transmit, to the network, a message requesting to change a BWP being used by the electronic device, based on identifying an event set for a change in BWP, receive, from the network, a downlink control indicator (DCI) indicating a change from the first BWP to a second BWP included in the at least one BWP, and
(Continued)

perform communication with the network using the second BWP, based on the reception of the DCI.

18 Claims, 43 Drawing Sheets

(51) Int. Cl.
*H04W 36/06* (2009.01)
*H04W 72/0453* (2023.01)
*H04W 72/23* (2023.01)
*H04W 76/27* (2018.01)

(56) References Cited

U.S. PATENT DOCUMENTS

| | | | |
|---|---|---|---|
| 2019/0132109 A1* | 5/2019 | Zhou | H04W 74/0841 |
| 2019/0222404 A1* | 7/2019 | Ang | H04L 5/0041 |
| 2019/0261405 A1* | 8/2019 | Ang | H04W 72/1263 |
| 2019/0281504 A1* | 9/2019 | Su | H04W 76/28 |
| 2019/0296882 A1* | 9/2019 | Li | H04W 28/0268 |
| 2019/0313386 A1* | 10/2019 | Hwang | H04L 5/0094 |
| 2019/0342843 A1 | 11/2019 | Raghavan et al. | |
| 2019/0342907 A1* | 11/2019 | Huang | H04W 72/23 |
| 2019/0357262 A1* | 11/2019 | Cirik | H04W 76/27 |
| 2020/0100099 A1* | 3/2020 | Tenny | H04W 8/24 |
| 2020/0162207 A1* | 5/2020 | Hwang | H04L 1/1893 |
| 2020/0245233 A1* | 7/2020 | Qian | H04W 48/18 |
| 2020/0351837 A1* | 11/2020 | Hwang | H04L 5/0078 |
| 2021/0014794 A1 | 1/2021 | Jiang et al. | |
| 2021/0105731 A1* | 4/2021 | Lin | H04W 72/23 |
| 2021/0135927 A1* | 5/2021 | Yang | H04L 41/0654 |
| 2021/0227517 A1* | 7/2021 | Yi | H04W 72/23 |
| 2021/0250754 A1 | 8/2021 | Kim et al. | |
| 2021/0297959 A1* | 9/2021 | Zhou | H04W 72/0453 |
| 2021/0306984 A1 | 9/2021 | Lee et al. | |
| 2021/0345389 A1* | 11/2021 | Fakoorian | H04L 5/0096 |
| 2022/0030609 A1* | 1/2022 | Huang | H04W 52/0219 |
| 2022/0232534 A1* | 7/2022 | He | H04W 72/0453 |
| 2023/0105766 A1* | 4/2023 | Wang | H04L 5/0055 370/329 |
| 2023/0269722 A1* | 8/2023 | Xu | H04L 1/1822 370/329 |
| 2023/0276416 A1* | 8/2023 | Lai | H04W 72/0453 370/329 |
| 2023/0396403 A1* | 12/2023 | Xu | H04L 5/0091 |

FOREIGN PATENT DOCUMENTS

| | | |
|---|---|---|
| KR | 10-2019-0038300 | 4/2019 |
| KR | 10-2110190 | 5/2020 |
| KR | 10-2020-0131892 | 11/2020 |
| WO | 2021/126798 | 6/2021 |
| WO | 2021/158154 | 8/2021 |

OTHER PUBLICATIONS

Lin et al, "A Primer on Bandwidth Parts in 5G New Radio", Apr. 2, 2020, 7 pages.

Search Report and Written Opinion dated Jan. 19, 2023 issued in International Patent Application No. PCT/KR2022/015596.

* cited by examiner

ELECTRONIC DEVICE PERFORMING COMMUNICATION USING BANDWIDTH PART, NETWORK, AND METHOD FOR OPERATING THE SAME

CROSS-REFERENCE TO RELATED APPLICATIONS

This application is a continuation of International Application No. PCT/KR2022/015596 designating the United States, filed on Oct. 14, 2022, in the Korean Intellectual Property Receiving Office and claiming priority to Korean Patent Application No. 10-2021-0137363, filed on Oct. 15, 2021, in the Korean Intellectual Property Office, the disclosures of which are incorporated by reference herein in their entireties.

BACKGROUND

Field

The disclosure relates to an electronic device performing communication using a bandwidth part, a network, and a method for operating the same.

Description of Related Art 5G communication uses a higher frequency band than long-term evolution (LTE) communication, and the size of a bandwidth (BW) through which the user equipment (UE) transmits and receives data may be large. There is an advantage that data rate (throughput) increases as the bandwidth increases. However, unlike the base station, the UE requires an additional signal processing and RF module for processing a large bandwidth or may thus be subject to additional issues. Thus, to address such issues, 5G has adopted the concept of bandwidth part (BWP). BWP may refer, for example, to a portion of a bandwidth and may include a set of one or more resource blocks (RBs). In general, BWP may refer, for example, to a bandwidth, used by the UE, which is smaller in size than the total bandwidth supported by the base station. When the BWP is configured, the UE may monitor only the configured BWP without monitoring the entire bandwidth, thereby reducing power consumption.

The network may perform an operation for changing the BWP used by the UE. In one example, the network may change the BWP used by a specific UE through an RRC reconfiguration message. In this case, the network may designate and transmit the BWP-Id to be used for firstActiveDownlinkBWP-Id and firstActiveUplinkBWP-Id in the RRC reconfiguration message. The UE may change the BWP to the BWP-Id included in the message. In another example, the network may change the BWP used by a specific UE through a downlink control indicator (DCI). The network may designate and transmit the BWP-Id to be used among the BWP-Id's included in the set BWP configurations set through the RRC reconfiguration message. The UE may change the BWP to the BWP-Id included in the DCI.

As described above, the BWP used by the UE may be changed by the base station. For example, to enhance the power consumption of the UE, a BWP of 20 MHz of the total bandwidth of 100 MHz may be allocated to the UE. Alternatively, when a plurality of UEs are connected to one base station, an operation for reducing the BWP of the UEs may be performed to reduce the burden on the base station. However, the above-mentioned BWP adjustment of the BWP is carried out by the network, and there is no disclosed scheme in which the UE requests the network to adjust the BWP. Thus, it is impossible to perform BWP adjustment in real-time according to the state of the UE.

SUMMARY

Embodiments of the disclosure provide an electronic device and a method for operating the same that may request the network to change the BWP and receive a DCI corresponding thereto, thereby changing the used BWP.

Embodiments of the disclosure provide a network and a method for operating the same that may receive a change in BWP from an electronic device and transmit a DCI including information for the changed BWP, corresponding thereto, thereby changing the BWP.

According to various example embodiments, an electronic device comprises at least one processor. The at least one processor may be configured to: receive, from a network, a radio resource control (RRC) reconfiguration message including information about at least one bandwidth part (BWP) available to the electronic device, perform communication with the network using a first BWP among the at least one BWP, control the electronic device to transmit, to the network, a message requesting to change a BWP being used by the electronic device, based on identifying an event set for a change in BWP, receive, from the network, a downlink control indicator (DCI) indicating a change from the first BWP to a second BWP included in the at least one BWP, and control the electronic device to perform communication with the network using the second BWP, based on the reception of the DCI.

According to various example embodiments, a method for operating an electronic device may comprise: receiving, from a network, a radio resource control (RRC) reconfiguration message including information about at least one bandwidth part (BWP) available to the electronic device, performing communication with the network using a first BWP among the at least one BWP, transmitting, to the network, a message requesting to change a BWP being used by the electronic device, based on identifying an event set for a change in BWP, receiving, from the network, a downlink control indicator (DCI) indicating a change from the first BWP to a second BWP included in the at least one BWP, and performing communication with the network using the second BWP, based on the reception of the DCI.

According to various example embodiments, a method for operating a network may comprise: transmitting, to an electronic device, a radio resource control (RRC) reconfiguration message including information about at least one bandwidth part (BWP) available to the electronic device, performing communication with the electronic device using a first BWP among the at least one BWP, receiving, from the electronic device, a message requesting to change a BWP being used by the electronic device, based on identifying an event set for a change in BWP, transmitting, to the electronic device, a downlink control indicator (DCI) indicating a change from the first BWP to a second BWP included in the at least one BWP, and performing communication with the electronic device using the second BWP.

According to various example embodiments, an electronic device and a method for operating the same may request the network to change the BWP and receive a DCI corresponding thereto, thereby changing the used BWP. According to various example embodiments, a network and a method for operating the same may receive a change in BWP from an electronic device and transmit a DCI including information for the changed BWP, corresponding thereto, thereby changing the BWP.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
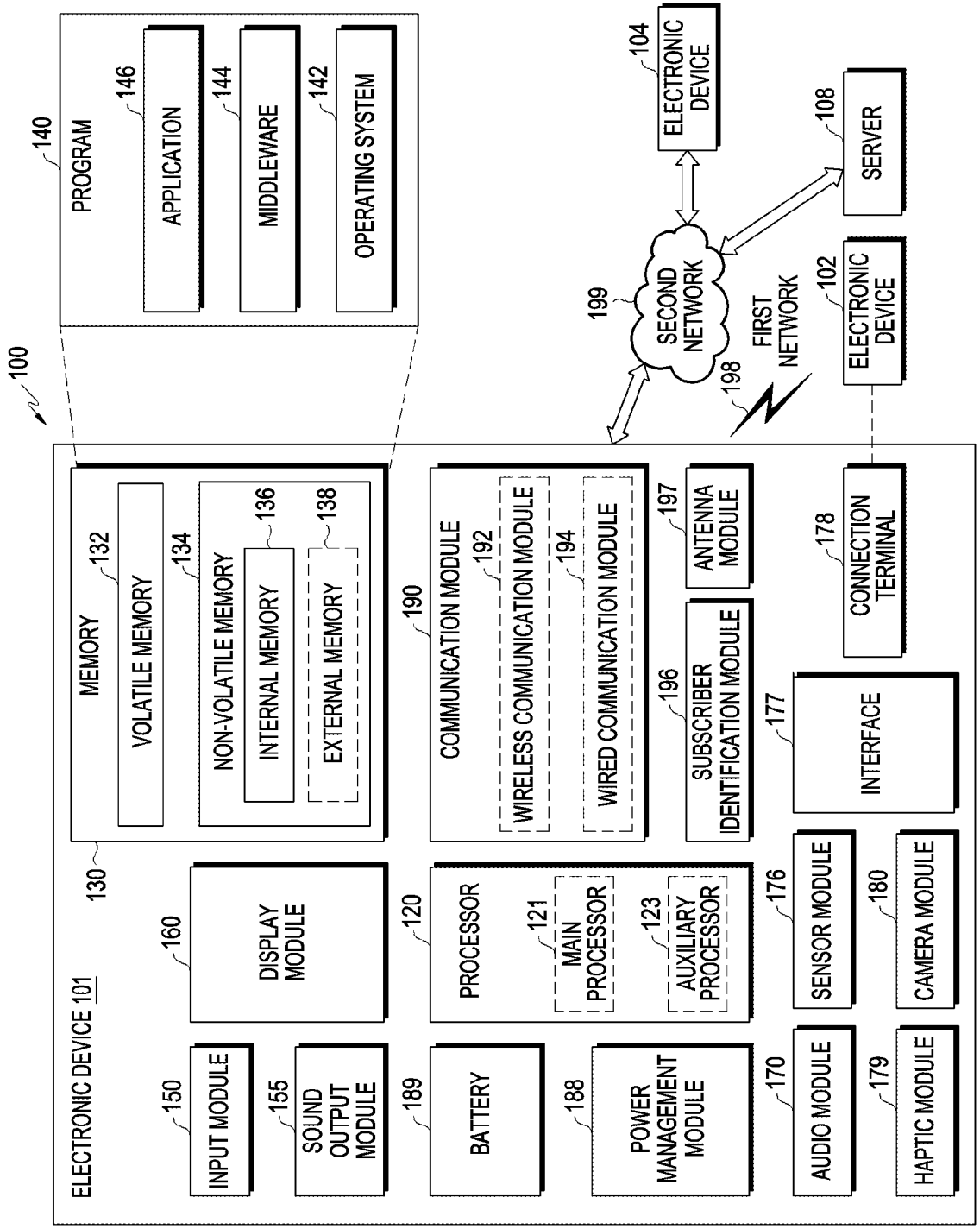
FIG. 1 is a diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)). According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
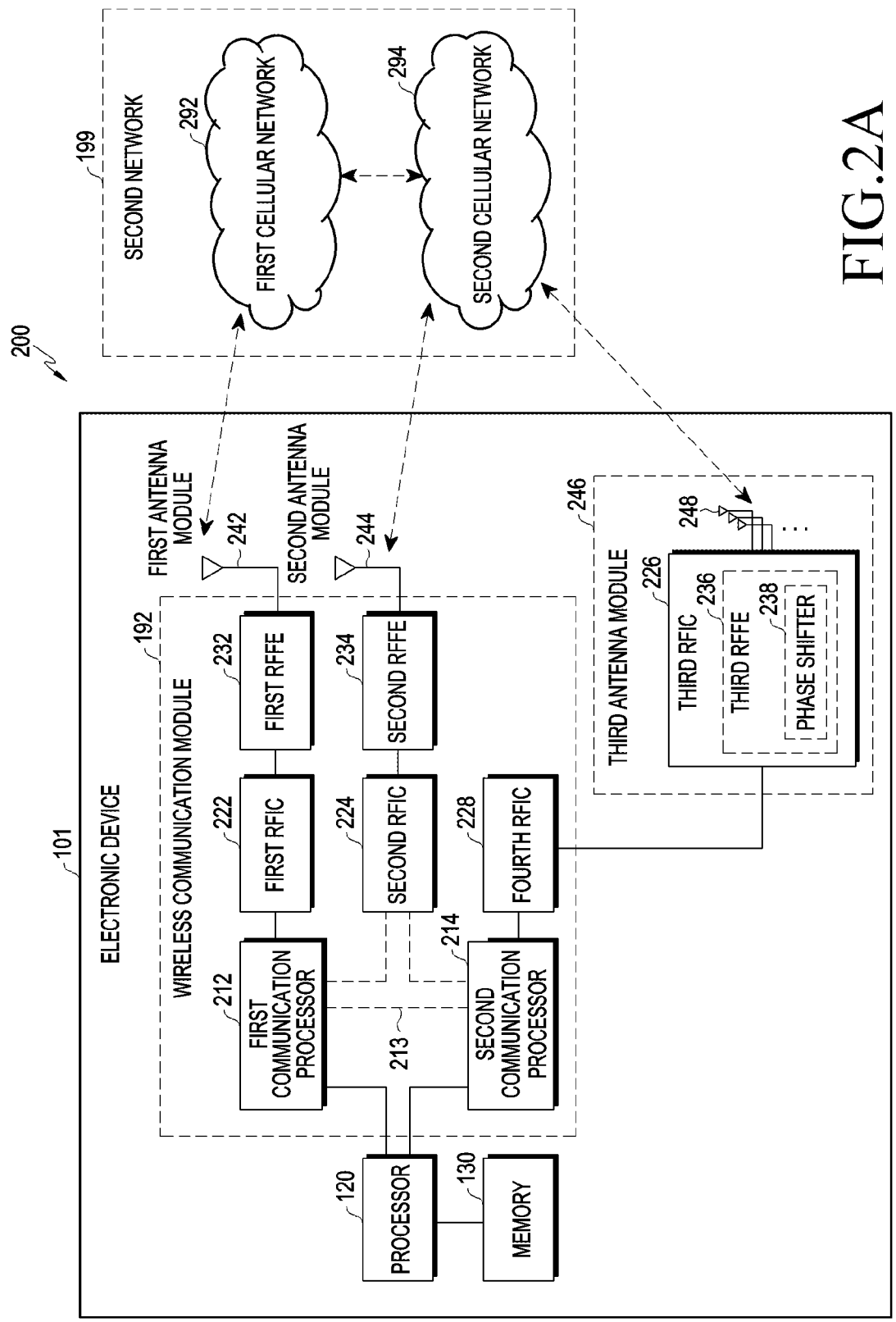
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., transceiver, universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
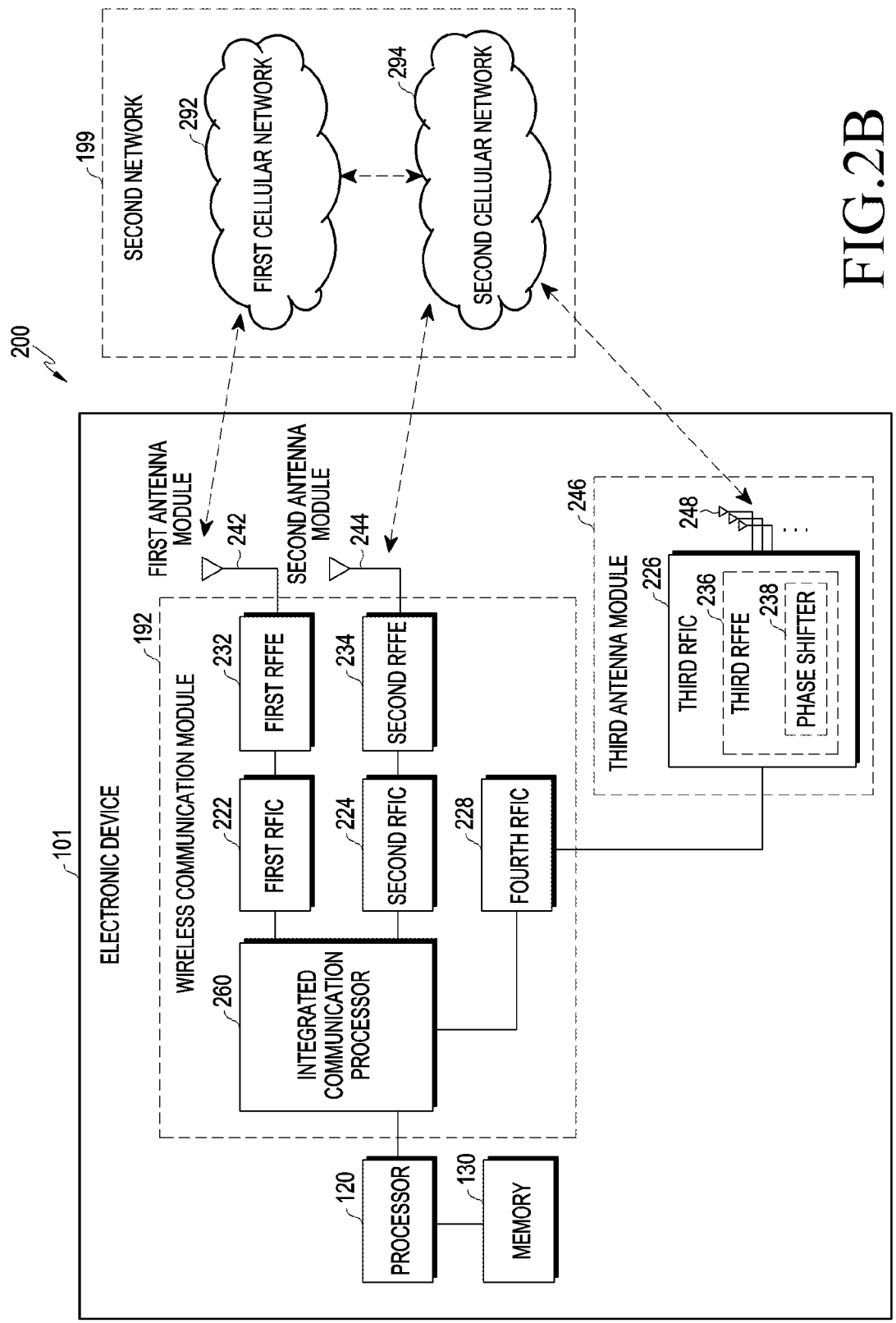
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor (e.g., including processing circuitry) 260 may support all of the functions for communication with the first cellular network 292 and the second cellular network 294. Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multiband RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
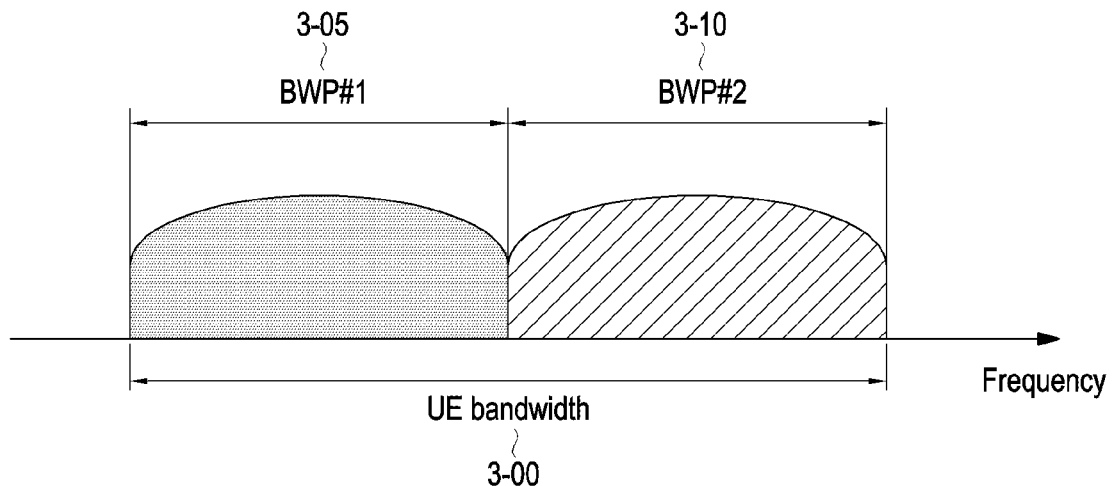
FIG. 3 is a diagram illustrating an example of a BWP configuration in a wireless communication system according to various embodiments.

FIG. 3 is a diagram illustrating an example of a BWP configuration in a wireless communication system according to various embodiments.

FIG. 3 is a view illustrating an example of a configuration for a BWP in a 5G communication system. FIG. 3 illustrates an example in which the UE bandwidth 3-00 of FIG. 3 is configured into two BWPs, BWP #1 3-05 and BWP #2 3-10. The base station may configure one or more bandwidth parts in the electronic device 101 and, for each bandwidth part, information as illustrated in Table 1 below may be configured.

TABLE 1

| | |
|---|---|
| Configuration information 1 | Bandwidth (number of PRBs of bandwidth part) of bandwidth part |
| Configuration information 2 | Frequency position of bandwidth part (as such information, reference point-to-offset value. The reference point may be, e.g., the center frequency of carrier, sync signal, or sync signal raster) |
| Configuration information 3 | Numerology of bandwidth part (e.g., subcarrier spacing, cyclic prefix (CP), etc.) |
| Others | |

In addition to the configuration information described in Table 1, various parameters related to the BWP may be configured in the electronic device 101. The above-described information may be delivered from the network to the electronic device 101 through higher layer signaling, e.g., RRC signaling. At least one of the one or more BWPs configured may be activated. Whether to activate the configured BWP may be transferred from the base station to the UE semi-statically through RRC signaling or dynamically through a medium access control (MAC) control element (CE) or DCI.

For example, the electronic device 101 may identify the initial BWP, first configured, from the network through a system information broadcasting (SIB) message, before accessing the network. The electronic device 101 may perform a random access process according to the initial BWP. Thereafter, the electronic device 101 may complete an initial attach or initial registration and perform communication using the first activated BWP (firstActiveDownlinkBWP) included in the RRC reconfiguration message (e.g., the RRC reconfiguration message of 3rd generation partnership project (3GPP) technical specification (TS) 38.331) from the network. For example, Table 2 shows an example BWP configuration according to various embodiments.

TABLE 2

```
spCellConfigDedicated
   initialDownlinkBWP
   downlinkBWP-ToAddModList (max 4)
      bwp-Common
         CORESET (max 1)
         SaerchSpace (max 4)
      bwp-Dedicated
         CORESET (max 3)
         SaerchSpace (max 10)
   firstActiveDownlinkBWP-id
   defaultDownlinkBWP-id
```

The first activated BWP (firstActiveDownlinkBWP) may be specified as an id in the RRC reconfiguration message. 0 may indicate the initial BWP, and any one of 1 to 4 may indicate one of the BWP included in the downlnkBWP-ToAddModList. The electronic device 101 may generally transmit/receive data packets to/from the network according to the first activated BWP and, if the BWP inactivity timer expires, may use a default BWP (defaultDownlinkBWP). The default BWP may be specified as an id in the RRC reconfiguration message. As described above, the electronic device 101 may be configured with a plurality of BWPs through the RRC message from the network, but the maximum number of BWPs available when the electronic device 101 actually performs communication is four, and the electronic device 101 may not simultaneously use several BWPs but may select and use only one BWP for each downlink (DL) and each uplink (UL). Meanwhile, although Table 2 reflects only parameters for downlink for convenience, it will be appreciated by one of ordinary skill in the art that parameters are configured for uplink as well.

Figure 4:
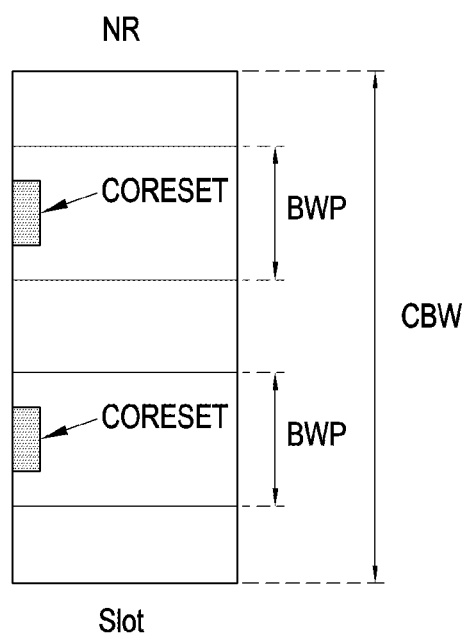
FIG. 4 is a diagram illustrating a structure of a BWP according to various embodiments.
Figure 5:
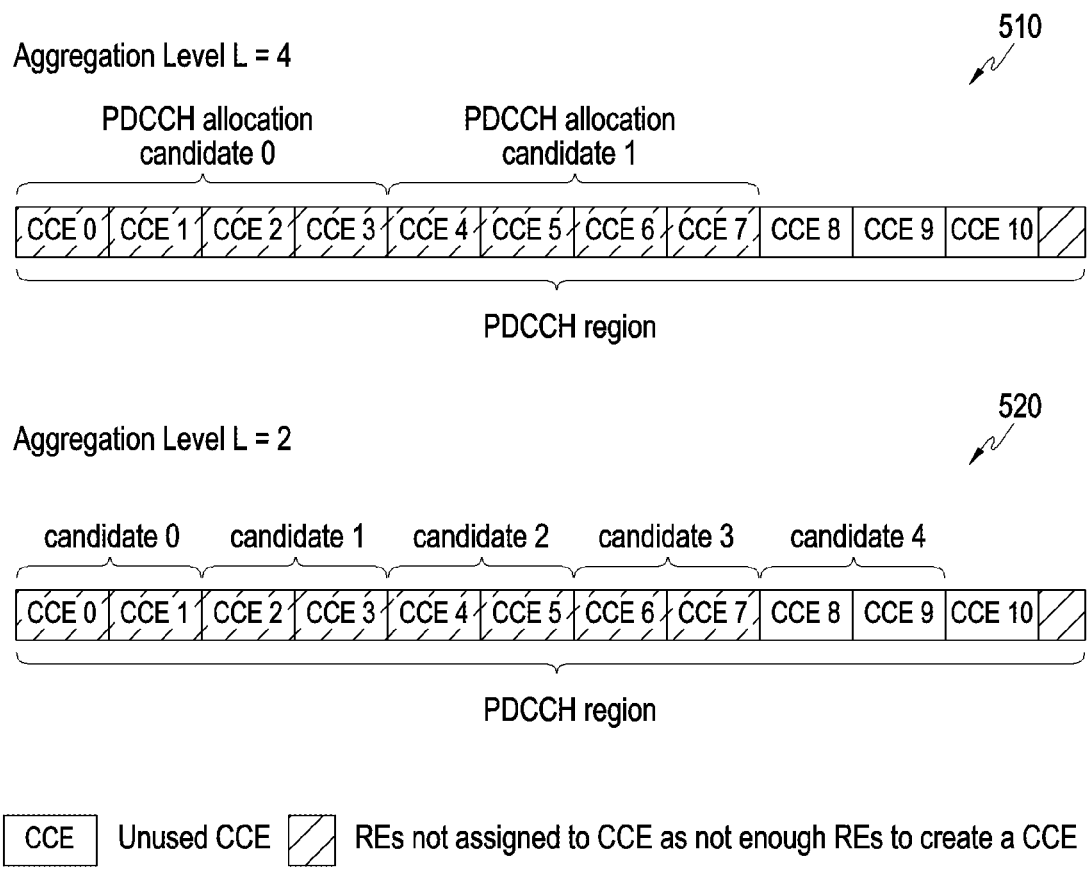
FIG. 5 is a diagram illustrating an aggregation level according to various embodiments.

FIG. 4 is a diagram illustrating an example structure of a BWP according to various embodiments. The embodiment of FIG. 4 is described with reference to FIG. 5. FIG. 5 is a diagram illustrating an aggregation level according to various embodiments.

Referring to FIG. 4, one BWP should include at least one control resource set (CORESET) and one SearchSpace, and up to three CORESETs and 10 SearchSpace's may be matched. CORESET is a parameter defining a specific downlink physical resource used to transfer a physical downlink control channel (PDCCH) and/or DCI in NR. CORESET may perform the same role as the PDCCH area of LTE (first, second, third, and fourth OFDM symbols for each subframe). However, while the PDCCH of LTE is always set for the entire BW, the CORESET of NR may be set limitedly to a specific frequency domain, as shown in FIG. 4. The CORESET may be allocated in a multiple of 6 RBs in the frequency domain, and the length of the time domain may be defined as the duration value of ControlResourceSet in RRC signaling. The CORESET may be allocated in a multiple of 6 RBs (e.g., a multiple of 12 REs), and this is a resource element group (REG). A multiple of the REG is defined as a REG Bundle, and is set to the 'L' value in the RRC parameter. The control channel element (CCE) may be configured as a multiple of the REG, and the value indicating how many CCEs are allocated for one PDCCH transmission is referred to as an aggregation level. The aggregation level may be defined through the SearchSpace, and the same PDCCH data may be repeatedly transmitted through multiple CCEs. The electronic device 101 may increase the detection accuracy by decoding the repeatedly transmitted PDCCH data multiple times and accumulating it. For example, referring to FIG. 5, in the embodiment of 510, the aggregation level is 4, and the PDCCH data may be repeatedly transmitted with four CCEs. In the embodiment of 520, the aggregation level is 2, and the PDCCH data may be repeatedly transmitted with two CCEs.

According to various embodiments, the configuration of the CORESET may be as shown in Table 3.

TABLE 3

```
ControlResourceSet ::=       SEQUENCE {
   controlResourceSetId         ControlResourceSetId,
   frequency DomainResources    BIT STRING (SIZE (45)),
   duration                     INTEGER (1..maxCoReSetDuration),
                                //maxCoReSetDuration = 3
   cce-REG-MappingType CHOICE {
      interleaved               SEQUENCE {
         reg-BundleSize            ENUMERATED {n2, n3, n6},
         interleaverSize           ENUMERATED {n2, n3, n6},
         shiftIndex                INTEGER(0..maxNrofPhysicalResourceBlocks-1)
      },
      nonInterleaved            NULL
```

TABLE 3-continued

```
},,
precoderGranularity  ENUMERATED {sameAsREG-bundle, allContiguousRBs},
tci-StatesPDCCH           SEQUENCE(SIZE (1..maxNrofTCI-StatesPDCCH)) OF TCI-StateId
tci-PresentInDCI          ENUMERATED {enabled}              OPTIONAL
pdcch-DMRS-ScramblingID   BIT STRING (SIZE (16))            OPTIONAL
}
```

In Table 3, controlResourceSetId may refer to the ID of the CORESET and may be used as a unique value within one cell. 0 may be used for the purpose of the Common CORESET in the ServingCellConfigCommon and the master information block (MIB) and, for the UE-specific use, 1 and its successor may be used. frequencyDomainResources may be a value representing the position, where the PDCCH may be transmitted in the BWP, as a bit map with respect to the 6-RB unit. The most significant bit (MSB) may be allocated to the lowest frequency in the BWP. Duration may be the number of symbols that transmit CORESET. Cce-REG-MappingType may refer, for example, to a method in which CCEs are mapped to the REG.

According to various embodiments, the CORESET may provide information about what frequency the area where only the PDCCH is transmitted is positioned at and how many OFDM symbols it occupies, but may not indicate the OFDM symbol position where the transmission starts and the precise transmission period. The information may be defined in the SearchSpace. SearchSpace may refer, for example, to all possible areas that the electronic device 101 should monitor to detect specific PDCCH data and/or DCI in the CORESET area, and each possible position candidate group may be referred to as PDCCH candidates. There may be two types of SearchSpace's in total, such as common search space (CSS) and UE-specific search space (USS), and the RRC message may be configured as shown in Table 4.

TABLE 4

```
SearchSpace ::=                          SEQUENCE {
    searchSpaceId                            SearchSpaceId,
    controlResourceSetId                     ControlResourceSetId   OPTIONAL,-- Cond Setup Only
    monitoringSlotPeriodicity AndOffset CHOICE {
        sl1                                      NULL,
        sl2                                      INTEGER (0..1),
        sl4                                      INTEGER (0..3),
        sl5                                      INTEGER (0..4),
        sl8                                      INTEGER (0..7),
        sl10                                     INTEGER (0..9),
        sl16                                     INTEGER (0..15),
        sl20                                     INTEGER (0..19),
        sl40                                     INTEGER (0..39),
        sl80                                     INTEGER (0..79),
        sl160                                    INTEGER (0..159),
        sl320                                    INTEGER (0..319),
        sl640                                    INTEGER (0..639),
        sl1280                                   INTEGER (0..1279),
        sl2560                                   INTEGER (0..2559)
    }
    monitoringSymbols WithinSlot             BIT STRING (SIZE (14)) OPTIONAL, -- Cond Setup
    nrofCandidates                           SEQUENCE {
        aggregationLevel1                        ENUMERATED {n0, n1, n2, n3, n4, n5, n6, n8},
        aggregationLevel2                        ENUMERATED {n0, n1, n2, n3, n4, n5, n6, n8},
        aggregationLevel4                        ENUMERATED {n0, n1, n2, n3, n4, n5, n6, n8},
        aggregationLevel8                        ENUMERATED {n0, n1, n2, n3, n4, n5, n6, n8},
        aggregationLevel16                       ENUMERATED {n0, n1, n2, n3, n4, n5, n6, n8}
    } OPTIONAL, -- Cond Setup
    searchSpaceType                          CHOICE {
        common                                   SEQUENCE {
            dci-Format0-0-AndFormat1-0               SEQUENCE {
                ...
            } OPTIONAL, -- Need R
            dci-Format2-0                        SEQUENCE {
                nrofCandidates-SFI                   SEQUENCE {
                    aggregationLevel1                    ENUMERATED {n1, n2} OPTIONAL, -- Need R
                    aggregationLevel2                    ENUMERATED {n1, n2} OPTIONAL, -- Need R
                    aggregationLevel4                    ENUMERATED {n1, n2} OPTIONAL, -- Need R
                    aggregationLevel8                    ENUMERATED {n1, n2} OPTIONAL, -- Need R
                    aggregationLevel16                   ENUMERATED {n1, n2} OPTIONAL -- Need R
                },
                ...
            } OPTIONAL, -- Need R
            dci-Format2-1                        SEQUENCE {
                ...
            } OPTIONAL, -- Need R
            dci-Format2-2                        SEQUENCE {
                ...
            } OPTIONAL, -- Need R
            dci-Format2-3                        SEQUENCE {
```

TABLE 4-continued

```
    monitoringPeriodicity        ENUMERATED {n1, n2, n4, n5, n8, n10, n16, n20 }
    nrofPDCCH-Candidates         ENUMERATED {n1, n2},
    ...
  } OPTIONAL -- Need R
  },
  ue-Specific                    SEQUENCE {
    dci-Formats                  ENUMERATED {formats0-0-And-1-0, formats0-1-And-1-1},
    ...
  }
} OPTIONAL -- Cond Setup
}
```

0 of searchSpaceId may be transmitted to MIB or ServingCellConfigCommon, and other values may be used as unique values in a specific cell. Although the SearchSpace may be matched with one CORESET ID through controlResourceSetID, one CORESET may be matched with one or more SearchSpace's. monitoringSlotPeriodicty AndOffset may refer, for example, to the period of the slot for PDCCH monitoring. For example, when sl1 is received, the electronic device 101 should monitor the PDCCH every slot and, in the case of sl4, the electronic device 101 should monitor the PDCCH every 4th slot. monitoringSymbolsWithinSlot specifies, in bit map, the position that needs to be monitored for PDCCH in a predetermined slot through monitoringSlotPeriodicityAndOffset. nrofCandidates may refer, for example, to the number of PDCCH candidates per aggregation level, and searchSpaceType may be used to identify whether it is CSS or USS.

As described above, the BWP may be defined by CORESET and SearchSpace. The BWP being used with the electronic device 101 may be changed through these parameters of the network, which may be referred to as BWP switching. BWP switching may refer, for example, to the BWP-Id being changed. For example, there are an RRC-based BWP switching scheme in which the BWP is changed by an RRC reconfiguration message and a DCI-based BWP switching scheme in which the BWP is changed by a downlink control indicator (DCI). According to the RRC-based BWP switching scheme, the network may designate the changed BWP-Id in the firstActiveDownlinkBWP-Id and firstActiveUplinkBWP-Id of the RRC reconfiguration message. The electronic device 101 receiving the message may change the BWP to the designated BWP-Id. The RRC-based BWP switching scheme is a semi-static scheme, and when changing the BWP, some delay (generally within 10 ms) and signaling overhead may be induced, and thus, the RRC-based BWP switching scheme is used when fast switching is not required or for changing the BWP set. In contrast, the DCI-based BWP switching scheme may be a scheme that provides the electronic device 101 with what number of ID is desired to be used among the BWP-Id's set through the RRC message, through the BWP Indicator in the DCI, as shown in Table 5.

TABLE 5

| Value of BWP indicator field | | Bandwidth part |
|---|---|---|
| 1 bit | 2 bits | |
| 0 | 0 | First bandwidth part configured by higher layers |
| 0 | 1 | Second bandwidth part configured by higher layers |
| 1 | 0 | Third bandwidth part configured by higher layers |
| 1 | 1 | Fourth bandwidth part configured by higher layers |

The electronic device 101 receiving the DCI may change the BWP to the designated BWP-Id. The UL BWP indicator may be transferred in DCI format 0_1 (UL grant), and the DL BWP indicator may be transferred in DCI format 1_1 (DL scheduling). As compared to the RRC-based BWP switching scheme, the DCI-based BWP switching scheme takes a shorter time for BWP switching (generally within 2 ms) and has no additional signaling overhead.

Figure 6A:
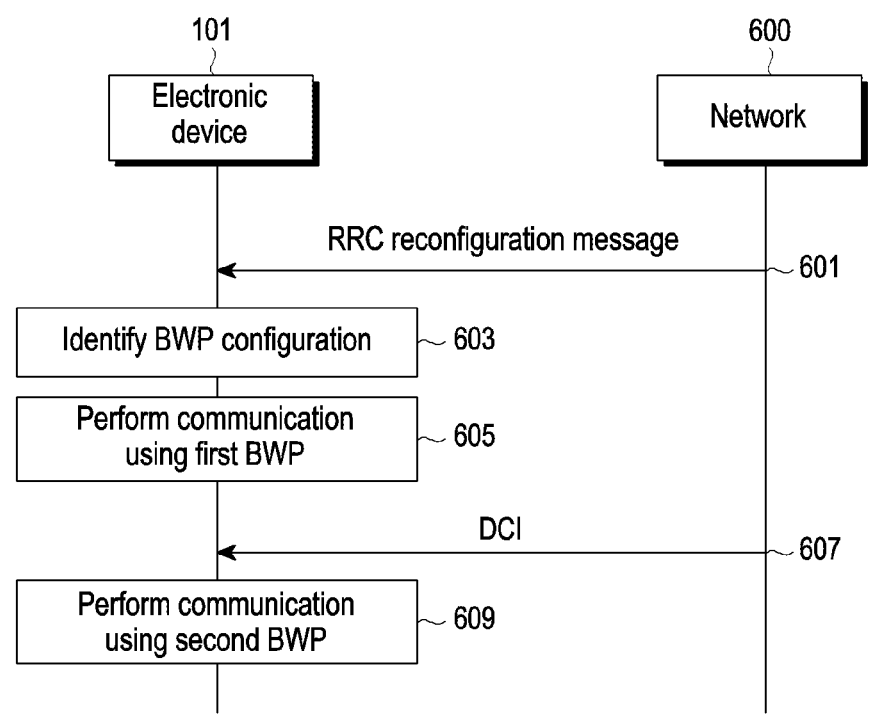
FIG. 6A is a signal flow diagram illustrating example operations of an electronic device and a network according to various embodiments.
Figure 6B:
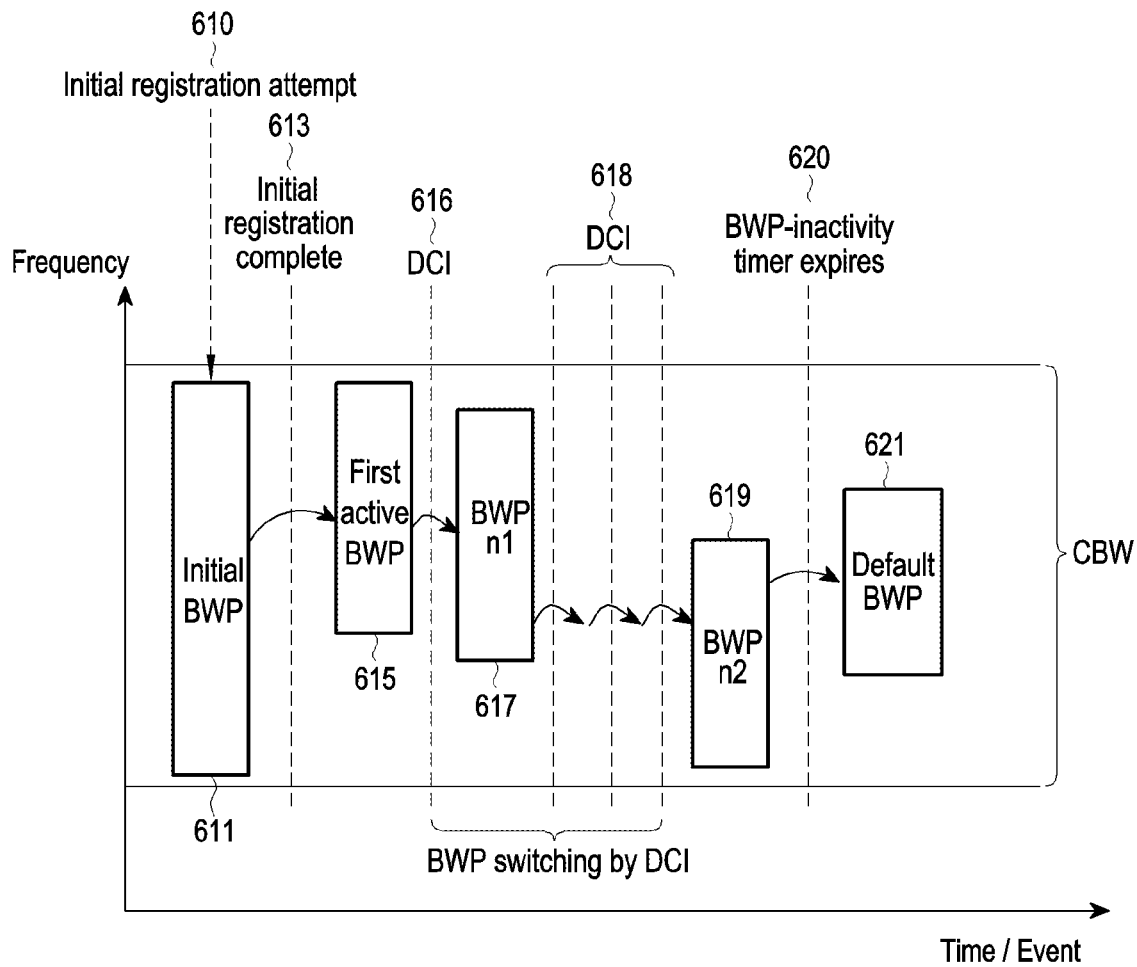
FIG. 6B is a diagram illustrating a change in BWP according to various embodiments.

FIG. 6A is a signal flow diagram illustrating example operations of an electronic device and a network according to various embodiments. The embodiment of FIG. 6A is described with reference to FIG. 6B. FIG. 6B is a diagram illustrating a change in BWP according to various embodiments.

According to various embodiments, an electronic device 101 (e.g., at least one of the processor 120, the first communication processor 212, the second communication processor 214, or the integrated communication processor 260) may receive an RRC reconfiguration message in operation 601. In operation 603, the electronic device 101 may identify a BWP configuration. The RRC reconfiguration message may include a BWP configuration, such as one shown in at least one of Tables 2 to 4, and the electronic device 101 may identify the BWP Id available to the electronic device 101 based on the BWP configuration. In operation 605, the electronic device 101 may perform communication using a first BWP among the plurality of BWPs based on the BWP configuration. For example, referring to FIG. 6B, the electronic device 101 may perform communication using the initial BWP 611, which is configured for the first time from the network through an SIB message at the time of initial registration attempt 610. As described above, the electronic device 101 may perform a random access process using the initial BWP 611 and, accordingly, the electronic device 101 may complete (613) establishment of an RRC connection with the network 600 and initial registration. At the time of initial registration completion 613, the electronic device 101 may perform communication using a first active downlink BWP (firstActiveDownlinkBWP) 615.

According to various embodiments, in operation 607, the electronic device 101 may receive a DCI from the network 600. In operation 609, the electronic device 101 may perform communication using a second BWP. For example, referring to FIG. 6B, based on reception of the DCI 616, the electronic device 101 may perform communication using BWP n1 617 designated by the DCI 616. Based on the reception of the at least one DCI 618, the electronic device 101 may perform communication using the BWP (e.g., BWP n2 619) designated by the at least one DCI 618. The above-described change in BWP may be referred to as BWP switching by DCI. Meanwhile, at the time when the BWP-inactivity timer expires (620), the electronic device 101 may perform communication using a default BWP (defaultDownlinkBWP) 621.

In another example, the electronic device 101 may change the used BWP by receiving the MAC CE from the network 600 on behalf of the DCIs 616 and 618, and it will be understood by one of ordinary skill in the art that, according to various embodiments, the reception of DCI may be replaced with MAC CE.

As described above, the electronic device 101 may change the used BWP based on the DCI received from the network 600. In the embodiment of FIG. 6A, it has been described that the network 600 transmits the DCI triggering a change in BWP even without a request from the electronic device 101. Meanwhile, according to various embodiments, the electronic device 101 may transmit a message for requesting a change in BWP to the network 600, and the network 600 may transmit the DCI triggering a change in BWP in response to the message, which is described in greater detail below with reference to FIG. 7A.

Figure 7A:
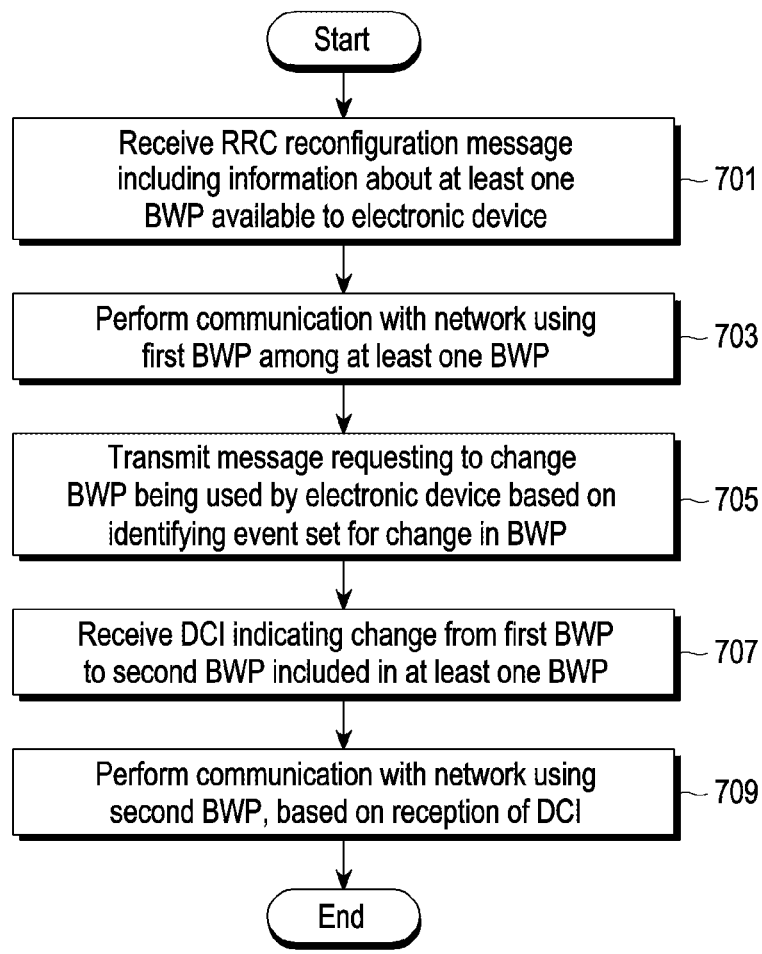
FIG. 7A is a flowchart illustrating an example method of operating an electronic device according to various embodiments.

FIG. 7A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including information for at least one BWP available to the electronic device 101 in operation 701. The information for at least one BWP available to the electronic device 101 may be represented as one of Tables 2 to 4, but is not limited thereto. The at least one available BWP may be identified with, e.g., BWP Id's. The at least one available BWP may refer, for example, to at least one BWP that may be changed by the DCI included in, e.g., downlinkBWP-ToAddModList and/or uplinkBWP-ToAddModList, but is not limited. For example, the at least one available BWP may include at least one of initialDownlinkBWP, firstActiveDownlinkBWP, defaultDownlinkBWP, or initialUplinkBWP, and the type of BWP is not limited. In operation 703, the electronic device 101 may perform communication with the network 600 using the first BWP among at least one BWP. In one example, performing communication using the BWP may refer, for example, to monitoring at least one resource block (RB) included in the DL BWP and/or decoding for at least one RB (in other words, reception of PDSCH, PDCCH, and/or CSI-RS) and/or may refer, for example, to outside the DL BWP, it not being expected to receive the PDSCH, PDCCH, and/or CSI-RS. In one example, performing communication using the BWP may also refer, for example, to transmission of PUSCH, PUCCH, and/or SRS using at least one RB included in the UL BWP. Use of the BWP may include use of the UL BWP and/or use of the DL BWP. Here, the first BWP may be any one of the initial BWP, the first active BWP (firstActiveDownlinkBWP), existing BWP configured based on reception of the DCI (e.g., BWP switched by DCI), or the default BWP (defaultDownlinkBWP), and the type of the BWP is not limited.

According to various embodiments, in operation 705, the electronic device 101 may transmit a message requesting to change the BWP being used by the electronic device 101 to the network 600 based on identifying an event configured for a BWP change. For example, the event may include at least one of over-temperature, shortage of battery, execution of a designated type of application, establishment of a designated type of PDU session, or identifying the generation of traffic meeting a designated condition, and each event is described below. Meanwhile, the event configured for the BWP change is not limited as long as a more appropriate BWP than the BWP being currently used is required, as well as including the opposite situation from the above-listed events, e.g., releasing over-temperature. The electronic device 101 may request the network 600 to change the BWP using a UEAssistanceInformation message. A change in BWP may element be requested using the information (IE) included in the UEAssistanceInformation message, and a request for changing the BWP using the IE is described below. The network 600 may transmit a DCI triggering a change in BWP to the electronic device 101 based on reception of the message from the electronic device 101. The network 600 may transmit, to the electronic device 101, the DCI including the information (e.g., BWP Id) for identifying the second BWP among the at least one BWP based on the BWP configuration while maintaining the BWP configuration based on the transmitted RRC reconfiguration message. In operation 707, the electronic device 101 may receive the DCI indicating a change from the first BWP to the second BWP included in the at least one BWP. The electronic device 101 may identify the change to the second BWP included in the at least one BWP based on the BWP configuration while maintaining the BWP configuration based on the RRC reconfiguration message. In operation 709, the electronic device 101 may perform communication with the network 600 using the second BWP based on reception of the DCI. The electronic device 101 may perform communication with the network 600 using the second BWP based on information (e.g., BWP Id) for identifying the second BWP included in the DCI. As described above, the electronic device 101 may actively request the network 600 to change the BWP.

Figure 7B:
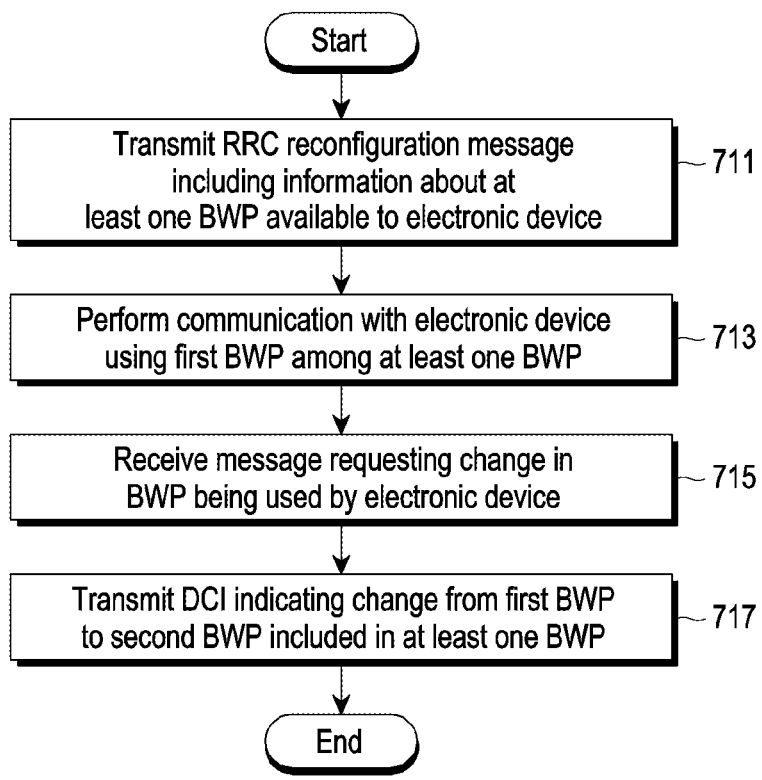
FIG. 7B is a flowchart illustrating an example method of operating a network according to various embodiments.

FIG. 7B is a flowchart illustrating an example method of operating a network according to various embodiments.

According to various embodiments, in operation 711, the network 600 may transmit an RRC reconfiguration message including information for at least one BWP available to the electronic device 101. The information about the at least one BWP available to the electronic device 101 may be represented as at least one of, e.g., Tables 2 to 4, and the at least one BWP may be identified with, e.g., BWP Id's. In operation 713, the network 600 may perform communication with the electronic device 101 using the first BWP among the at least one BWP. As described in connection with FIG. 7A, the type of the first BWP is not limited.

According to various embodiments, in operation 715, the network 600 may receive the message requesting to change the BWP being used by the electronic device 101. For example, as described in connection with FIG. 7A, the electronic device 101 may transmit a message to the network 600 based on detection of an event. As described above, the message from the electronic device 101 may be a UEAssistanceInformation message. The network 600 may identify the BWP which is to be changed based on the IE included in the UEAssistanceInformation message, which is described below. In operation 717, the network 600 may transmit a DCI instructing a change from the first BWP to the second BWP included in the at least one BWP to the electronic device 101. Thereafter, the network 600 may perform communication with the electronic device 101 using the second BWP.

Figure 8A:
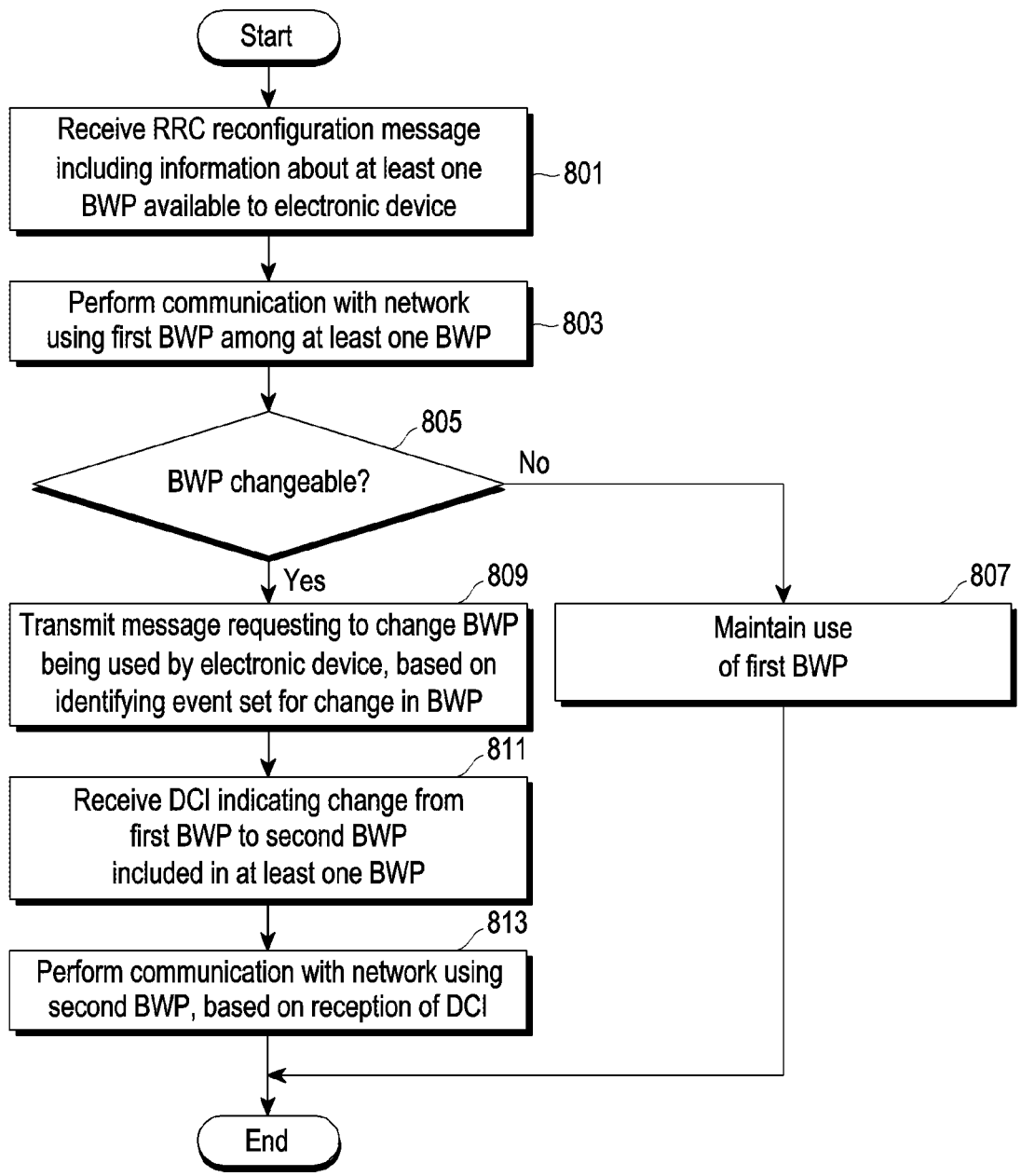
FIG. 8A is a flowchart illustrating an example method of operating an electronic device according to various embodiments.

FIG. 8A is a flowchart illustrating an example method of operating an electronic device according to various embodiments.

According to various embodiments, the electronic device 101 (e.g., at least one of the processor 120, the first communication processor 212, the second communication processor 214, or the integrated communication processor 260) may receive an RRC reconfiguration message including information for at least one BWP available to the electronic device 101 in operation 801. As described in connection with FIG. 7A, the at least one available BWP may refer, for example, to at least one BWP that may be changed by the DCI included in, e.g., downlinkBWP-ToAddModList and/or uplinkBWP-ToAddModList, but is not limited. In operation 803, the electronic device 101 may perform communication with the network 600 using the first BWP among at least one BWP.

According to various embodiments, in operation 805, the electronic device 101 may identify whether the BWP is changeable. For example, the electronic device 101 may identify available BWPs based on the RRC reconfiguration message from the network 600. As up to, e.g., four available BWPs may be configured for one BWP, the network 600 may allocate four available BWPs for a specific UE but, in some cases, three, two, or one available BWP may be allocated. The electronic device 101 may identify the number of BWPs currently available based on the RRC reconfiguration message from the network 600. For example, the electronic device 101 may identify the number of available DL BWPs in the DL BWP based on downlinkBWP-ToAddModList in spCellConfigDedicated and/or identify the number of available UL BWPs in the UL BWP based on uplinkBWP-ToAddModList, but information referenced to identify the number of available BWPs is not limited. If the number of available BWPs is one, the electronic device 101 may determine that it is impossible to change the BWP. If the number of available BWPs is two, the electronic device 101 may determine that it is possible to change the BWP. If it is identified that it is impossible to change the BWP (No in 805), the electronic device 101 may maintain use of the first BWP in operation 807. For example, since the number of BWPs available to the electronic device 101 is one, the electronic device 101 may maintain use of the first BWP regardless of whether the event is detected. For example, if it is identified that it is impossible to change the BWP as the event is detected, the electronic device 101 may refrain from performing the operation for changing the BWP. If it is identified that it is possible to change the BWP (Yes in 805), the electronic device 101 may transmit a message requesting to change the BWP being used by the electronic device 101, based on identifying the event configured to change the BWP, in operation 809. As described in connection with FIG. 7A, the electronic device 101 may request the network 600 to change the BWP using, e.g., a UEAssistanceInformation message, but is not limited. The network 600 may transmit, to the electronic device 101, a DCI indicating a change to the second BWP based on the message requesting to change the BWP being used by the electronic device 101. The second BWP may be a BWP included in the at least one BWP based on the RRC reconfiguration message. A configuration for determining the second BWP by the network 600 is described below. In operation 811, the electronic device 101 may receive, from the network 600, the DCI indicating a change from the first BWP to the second BWP included in the at least one BWP. In operation 813, the electronic device 101 may perform communication with the network 600 using the second BWP based on reception of the DCI.

Figure 8B:
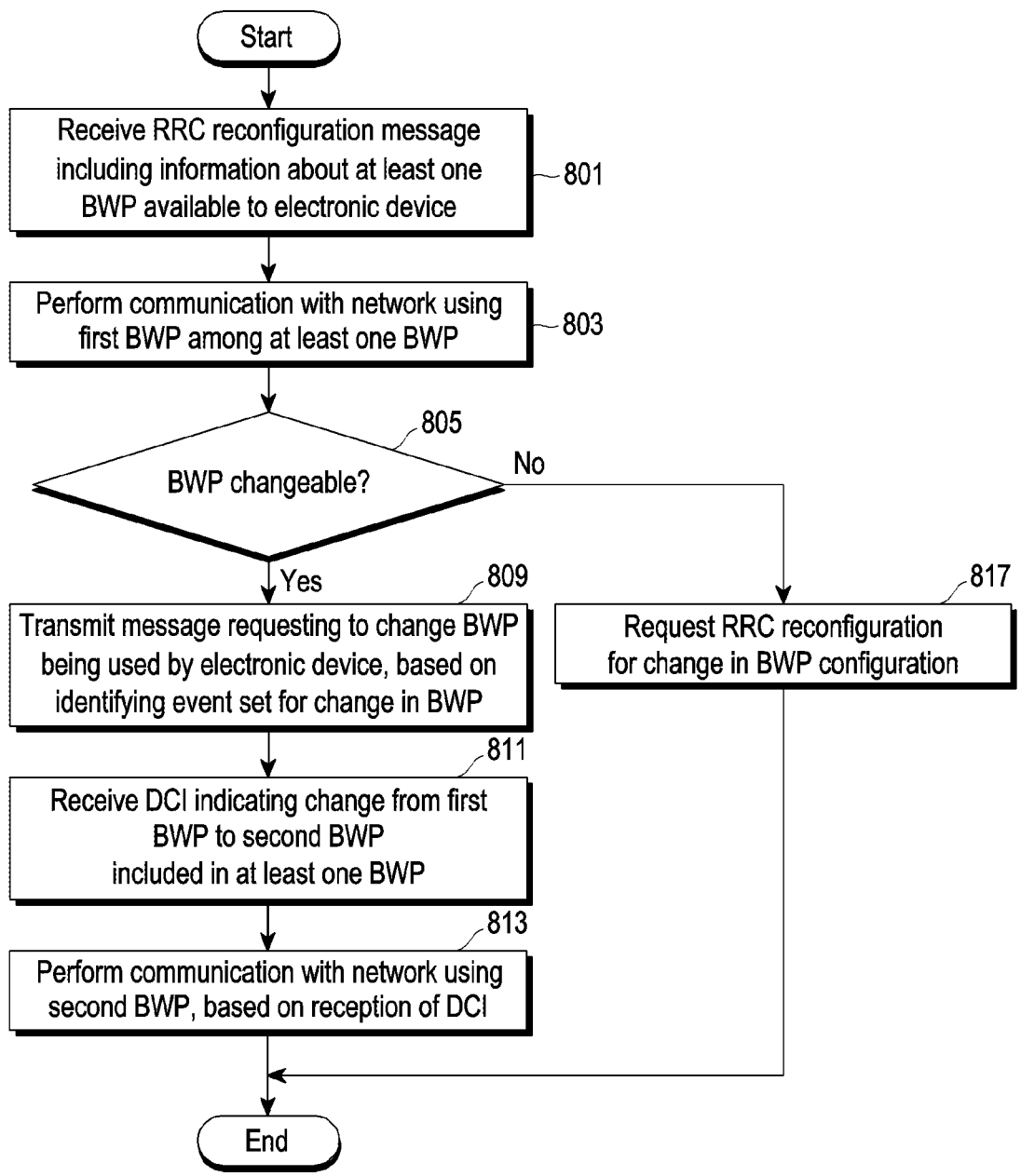
FIG. 8B is a flowchart illustrating an example method of operating an electronic device according to various embodiments.

FIG. 8B is a flowchart illustrating an example method of operating an electronic device according to various embodiments. Operations described in relation to the embodiment of FIG. 8A among the embodiments of FIG. 8B may not be repeated in this section.

According to various embodiments, an electronic device 101 (e.g., at least one of the processor 120, the first communication processor 212, the second communication processor 214, or the integrated communication processor 260) may request an RRC reconfiguration for changing the BWP configuration in operation 817. The electronic device 101 may request an RRC reconfiguration for changing the BWP configuration by performing a pre-negotiated procedure with the network 600. In one example, the electronic device 101 may request the network 600 to perform an RRC reconfiguration for changing the BWP configuration using the UEAssistanceInformation message. The network 600 may transmit, to the electronic device 101, an RRC reconfiguration message to change the BWP configuration (e.g., at least one of Tables 2 to 4) based on the request from the electronic device 101. The network 600 may transmit, to the electronic device 101, an RRC reconfiguration message including information about at least one BWP configured based on the request from the electronic device 101. For example, upon receiving a request for a BWP having a narrower bandwidth from the electronic device 101, the network 600 may transmit, to the electronic device 101, an RRC reconfiguration message including information about the BWP having the narrower bandwidth as compared with the existing one. The electronic device 101 may identify the BWP configuration based on the received RRC reconfiguration message and perform communication with the network 600 using any one among them.

FIGS. 9A, 9B, 9C, 9D and 9E are flowcharts illustrating example methods of operating an electronic device according to various embodiments.

Figure 9A:
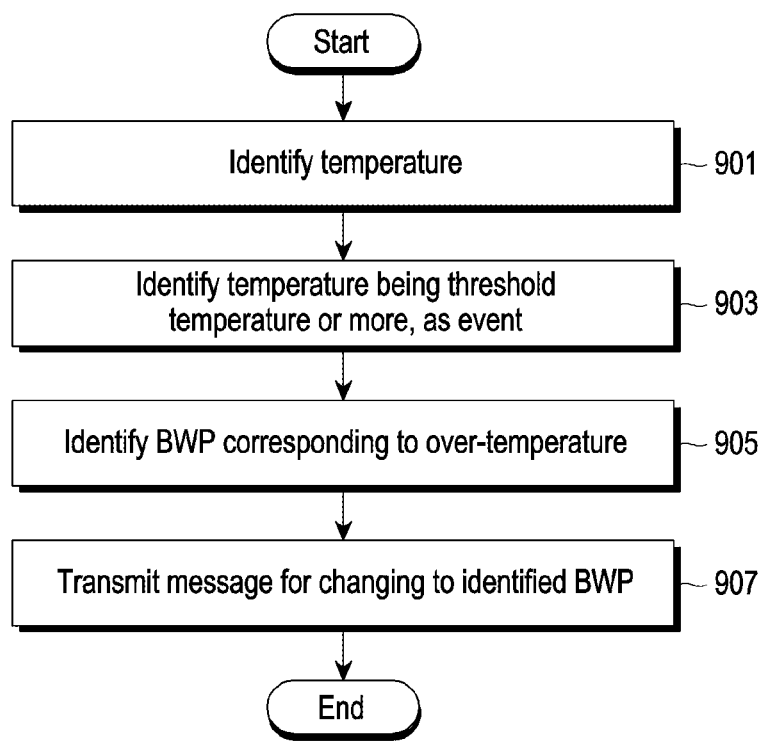
FIGS. 9A, 9B, 9C, 9D and 9E are flowcharts illustrating an example methods of operating an electronic device according to various embodiments.

Referring to FIG. 9A, according to various embodiments, an electronic device 101 (e.g., at least one of the processor 120, the first communication processor 212, the second communication processor 214, or the integrated communication processor 260) may identify the temperature of the electronic device 101 in operation 901. In operation 903, the electronic device 101 may identify the identified temperature being a threshold temperature or more, as an event. For example, the electronic device 101 may identify at least one temperature from at least one temperature sensor included in the electronic device 101. If the electronic device 101 monitors the temperature from one temperature sensor, for the operations of FIG. 9A, the electronic device 101 may determine whether the temperature from one temperature sensor is the threshold temperature or more. In this case, the temperature sensor may be a temperature sensor disposed adjacent to a corresponding piece of hardware, to measure the nearby temperature of at least one of, e.g., an application processor, a communication processor, an RFIC, an RFFE, or an antenna module, but is not limited. Meanwhile, in another example, the electronic device 101 may monitor the temperatures from a plurality of temperature sensors and may monitor them for the operations of FIG. 9A. In this case, the electronic device 101 may identify whether any one of the plurality of temperatures is the threshold temperature or more, as an event. The electronic device 101 may identify whether the value (e.g., average) calculated by the plurality of temperatures is the threshold temperature or more, as an event, but the calculation method is not limited. Meanwhile, the threshold temperature may be a value experimentally determined as a temperature at which degradation of the component may occur, but the determination method is not limited. The threshold temperature may be a fixed value or a value changeable depending on the state of the electronic device 101. In one example, the processor 120 of the electronic device 101 may receive sensing data (e.g., temperature) from the sensor module 176 and identify whether the identified temperature is the threshold temperature or more. If the identified temperature is the threshold temperature or more, the processor 120 may transfer an indication indicating over-temperature to the communication processor (e.g., at least one of the first communication processor 212, the second communication processor 214, the integrated communication processor 260). Or, the communication processor (e.g., at least one of the first communication processor 212, the second communication processor 214, the integrated communication processor 260) may be implemented to directly receive the temperature from the sensor module 176 and determine whether the temperature is the threshold temperature or more.

According to various embodiments, the electronic device 101 may identify the BWP corresponding to the over-temperature in operation 905, based on the identified temperature being the threshold temperature or more. In operation 907, the electronic device 101 may transmit a message for changing to the identified BWP, to the network 600.

In one example, the electronic device 101 may identify the BWP which may mitigate the over-temperature state. For example, the amount of heat generated when performing communication using a relatively smaller BWP may be smaller than the amount of heat generated when performing communication using a relatively larger BWP. For example, the amount of heat generated from the RF circuit processing a relatively smaller bandwidth may be smaller than the amount of heat generated from the RF circuit processing a relatively larger bandwidth. As the communication processor processes relatively smaller RBs, the amount of heat generated may further be reduced. The electronic device 101 may identify a BWP having a smaller bandwidth than the first BWP being currently used. The electronic device 101 may transmit a message including identification information (e.g., BWP Id) about the BWP to the network 600, thereby allowing the network 600 to transmit a DCI triggering a change to the corresponding BWP. For example, the electronic device 101 may transmit a UEAssistanceInformation message including a preferred BWP Id to the network 600, which is described below. The type of the message transmitted and/or the type of information included in the message is not limited. Meanwhile, the above-described bandwidth is merely an example of the attribute of the BWP, and it is possible to identify the BWP for change by other various attributes of monitoring period (e.g., monitoring period of PDCCH) and/or center frequency than bandwidth, which is described below.

In another example, the electronic device 101 may transmit a message indicating the over-temperature state to the network 600. For example, the electronic device 101 may transmit a UEAssistanceInformation message including a specific value of the information element corresponding to the over-temperature state to the network 600, which is described below. The type of the message transmitted and/or the type of information included in the message is not limited. In this case, the operation of identifying the BWP corresponding to the over-temperature of operation 905 may be replaced with the operation of identifying information (e.g., the specific value of the information element) corresponding to the over-temperature. Further, transmission of a message for changing to the identified BWP in operation 907 may be replaced with transmission (or repeated transmission) of the message including the information (e.g., the specific value of the information element) corresponding to the over-temperature. In this case, the network 600 may identify an event (e.g., an over-temperature state) detected from the electronic device 101 based on the received message. The network 600 may identify the BWP corresponding to the detected event (e.g., the over-temperature state) and may transmit the DCI for changing to the identified BWP to the electronic device 101.

Meanwhile, as described above, in the case of the over-temperature state, the electronic device 101 may request the network 600 to change the BWP. In an embodiment, the electronic device 101 may identify the BWP corresponding to the identified temperature. For example, the electronic device 101 may store association information between a plurality of temperature ranges and the bandwidth. For example, if a temperature of T1 is identified, the electronic device 101 may identify a first bandwidth corresponding to a first temperature range where the temperature of T1 belongs. The electronic device 101 may transmit a message for changing to the BWP having the first bandwidth to the network 600. Meanwhile, the electronic device 101 may then identify a temperature of T2. The electronic device 101 may identify a second bandwidth corresponding to a second temperature range where the temperature of T2 belongs. The electronic device 101 may transmit a message for changing to the BWP having the second bandwidth to the network 600.

Figure 9B:
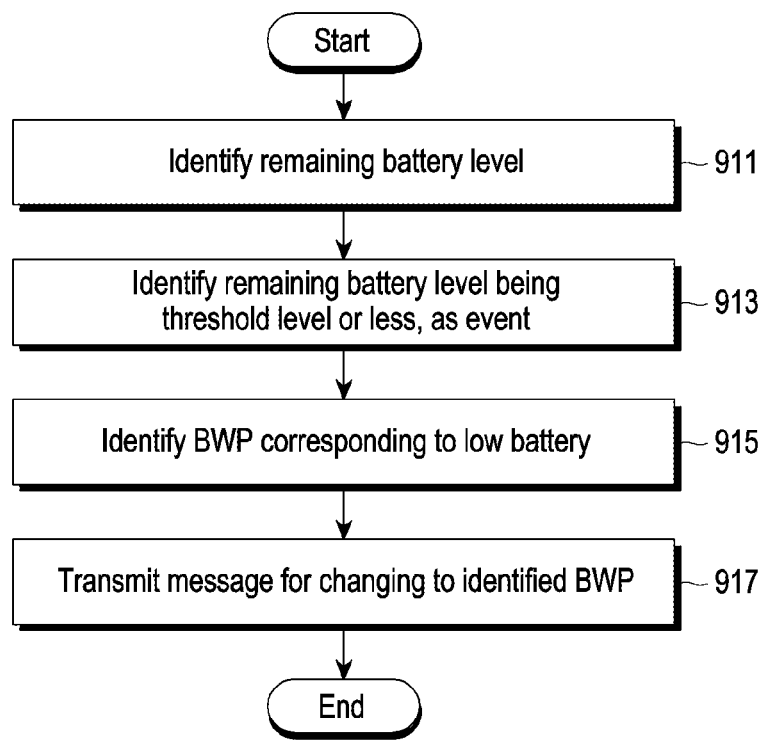

Referring to FIG. 9B, according to various embodiments, an electronic device 101 (e.g., at least one of the processor 120, the first communication processor 212, the second communication processor 214, or the integrated communication processor 260) may identify the remaining battery level in operation 911. In operation 913, the electronic device 101 may identify that the remaining battery level is a threshold level or less, as an event. For example, the electronic device 101 may identify the remaining battery level from a fuel gauge included in the electronic device 101. Meanwhile, the threshold level may be a level requiring power savings of the electronic device 101, but the determination method is not limited. The threshold level may be a fixed value or a value changeable depending on the state of the electronic device 101. In one example, the processor 120 of the electronic device 101 may receive sensing data (e.g., remaining battery level) from the fuel gauge and identify whether the identified remaining battery level is the threshold level or less. If the remaining battery level is the threshold level or less, the processor 120 may transfer an indication indicating low battery to the communication processor (e.g., at least one of the first communication processor 212, the second communication processor 214, the integrated communication processor 260). The communication processor (e.g., at least one of the first communication processor 212, the second communication processor 214, the integrated communication processor 260) may be implemented to directly receive the remaining battery level from the fuel gauge and determine whether the remaining battery level is the threshold level or less.

According to various embodiments, the electronic device 101 may identify the BWP corresponding to the low battery based on the identified remaining battery level being the threshold level or less, in operation 915. In operation 917, the electronic device 101 may transmit a message for changing to the identified BWP, to the network 600.

In one example, the electronic device 101 may identify the BWP capable of reducing power consumption. For example, the power consumption when performing communication using a relatively smaller BWP may be smaller than the power consumption when performing communication using a relatively larger BWP. For example, the power consumption generated from the RF circuit processing a relatively smaller bandwidth may be smaller than the power consumption generated from the RF circuit processing a relatively larger bandwidth. As the communication processor processes relatively smaller RBs, the power consumption may further be reduced. The electronic device 101 may identify a BWP having a smaller bandwidth than the first BWP being currently used. The electronic device 101 may transmit a message including identification information (e.g., BWP Id) about the BWP to the network 600, thereby allowing the network 600 to transmit a DCI triggering a change to the corresponding BWP. For example, the electronic device 101 may transmit a UEAssistanceInformation message including a preferred BWP Id to the network 600, which is described below. The type of the message transmitted and/or the type of information included in the message is not limited.

In another example, the electronic device 101 may transmit a message indicating the low battery to the network 600. For example, the electronic device 101 may transmit a UEAssistanceInformation message including a specific value of the information element corresponding to the low battery to the network 600, which is described below. The type of the message transmitted and/or the type of information included in the message is not limited. In this case, the operation of identifying the BWP corresponding to the low battery of operation 915 may be replaced with the operation of identifying information (e.g., the specific value of the information element) corresponding to the low battery. Further, transmission of a message for changing to the identified BWP in operation 917 may be replaced with transmission (or repeated transmission) of the message including the information (e.g., the specific value of the information element) corresponding to the low battery. In this case, the network 600 may identify an event (e.g., low battery) detected from the electronic device 101 based on the received message. The network 600 may identify the BWP corresponding to the detected event (e.g., low battery) and may transmit the DCI for changing to the identified BWP to the electronic device 101.

Meanwhile, as described above, in the case of low battery, the electronic device 101 may request the network 600 to change the BWP. In an embodiment, the electronic device 101 may identify the BWP corresponding to the remaining battery level. For example, the electronic device 101 may store association information between a plurality of remaining battery level ranges and the bandwidth. For example, if a remaining battery level of R1 is identified, the electronic device 101 may identify a first bandwidth corresponding to the first remaining battery level where R1 belongs. The electronic device 101 may transmit a message for changing to the BWP having the first bandwidth to the network 600. Meanwhile, the electronic device 101 may then identify a remaining battery level of R2. The electronic device 101 may identify a second bandwidth corresponding to a second remaining battery level where the remaining battery level of R2 belongs. The electronic device 101 may transmit a message for changing to the BWP having the second bandwidth to the network 600.

Figure 9C:
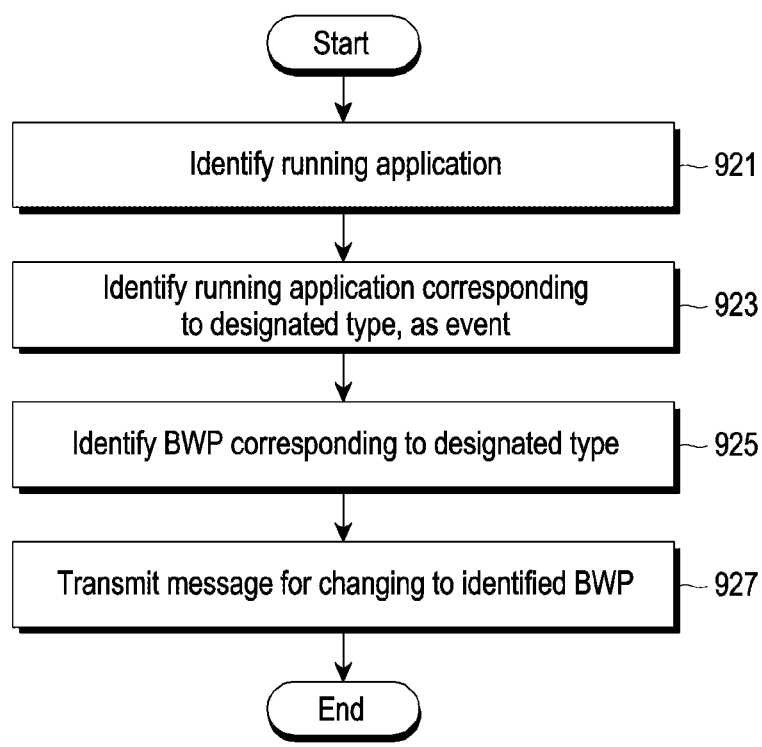

Referring to FIG. 9C, according to various embodiments, an electronic device 101 (e.g., at least one of the processor 120, the first communication processor 212, the second communication processor 214, or the integrated communication processor 260) may identify a running application in operation 921. In operation 923, the electronic device 101 may identify that the running application corresponds to a designated type, as an event. For example, the type may be designated by the electronic device 101 or by the network provider, but the designation method is not limited. In one example, the processor 120 of the electronic device 101 may identify whether the running application corresponds to the designated type. If the application corresponds to the designated type, the processor 120 may transfer an indication indicating that the application corresponds to the designated type to the communication processor (e.g., at least one of the first communication processor 212, the second communication processor 214, or the integrated communication processor 260). The communication processor (e.g., at least one of the first communication processor 212, the second communication processor 214, or the integrated communication processor 260) may previously store information about the type of the application and the generated network interface (e.g., rmnet) and may identify whether a specific type of application is executed based on receiving data from a specific network interface and/or providing data to the specific network interface.

According to various embodiments, the electronic device 101 may identify the BWP corresponding to the designated type based on the running application corresponding to the designated type in operation 925. In operation 927, the electronic device 101 may transmit a message for changing to the identified BWP, to the network 600.

In one example, the electronic device 101 may identify whether the type of the running application corresponds to a type requiring a relatively small bandwidth. For example, if the running application is of a type using relatively small data, the electronic device 101 may identify that the type of the running application corresponds to a type requiring a relatively small bandwidth. In another example, the electronic device 101 may identify that the type of the running application corresponds to a type requiring a relatively large bandwidth. For example, if the running application is of a type using relatively large data, the electronic device 101 may identify that the type of the running application corresponds to a type requiring a relatively large bandwidth.

In another example, the electronic device 101 may identify whether the type of the running application corresponds to a type requiring a relatively short monitoring period. For example, if the running application is of a type requiring relatively low-latency data processing, the electronic device 101 may identify that the type of the running application corresponds to a type requiring a relatively short monitoring period. In another example, the electronic device 101 may identify whether the type of the running application corresponds to a type requiring a relatively long monitoring period. For example, if the running application is of a type not requiring relatively low-latency data processing, the electronic device 101 may identify that the type of the running application corresponds to a type requiring a relatively long monitoring period.

The electronic device 101 may identify the BWP having a bandwidth and/or monitoring period different from that of the first BWP being currently used. The electronic device 101 may transmit a message including identification information (e.g., BWP Id) about the BWP to the network 600, thereby allowing the network 600 to transmit a DCI triggering a change to the corresponding BWP. For example, the electronic device 101 may transmit a UEAssistanceInformation message including a preferred BWP Id to the network 600, which is described below. The type of the message transmitted and/or the type of information included in the message is not limited.

In another example, the electronic device 101 may transmit a message indicating the application type to the network 600. For example, the electronic device 101 may transmit a UEAssistanceInformation message including a specific value of the information element corresponding to the application type to the network 600, which is described below. The type of the message transmitted and/or the type of information included in the message is not limited. In this case, the operation of identifying the BWP corresponding to the application type of operation 925 may be replaced with the operation of identifying information (e.g., the specific value of the information element) corresponding to the application type. Further, transmission of a message for changing to the identified BWP in operation 927 may be replaced with transmission (or repeated transmission) of the message including the information (e.g., the specific value of the information element) corresponding to the application type. In this case, the network 600 may identify an event (e.g., execution of a designated type of application) detected from the electronic device 101 based on the received message. The network 600 may identify the BWP corresponding to the detected event (e.g., execution of a designated type of application) and may transmit the DCI for changing to the identified BWP to the electronic device 101.

Figure 9D:
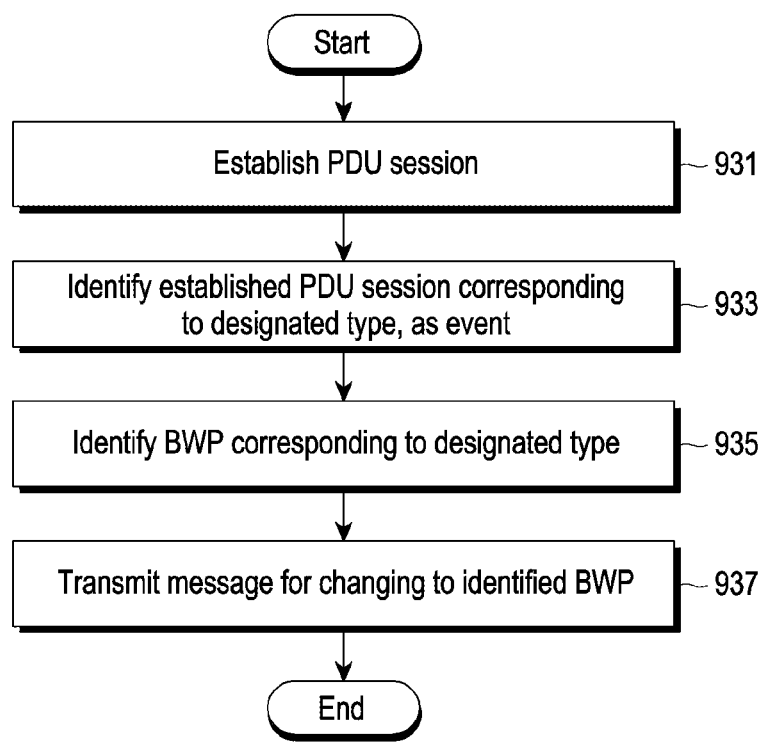

Referring to FIG. 9D, according to various embodiments, an electronic device 101 (e.g., at least one of the processor 120, the first communication processor 212, the second communication processor 214, or the integrated communication processor 260) may establish (or activate) a PDU session in operation 931. In operation 933, the electronic device 101 may identify that the established (or activated) PDU session corresponds to a designated type, as an event. For example, the type of the PDU session (or the network slice type (e.g., slice service type (SST)) corresponding to the PDU session) may be designated by the electronic device 101 or by the network provider, but the designation method is not limited. The communication processor (e.g., at least one of the first communication processor 212, the second communication processor 214, or the integrated communication processor 260) may identify the PDU session type.

According to various embodiments, the electronic device 101 may identify the BWP corresponding to the designated type based on the running PDU session corresponding to the designated type in operation 935. In operation 937, the electronic device 101 may transmit a message for changing to the identified BWP, to the network 600.

In one example, the electronic device 101 may identify that the PDU session corresponds to a type requiring a relatively large bandwidth. For example, if the type of the PDU session is eMBB, the electronic device 101 may identify that the PDU session corresponds to a type requiring a relatively large bandwidth.

In another example, the electronic device 101 may identify that the PDU session corresponds to a type requiring a relatively short monitoring period. For example, if the type of the PDU session is URLLC or V2X, the electronic device 101 may identify that the PDU session corresponds to a type requiring a relatively short monitoring period. The electronic device 101 may identify the BWP having a bandwidth and/or monitoring period different from that of the first BWP being currently used. The electronic device 101 may transmit a message including identification information (e.g., BWP Id) about the BWP to the network 600, thereby allowing the network 600 to transmit a DCI triggering a change to the corresponding BWP. For example, the electronic device 101 may transmit a UEAssistanceInformation message including a preferred BWP Id to the network 600, which is described below. The type of the message transmitted and/or the type of information included in the message is not limited.

In another example, the electronic device 101 may transmit a message indicating the type of the PDU session to the network 600. For example, the electronic device 101 may transmit a UEAssistanceInformation message including a specific value of the information element corresponding to the type of the PDU session to the network 600, which is described below. The type of the message transmitted and/or the type of information included in the message is not limited. In this case, the operation of identifying the BWP corresponding to the type of the PDU session of operation 935 may be replaced with the operation of identifying information (e.g., the specific value of the information element) corresponding to the type of the PDU session. Further, transmission of a message for changing to the identified BWP in operation 937 may be replaced with transmission (or repeated transmission) of the message including the information (e.g., the specific value of the information element) corresponding to the type of the PDU session. In this case, the network 600 may identify an event (e.g., execution of a designated type of application) detected from the electronic device 101 based on the received message. The network 600 may identify the BWP corresponding to the detected event (e.g., execution of a designated type of application) and may transmit the DCI for changing to the identified BWP to the electronic device 101.

Figure 9E:
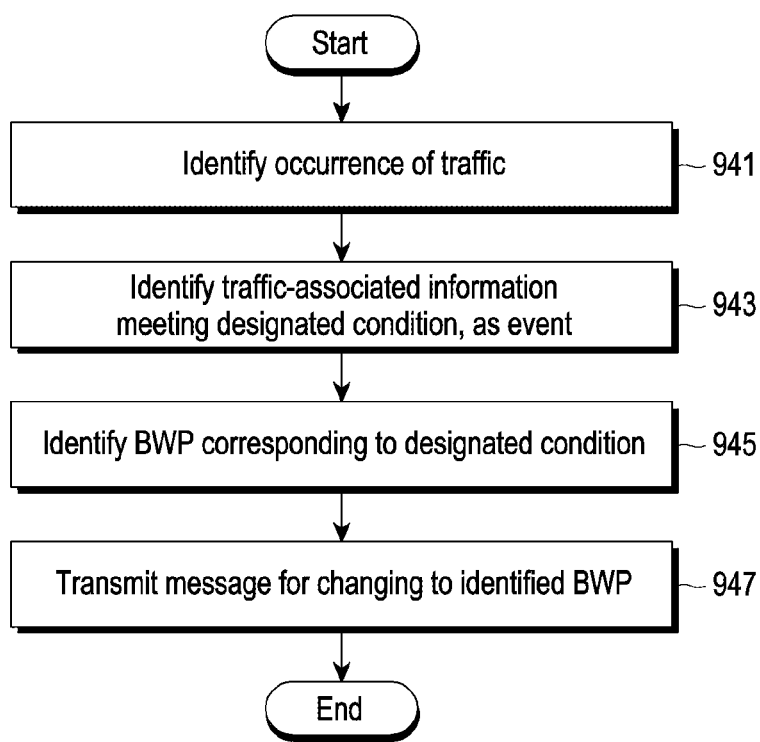

Referring to FIG. 9E, according to various embodiments, the electronic device 101 (e.g., at least one of the processor 120, the first communication processor 212, the second communication processor 214, or the integrated communication processor 260) may identify traffic occurrence in operation 941. In operation 943, the electronic device 101 may identify that information associated with traffic meets a designated condition, as an event. For example, if the data throughput is a threshold data throughput or more, the electronic device 101 may identify that the event is detected. For example, the processor 120 and/or the communication processor (e.g., at least one of the first communication processor 212, the second communication processor 214, or the integrated communication processor 260) may measure the data throughput.

According to various embodiments, the electronic device 101 may identify the BWP corresponding to the designated type based on the traffic-associated information meeting a designated condition in operation 945. In operation 947, the electronic device 101 may transmit a message for changing to the identified BWP, to the network 600.

In one example, as the traffic-associated information meets the designated condition, the electronic device 101 may identify that use of a BWP having a relatively short monitoring period is required. The electronic device 101 may identify the BWP having a monitoring period different from that of the first BWP being currently used. The electronic device 101 may transmit a message including identification information (e.g., BWP Id) about the BWP to the network 600, thereby allowing the network 600 to transmit a DCI triggering a change to the corresponding BWP. For example, the electronic device 101 may transmit a UEAssistanceInformation message including a preferred BWP Id to the network 600, which is described below. The type of the message transmitted and/or the type of information included in the message is not limited.

In another example, the electronic device 101 may transmit a message indicating a data active state to the network 600. For example, if the traffic-associated information meets the designated condition, it may be represented as a data active state and, if the traffic-associated information does not meet the designated condition, it may be represented as a data inactive state. For example, the electronic device 101 may transmit a UEAssistanceInformation message including a specific value of the information element corresponding to the data active state to the network 600, which is described below. The type of the message transmitted and/or the type of information included in the message is not limited. In this case, the operation of identifying the BWP corresponding to the traffic-associated information meeting the designated condition in operation 945 may be replaced with the operation of identifying information (e.g., the specific value of the information element) corresponding to the data active state. Further, transmission of a message for changing to the identified BWP in operation 947 may be replaced with transmission (or repeated transmission) of the message including the information (e.g., the specific value of the information element) corresponding to the traffic-associated information meeting the designated condition. In this case, the network 600 may identify an event (e.g., the traffic-associated information meeting the designated condition) detected from the electronic device 101 based on the received message. The network 600 may identify the BWP corresponding to the detected event (e.g., the traffic-associated information meeting the designated condition) and may transmit the DCI for changing to the identified BWP to the electronic device 101.

Figure 10:
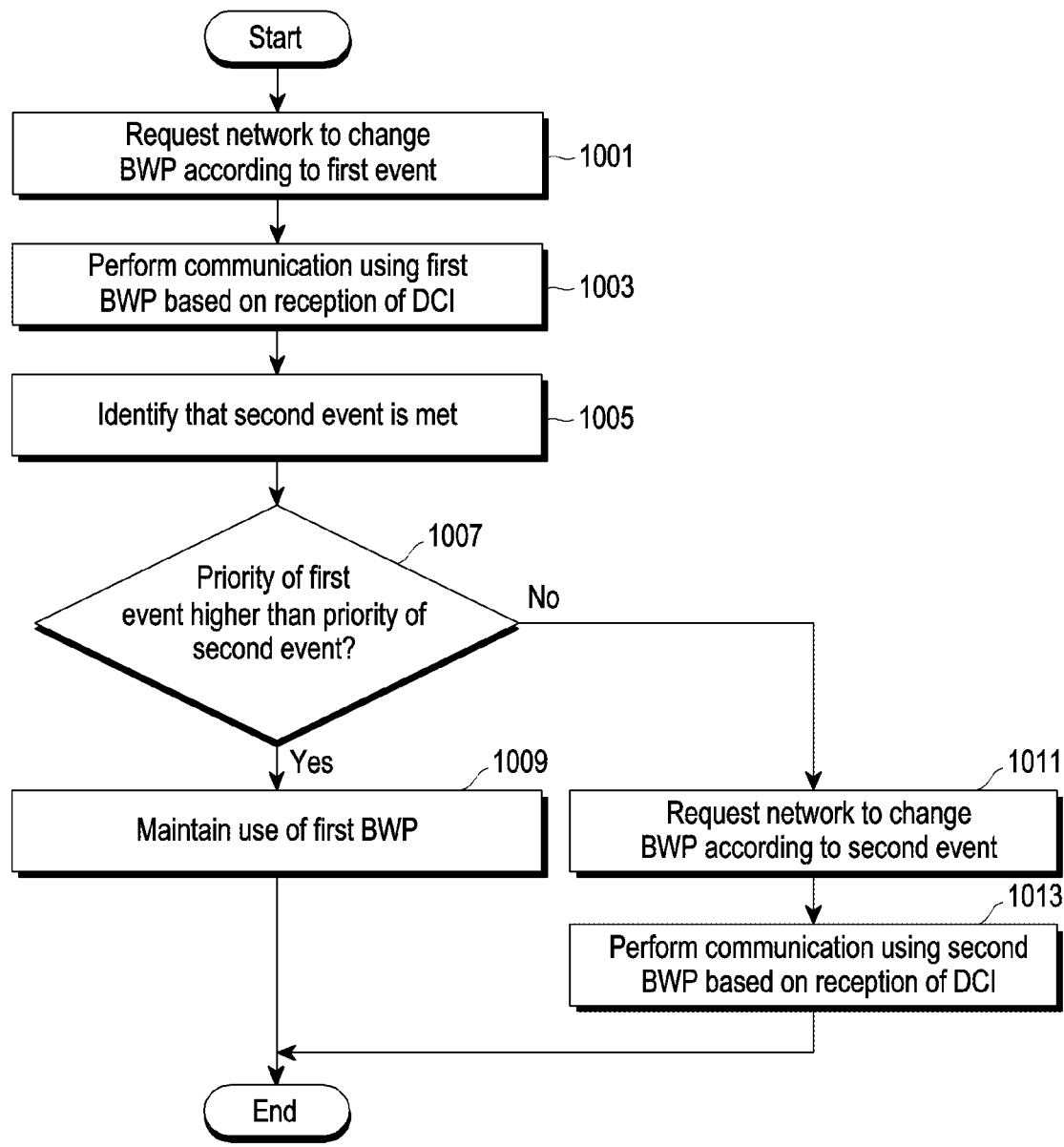
FIG. 10 is a flowchart illustrating an example method of operating an electronic device according to various embodiments.

FIG. 10 is a flowchart illustrating an example method of operating an electronic device according to various embodiments.

According to various embodiments, an electronic device 101 (e.g., at least one of the processor 120, the first communication processor 212, the second communication processor 214, or the integrated communication processor 260) may request the network 600 to change the BWP according to a first event in operation 1001. In operation 1003, the electronic device 101 may perform communication using the first BWP, based on reception of the DCI. In operation 1005, the electronic device 101 may identify that the second event is met while performing communication using the first BWP.

According to various embodiments, in operation 1007, the electronic device 101 may identify whether the priority of the first event is higher than the priority of the second event. If the priority of the first event is higher than the priority of the second event (yes in 1007), the electronic device 101 may maintain use of the first BWP in operation 1009. The electronic device 101 may maintain use of the BWP corresponding to the first event having the higher priority. If the priority of the first event is not higher than the priority of the second event (No in 1007), the electronic device 101 may request the network 600 to change the BWP according to the second event in operation 1011. In operation 1013, the electronic device 101 may perform communication using the second BWP based on reception of the DCI from the network 600. The electronic device 101 may switch to the BWP having the higher priority or corresponding to the second event. For example, the first event may correspond to an over-temperature state, and the second event may correspond to the designated type (e.g., URLLC) of the PDU session. The over-temperature of the first event may require a BWP having a relatively long monitoring period, and corresponding to the designated type (e.g., URLLC) of the PDU session of the second event may require a BWP having a relatively short monitoring period. As such, if events having opposite BWP attributes are detected, the electronic device 101 may be configured to use the BWP corresponding to the higher priority. For example, the electronic device 101 may set the priority of the second event of correspond to the designated type (e.g., URLLC) of the PDU session to be higher than the priority of the first event of the over-temperature state. In this case, the electronic device 101 may request the network 600 to change the BWP having a relatively short monitoring period based on correspond to the designated type (e.g., URLLC) of the PDU session.

Meanwhile, in an embodiment, events having the same BWP attributes may be detected. For example, the first event may be an over-temperature state, and the second event may be low battery. The over-temperature of the first event may require a BWP having a relatively long monitoring period, and the low battery of the second event may require a BWP having a relatively long monitoring period. When events having the same BWP attributes are detected, the electronic device 101 may not compare the priorities of the first event and the second event. The priority comparison may be performed when events having opposite BWP attributes required are detected. Based on detection of the second event, the electronic device 101 may request the network 600 to change to the second BWP having a relatively longer monitoring period than the first BWP. According to implementation, the electronic device 101 may also store information about BWP attributes required for each combination of event(s). For example, the electronic device 101 may store information about BWP attributes corresponding to various combinations without managing priority. For example, the electronic device 101 may store a relatively short monitoring period as the BWP attribute, for the over-temperature state and URLLC-type PDU session and store a relatively long monitoring period as the BWP attribute, for the over-temperature state and low battery. Meanwhile, although determining the BWP attribute corresponding to two events has been described above, it will be appreciated by one of ordinary skill in the art that the electronic device 101 may also determine the attribute of the BWP for three or more events as described above.

Figure 11:
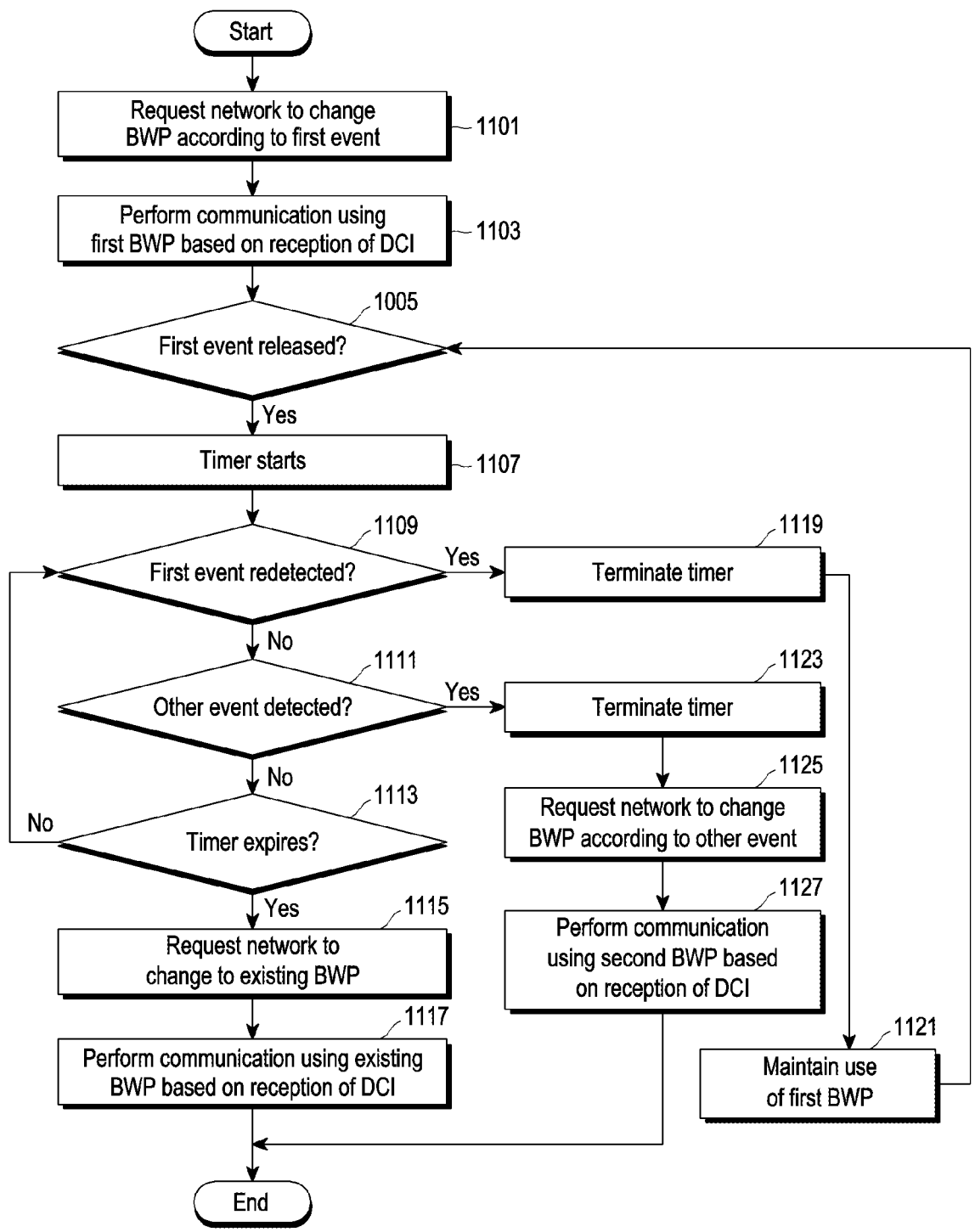
FIG. 11 is a flowchart illustrating an example method of operating an electronic device according to various embodiments.

FIG. 11 is a flowchart illustrating an example method of operating an electronic device according to various embodiments.

According to various embodiments, an electronic device 101 (e.g., at least one of the processor 120, the first communication processor 212, the second communication processor 214, or the integrated communication processor 260) may request the network 600 to change the BWP according to a first event in operation 1101. In operation 1103, the electronic device 101 may perform communication using the first BWP based on reception of the DCI from the network 600. In operation 1105, the electronic device 101 may identify whether the first event is released. For example, if the first event is the temperature being the threshold temperature or more, the electronic device 101 may identify whether the temperature is less than the threshold temperature as whether the first event is released. If the first event is released (Yes in 1105), the electronic device 101 may start the timer in operation 1107. After the timer starts, the electronic device 101 may identify whether the first event is detected again in operation 1109. For example, the electronic device 101 may identify whether the temperature is the threshold temperature or more as whether the first event is detected again. If the first event is not detected again (No in 1109), the electronic device 101 may identify whether an event other than the first event is detected in operation 1111. If no other event is detected (No in 1111), the electronic device 101 may determine whether the timer expires in operation 1113. If the timer does not expire (No in 1113), the electronic device 101 may repeatedly identify whether the first event is detected again as in operation 1109 and whether another event is detected as in operation 1111 until the timer expires. If the timer expires (Yes in 1113), the electronic device 101 may request the network 600 to change to the existing BWP in operation 1115. In operation 1117, the electronic device 101 may perform communication using the existing BWP based on reception of the DCI from the network 600. As described above, the electronic device 101 may not perform change to the existing BWP until the timer expires, thus preventing and/or reducing frequent BWP change. The change in BWP may cause a blank in data transmission/reception between the electronic device 101 and the network 600 and place a resource burden on the network 600. Thus, a frequent change in BWP may not be favored.

Meanwhile, if the first event is detected again after the timer starts (Yes in 1109), the electronic device 101 may terminate the timer in operation 1119. After the timer expires, the electronic device 101 may maintain use of the first BWP in operation 1121. The electronic device 101 may later identify again whether the first event is released in operation 1105. Since the first event is detected again before the timer expires, the electronic device 101 may not return to the existing BWP. Meanwhile, if another event is detected before the timer expires (Yes in 1111), the electronic device 101 may terminate the timer in operation 1123. The electronic device 101 may request the network 600 to change the BWP according to the other event in operation 1125. In operation 1127, the electronic device 101 may perform communication using the second BWP based on reception of the DCI from the network 600. Before the timer expires or as an event different from the existing event is detected, the electronic device 101 may request the network 600 to change to the BWP corresponding to the other event.

In an embodiment, the electronic device 101 may be configured to perform a BWP change having a hysteresis characteristic, not timer-based. For example, if the temperature is a first threshold temperature or more, the electronic device 101 may request the network 600 to change the BWP. The electronic device 101 may perform communication using the first BWP according to reception of the DCI from the network 600. The first BWP may have an attribute (e.g., a relatively long monitoring period or a relatively small bandwidth) that may cause a reduction in temperature. Accordingly, the electronic device 101 may identify a reduction in temperature while using the first BWP. For example, the temperature which exceeded the first threshold temperature at the time of starting to use the first BWP may be reduced to less than the first threshold temperature. The electronic device 101 may not request the network 600 to return to the immediately prior BWP at the time when the temperature is detected as less than the first threshold temperature. If the temperature is detected as not more than a second threshold temperature which is set to be lower than the first threshold temperature, the electronic device 101 may request the network 600 to return to the prior BWP. The electronic device 101 may request the network 600 to change the BWP and return to the BWP according to a plurality of threshold temperatures (e.g., the first threshold temperature and the second threshold temperature) having a hysteresis characteristic, thus preventing and/or reducing frequent changes in BWP.

Figure 12A:
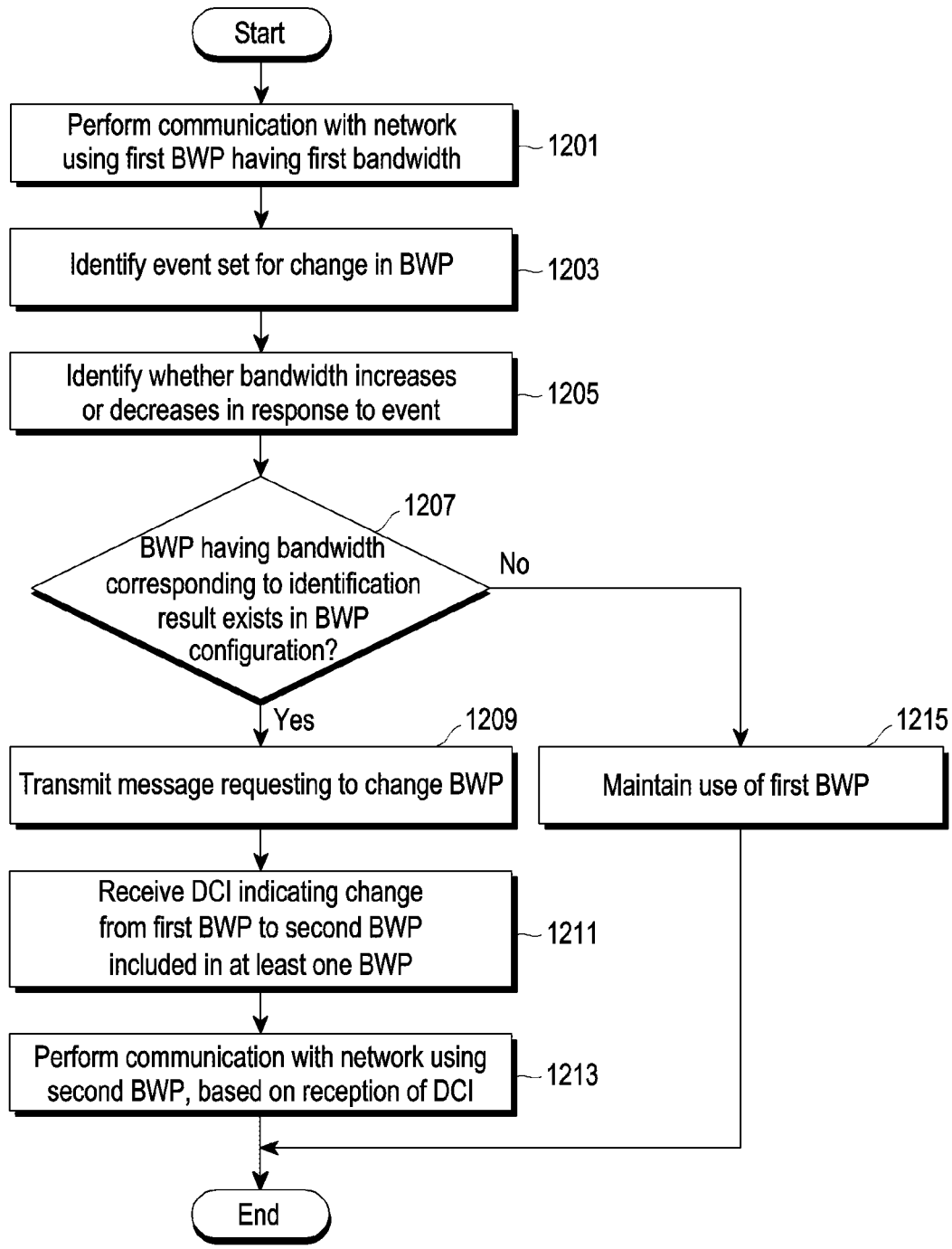
FIG. 12A is a flowchart illustrating an example method of operating an electronic device according to various embodiments.

FIG. 12A is a flowchart illustrating an example method of operating an electronic device according to various embodiments.

Referring to FIG. 12A, according to various embodiments, an electronic device 101 (e.g., at least one of the processor 120, the first communication processor 212, the second communication processor 214, or the integrated communication processor 260) may perform communication with the network 600 using the first BWP having a first bandwidth in operation 1201. In operation 1203, the electronic device 101 may identify the event set to change the BWP. In operation 1205, the electronic device 101 may identify whether the bandwidth increases or decreases in response to the event. For example, if an event that the type of the PDU session is eMBB is detected, the electronic device 101 may identify that increasing the bandwidth is required. For example, if low battery is detected, the electronic device 101 may identify that decreasing the bandwidth is required. In operation 1207, the electronic device 101 may identify whether a BWP having a bandwidth corresponding to the identification result exists in the BWP configuration (e.g., downlinkBWP-ToAddModList and/or uplinkBWP-ToAddModList). For example, if an event requiring that the bandwidth be reduced is detected, the electronic device 101 may identify whether there is another BWP having a smaller bandwidth than the first BWP being currently used in the BWP configuration. For example, if an event requiring that the bandwidth be increased is detected, the electronic device 101 may identify whether another BWP having a larger bandwidth than the first BWP being currently used exists in the BWP configuration. For example, the electronic device 101 may identify the bandwidth of each available BWP based on the resource indicator value (RIV) through the locationAndBandwidth value. Table 6 shows an example of a method for calculating the RIV and the bandwidth.

TABLE 6

| CBW | Max RB | Equation | RIV Calculation | locationAndBandwidth |
|---|---|---|---|---|
| 5 | 11 | (1) | 275 * (11 − 1) + 0 | 2750 |
| 10 | 24 | (1) | 275 * (24 − 1) + 0 | 6325 |
| 15 | 38 | (1) | 275 * (38 − 1) + 0 | 10175 |
| 20 | 51 | (1) | 275 * (51 − 1) + 0 | 13750 |
| 25 | 65 | (1) | 275 * (65 − 1) + 0 | 17600 |
| 30 | 78 | (1) | 275 * (78 − 1) + 0 | 21175 |
| 40 | 106 | (1) | 275 * (106 − 1) + 0 | 28875 |
| 50 | 133 | (1) | 275 * (133 − 1) + 0 | 36300 |
| 60 | 162 | (2) | 275 * (275 − 162 + 1) + (275 − 1 − 0) | 31624 |
| 70 | 189 | (2) | 275 * (275 − 189 + 1) + (275 − 1 − 0) | 24199 |
| 80 | 217 | (2) | 275 * (275 − 271 + 1) + (275 − 1 − 0) | 16499 |

TABLE 6-continued

| CBW | Max RB | Equation | RIV Calculation | locationAndBandwidth |
|---|---|---|---|---|
| 90 | 245 | (2) | 275 * (275 − 245 + 1) + (275 − 1 − 0) | 8799 |
| 100 | 273 | (2) | 275 * (275 − 273 + 1) + (275 − 1 − 0) | 1099 |

For example, the electronic device 101 may identify the bandwidth (CBW) based on the locationAndBandwidth value, max RB, and RIV calculation, which may follow, e.g., 3GPP TS 38.214, but is not limited. If a BWP having the bandwidth corresponding to the result of identification exists in the BWP configuration (Yes in 1207), the electronic device 101 may transmit a message requesting to change the BWP to the network 600 in operation 1209. For example, the electronic device 101 may transmit a message including identification information about the identified BWP to the network 600. As another example, the electronic device 101 may transmit, to the network 600, a message including information indicating the required BWP attribute (e.g., either an increase or decrease in bandwidth). The network 600 may identify that it is required to change to a BWP having a different bandwidth from the BWP currently used by the network 600 and the electronic device 101 (e.g., either a BWP having a larger bandwidth or a BWP having a smaller bandwidth), based on reception of any one of the messages according to various examples as described above. The network 600 may transmit DCI for changing to the identified BWP to the electronic device 101. In operation 1211, the electronic device 101 may receive the DCI indicating a change from the first BWP to the second BWP included in the at least one BWP included in the BWP configuration. For example, the second BWP may have a different bandwidth from the first BWP (e.g., either a BWP having a larger bandwidth or a BWP having a smaller bandwidth). In operation 1213, the electronic device 101 may perform communication with the network 600 using the second BWP based on reception of the DCI. If a BWP having a bandwidth corresponding to the result of identification does not exist in the BWP configuration (No in 1207), the electronic device 101 may maintain use of the first BWP in operation 1215.

Figure 12B:
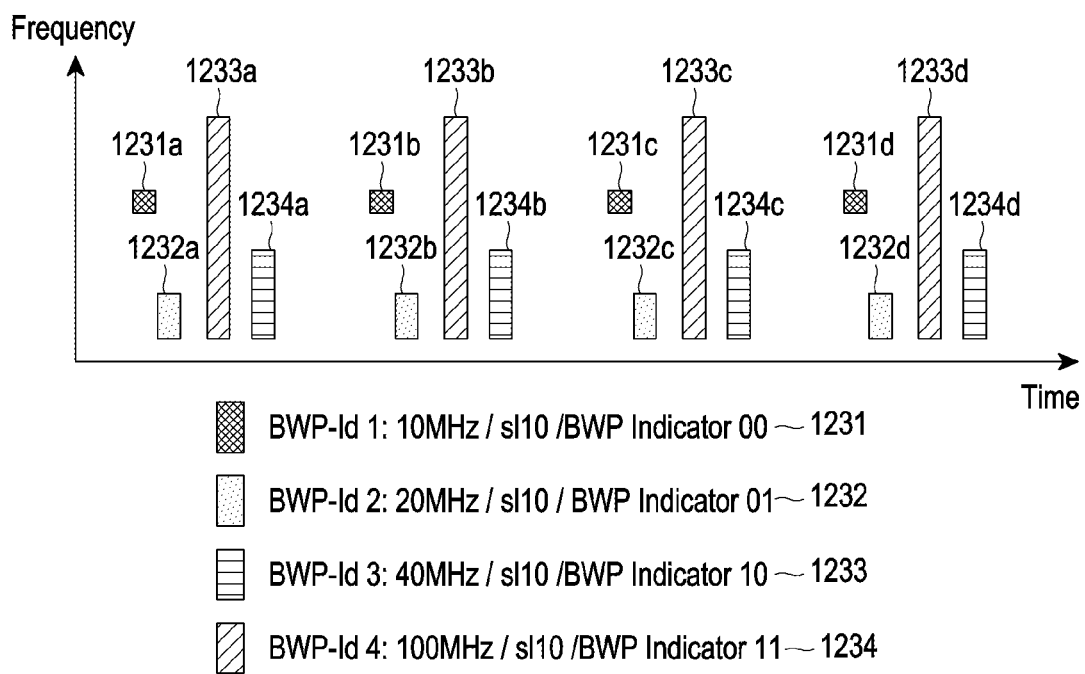
FIG. 12B is a diagram illustrating BWPs available according to various embodiments.

FIG. 12B is a diagram illustrating BWPs available according to various embodiments.

For example, FIG. 12B illustrates BWPs 1231, 1232, 1233, and 1234 that are configured by the network 600 and may be used (or switched to) by the electronic device 101. The first BWP 1231 may have a BWP Id of "1," a bandwidth of 10 MHz, a monitoring period of 10 slots, and a BWP indicator of 00. The second BWP 1232 may have a BWP Id of "2," a bandwidth of 20 MHz, a monitoring period of 10 slots, and a BWP indicator of 01. The third BWP 1233 may have a BWP Id of "3," a bandwidth of 40 MHz, a monitoring period of 10 slots, and a BWP indicator of 10. The fourth BWP 1234 may have a BWP Id of "4," a bandwidth of 100 MHz, a monitoring period of 10 slots, and a BWP indicator of 11. The BWPs 1231, 1232, 1233, and 1234 may be BWPs configured in downlinkBWP-ToAddModList, and the BWP indicator is as described in connection with, e.g., Table 5. Meanwhile, although it is assumed in FIG. 12B that one CORESET and one SearchSpace are matched with one BWP, this is merely an example, and it will be appreciated by one of ordinary skill in the art that the numbers of CORESETs and SearchSpace's matched with one BWP are not limited. Meanwhile, the bandwidth of each BWP may be identified based on locationAndBandwidth, and the monitoring period (e.g., the monitoring period for PDCCH) may be identified based on the monitoringSlotPeriodicityAndOffset. Based on the BWP 1231, first RBs 1231a, second RBs 1231b, third RBs 1231c, and fourth RBs 1231d may be defined. Based on the BWP 1232, fifth RBs 1232a, sixth RBs 1232b, seventh RBs 1232c, and eighth RBs 1232d may be defined. Based on the BWP 1233, ninth RBs 1233a, tenth RBs 1233b, eleventh RBs 1233c, and twelfth RBs 1233d may be defined. Based on the BWP 1234, thirteenth RBs 1234a, fourteenth RBs 1234b, fifteenth RBs 1234c, and sixteenth RBs 1234d may be defined.

For example, it is assumed that the electronic device 101 uses the BWP 1232. The electronic device 101 may detect an event requiring a smaller bandwidth while using the BWP 1232. The electronic device 101 may request the network 600 to change the BWP based on the existence of the BWP 1231, which is a BWP having a smaller bandwidth than the BWP 1232. As described above, in one example, the electronic device 101 may transmit a message including identification information about the BWP 1231 to the network 600. In another example, the electronic device 101 may transmit a message including information indicating a smaller bandwidth to the network 600. The network 600 may determine a change to the BWP 1231 based on the message received from the electronic device 101. The network 600 may transmit a DCI for changing to the BWP 1231 to the electronic device 101. The electronic device 101 may communicate with the network 600 using the BWP 1231 based on DCI. Alternatively, the electronic device 101 may detect an event requiring a larger bandwidth while using the BWP 1232. The electronic device 101 may request the network 600 to change the BWP based on the existence of BWPs 1233 and 1234, which are BWPs having a larger bandwidth than the BWP 1232. As described above, in one example, the electronic device 101 may transmit a message including identification information about the BWP 1233 or the BWP 1234 to the network 600. In another example, the electronic device 101 may transmit a message including information indicating a larger bandwidth to the network 600. The network 600 may determine a change to the BWP 1233 or the BWP 1234 based on the message received from the electronic device 101. The network 600 may transmit a DCI for changing to the BWP 1233 or BWP 1234 to the electronic device 101. The electronic device 101 may communicate with the network 600 through the BWP 1233 or the BWP 1234 based on DCI. In one example, the electronic device 101 may change the bandwidth in the order of, e.g., the BWP 1231, BWP 1232, BWP 1233, and BWP 1234, but this is merely an example. The order of change is not limited. For example, it is possible to immediately change to the BWP 1233 or BWP 1234 while using the BWP 1231. In one example, the electronic device 101 may change the bandwidth in the order of, e.g., the BWP 1234, BWP 1233, BWP 1232, and BWP 1231, but this is merely an example. The order of change is not limited. For example, it is possible to immediately change to the BWP 1231 or BWP 1232 while using the BWP 1234.

Figure 13A:
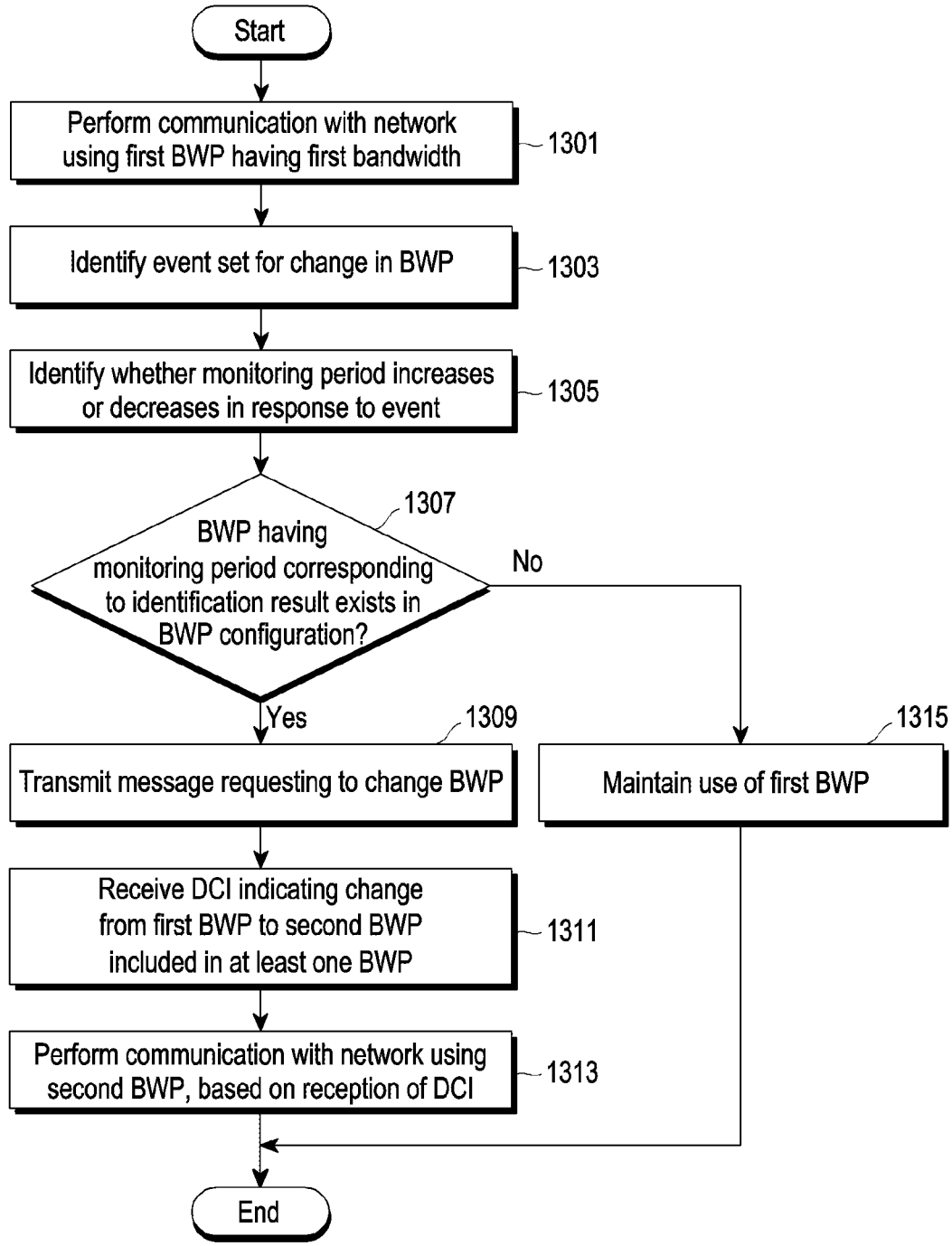
FIG. 13A is a flowchart illustrating an example method of operating an electronic device according to various embodiments.

FIG. 13A is a flowchart illustrating an example method of operating an electronic device according to various embodiments.

Referring to FIG. 13A, according to various embodiments, an electronic device 101 (e.g., at least one of the processor 120, the first communication processor 212, the second communication processor 214, or the integrated communication processor 260) may perform communication with the network 600 using the first BWP having a first monitoring period in operation 1301. In operation 1303, the electronic device 101 may identify the event set to change the BWP. In operation 1305, the electronic device 101 may identify whether the monitoring period increases or decreases in response to the event. For example, if an event that the type of the PDU session is URLLC is detected, the electronic device 101 may identify that decreasing the monitoring period is required. For example, if low battery is detected, the electronic device 101 may identify that increasing the monitoring period is required. In operation 1307, the electronic device 101 may identify whether a BWP having a monitoring period corresponding to the identification result exists in the BWP configuration (e.g., downlinkBWP-ToAddModList and/or uplinkBWP-ToAddModList). For example, if an event requiring that the monitoring period be reduced is detected, the electronic device 101 may identify whether there is another BWP having a smaller monitoring period than the first BWP being currently used in the BWP configuration. For example, if an event requiring that the monitoring period be increased is detected, the electronic device 101 may identify whether another BWP having a larger monitoring period than the first BWP being currently used exists in the BWP configuration. For example, the electronic device 101 may identify the monitoring period of each BWP based on the slot value of monitoringSlotPeriodictyAndOffset. If a plurality of SearchSpace's are matched to one BWP, the electronic device 101 may identify the average of the monitoring periods (e.g., monitoringSlotPeriodicty AndOffset value) of the plurality of SearchSpace's as the monitoring period of one BWP. If a BWP having the monitoring period corresponding to the result of identification exists in the BWP configuration (Yes in 1307), the electronic device 101 may transmit a message requesting to change the BWP to the network 600 in operation 1309. For example, the electronic device 101 may transmit a message including identification information about the identified BWP to the network 600. As another example, the electronic device 101 may transmit, to the network 600, a message including information indicating the required BWP attribute (e.g., either an increase or decrease in monitoring period). The network 600 may identify that it is required to change to a BWP having a different monitoring period from the BWP currently used by the network 600 and the electronic device 101 (e.g., either a BWP having a larger monitoring period or a BWP having a smaller monitoring period), based on reception of any one of the messages according to various examples as described above. The network 600 may transmit DCI for changing to the identified BWP to the electronic device 101. In operation 1311, the electronic device 101 may receive the DCI indicating a change from the first BWP to the second BWP included in the at least one BWP included in the BWP configuration. For example, the second BWP may have a different monitoring period from the first BWP (e.g., either a BWP having a larger monitoring period or a BWP having a smaller monitoring period). In operation 1313, the electronic device 101 may perform communication with the network 600 using the second BWP based on reception of the DCI. If a BWP having a monitoring period corresponding to the result of identification does not exist in the BWP configuration (No in 1307), the electronic device 101 may maintain use of the first BWP in operation 1315.

Figure 13B:
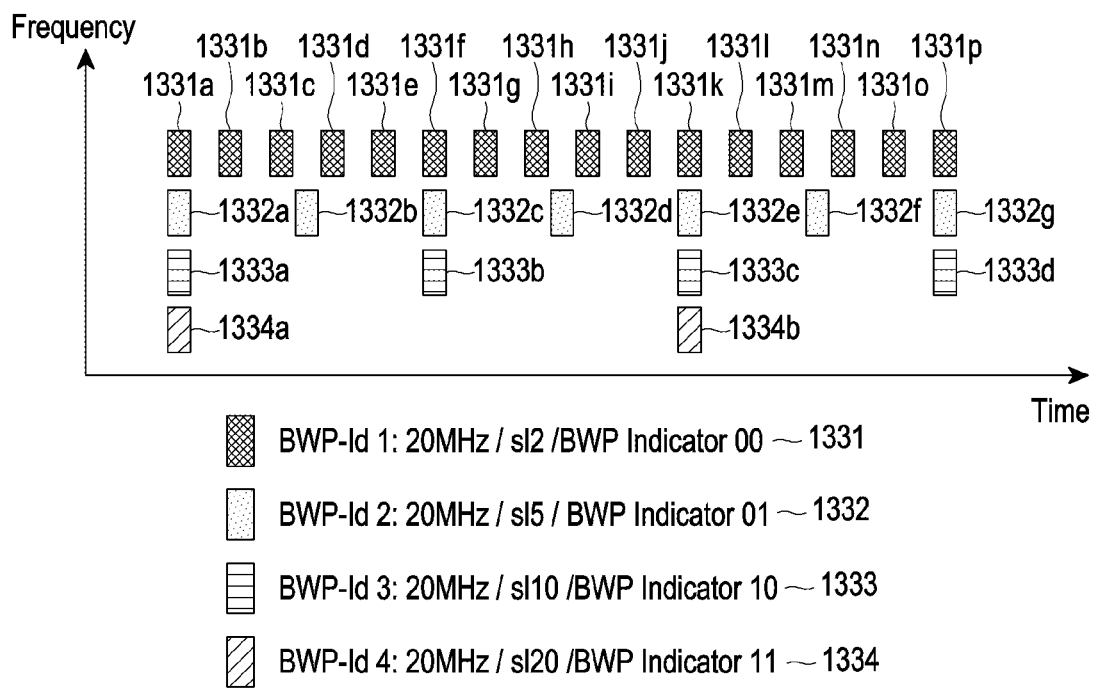
FIG. 13B is a diagram illustrating BWPs available according to various embodiments.

FIG. 13B is a diagram illustrating BWPs available according to various embodiments.

For example, FIG. 13B illustrates BWPs 1331, 1332, 1333, and 1334 that are configured by the network 600 and may be used (or switched to) by the electronic device 101. The first BWP 1331 may have a BWP Id of "1," a bandwidth of 20 MHz, a monitoring period of 2 slots, and a BWP indicator of 00. The second BWP 1332 may have a BWP Id of "2," a bandwidth of 20 MHz, a monitoring period of 5 slots, and a BWP indicator of 01. The third BWP 1333 may have a BWP Id of "3," a bandwidth of 20 MHz, a monitoring period of 10 slots, and a BWP indicator of 10. The fourth BWP 1334 may have a BWP Id of "4," a bandwidth of 20 MHz, a monitoring period of 20 slots, and a BWP indicator of 11. Meanwhile, although it is assumed in FIG. 13B that one CORESET and one SearchSpace are matched with one BWP, this is merely an example, and it will be appreciated by one of ordinary skill in the art that the numbers of CORESETs and SearchSpace's matched with one BWP are not limited. Based on the BWP 1331, first RBs 1331a, second RBs 1331b, third RBs 1331c, fourth RBs 1331d, fifth RBs 1331e, sixth RBs 1331f, seventh RBs 1331g, eighth RBs 1331h, ninth RBs 1331i, tenth RBs 1331j, eleventh RBs 1331k, twelfth RBs 1331l, thirteenth RBs 1331m, fourteenth RBs 1331n, fifteenth RBs 1331o, and sixteenth RBs 1331p may be defined. Based on the BWP 1332, seventeenth RBs 1332a, eighteenth RBs 1332b, nineteenth RBs 1332c, twentieth RBs 1332d, twenty first RBs 1332e, twenty second RBs 1332f, and twenty third RBs 1332g may be defined. Based on the BWP 1333, twenty fourth RBs 1333a, twenty fifth RBs 1333b, twenty sixth RBs 1333c, and twenty seventh RBs 1333d may be defined. Based on the BWP 1334, twenty eighth RBs 1334a and twenty ninth RBs 1334b may be defined.

For example, it is assumed that the electronic device 101 uses the BWP 1332. The electronic device 101 may detect an event requiring a smaller monitoring period while using the BWP 1332. The electronic device 101 may request the network 600 to change the BWP based on the existence of the BWP 1331, which is a BWP having a smaller monitoring period than the BWP 1332. As described above, in one example, the electronic device 101 may transmit a message including identification information about the BWP 1331 to the network 600. In another example, the electronic device 101 may transmit a message including information indicating a smaller monitoring period to the network 600. The network 600 may determine a change to the BWP 1331 based on the message received from the electronic device 101. The network 600 may transmit a DCI for changing to the BWP 1331 to the electronic device 101. The electronic device 101 may communicate with the network 600 using the BWP 1331 based on DCI. Alternatively, the electronic device 101 may detect an event requiring a larger monitoring period while using the BWP 1332. The electronic device 101 may request the network 600 to change the BWP based on the existence of the BWP 1333.1334, which is a BWP having a larger monitoring period than the BWP 1332. As described above, in one example, the electronic device 101 may transmit a message including identification information about the BWP 1333 or the BWP 1334 to the network 600. In another example, the electronic device 101 may transmit a message including information indicating a larger monitoring period to the network 600. The network 600 may determine a change to the BWP 1333 or the BWP 1334 based on the message received from the electronic device 101. The network 600 may transmit a DCI for changing to the BWP 1333 or BWP 1334 to the electronic device 101. The electronic device 101 may communicate with the network 600 through the BWP 1333 or the BWP 1334 based on DCI. In one example, the electronic device 101 may change the bandwidth in the order of, e.g., the BWP 1331, BWP 1332, BWP 1333, and BWP 1334, but this is merely an example. The order of change is not limited. For example, it is possible to immediately change to the BWP 1333 or BWP 1334 while using the BWP 1331. In one example, the electronic device 101 may change the bandwidth in the order of, e.g., the BWP 1334, BWP 1333, BWP 1332, and BWP 1331, but this is merely an example. The order of change is not limited. For example, it is possible to immediately change to the BWP 1331 or BWP 1332 while using the BWP 1334.

Figure 14A:
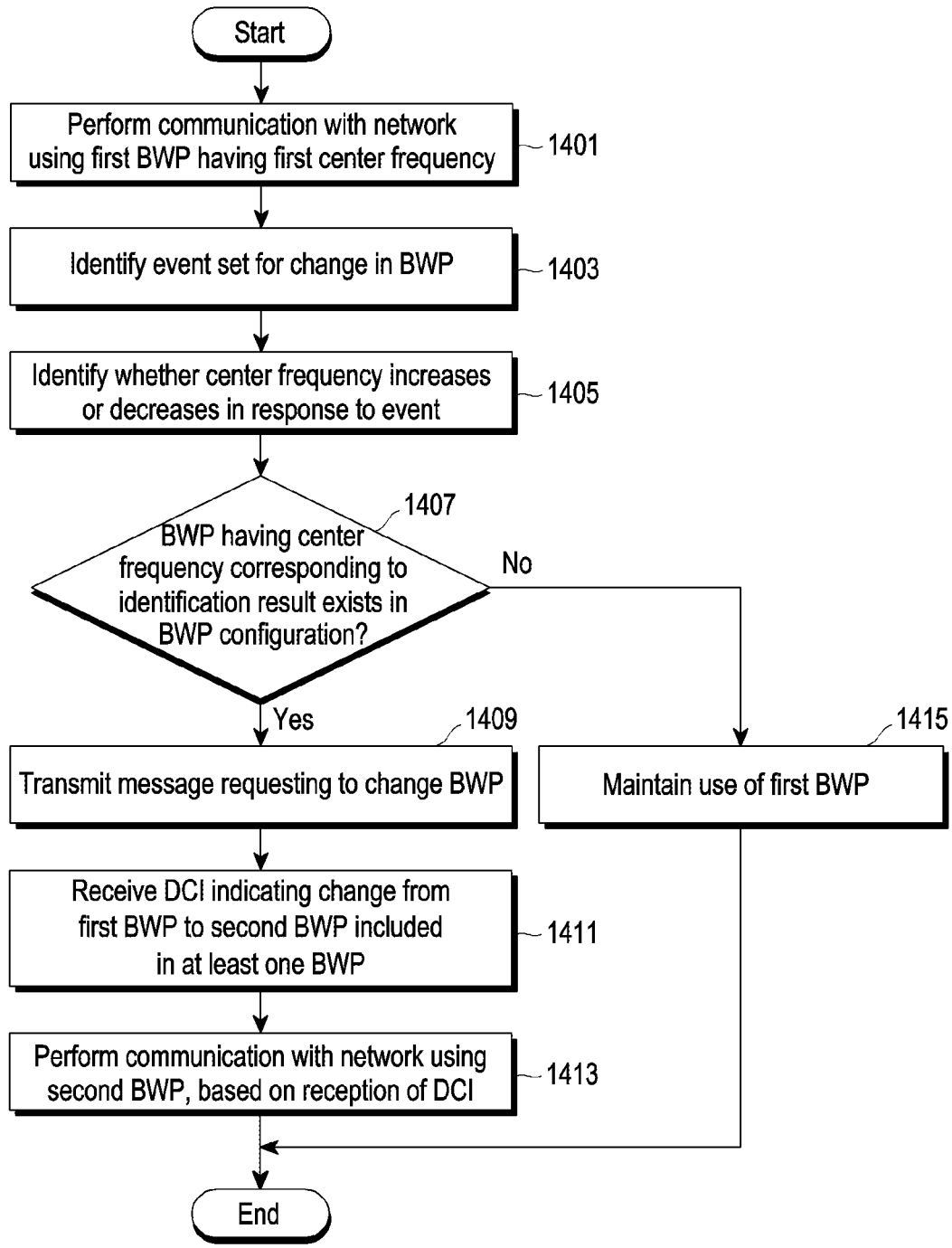
FIG. 14A is a flowchart illustrating an example method of operating an electronic device according to various embodiments.

FIG. 14A is a flowchart illustrating an example method of operating an electronic device according to various embodiments.

Referring to FIG. 14A, according to various embodiments, an electronic device 101 (e.g., at least one of the processor 120, the first communication processor 212, the second communication processor 214, or the integrated communication processor 260) may perform communication with the network 600 using the first BWP having a first center frequency in operation 1401. In operation 1403, the electronic device 101 may identify the event set to change the BWP. In operation 1405, the electronic device 101 may identify whether the center frequency increases or decreases in response to the event. For example, if the condition indicating that communication quality (e.g., BLER or SINR) is good is not met, the electronic device 101 may identify that a reduction in center frequency is required. In one example, the condition indicating that communication quality is good may be when the PUSCH BLER is less than a threshold BLER (e.g., 20%) even when the transmit power of PUSCH is the maximum value (e.g., 23 dBm). In another example, the condition indicating that communication quality is good may be when the SINR of PDSCH is a threshold SINR (e.g., 0 dB) or more. For example, if the condition indicating that communication quality is good is met, the electronic device 101 may identify that an increase in center frequency is required. In operation 1407, the electronic device 101 may identify whether a BWP having a center frequency corresponding to the identification result exists in the BWP configuration (e.g., downlinkBWP-ToAddModList and/or uplinkBWP-ToAddModList). For example, if an event requiring that the center frequency be reduced is detected, the electronic device 101 may identify whether there is another BWP having a smaller center frequency than the first BWP being currently used in the BWP configuration. For example, if an event requiring that the center frequency be increased is detected, the electronic device 101 may identify whether another BWP having a larger center frequency than the first BWP being currently used exists in the BWP configuration.

If a BWP having the center frequency corresponding to the result of identification exists in the BWP configuration (Yes in 1407), the electronic device 101 may transmit a message requesting to change the BWP to the network 600 in operation 1409. For example, the electronic device 101 may transmit a message including identification information about the identified BWP to the network 600. As another example, the electronic device 101 may transmit, to the network 600, a message including information indicating the required BWP attribute (e.g., either an increase or decrease in center frequency). The network 600 may identify that it is required to change to a BWP having a different center frequency from the BWP currently used by the network 600 and the electronic device 101 (e.g., either a BWP having a larger center frequency or a BWP having a smaller center frequency), based on reception of any one of the messages according to various examples as described above. The network 600 may transmit DCI for changing to the identified BWP to the electronic device 101. In operation 1411, the electronic device 101 may receive the DCI indicating a change from the first BWP to the second BWP included in the at least one BWP included in the BWP configuration. For example, the second BWP may have a different center frequency from the first BWP (e.g., either a BWP having a larger center frequency or a BWP having a smaller center frequency). In operation 1413, the electronic device 101 may perform communication with the network 600 using the second BWP based on reception of the DCI. If a BWP having a center frequency corresponding to the result of identification does not exist in the BWP configuration (No in 1407), the electronic device 101 may maintain use of the first BWP in operation 1415. As described above, it is possible to mitigate influence by downlink interference due to the signal from the adjacent base station using the same BWP at the cell boundary or by uplink interference due to the transmission signals from electronic devices connected to the adjacent base station using the same BWP.

Figure 14B:
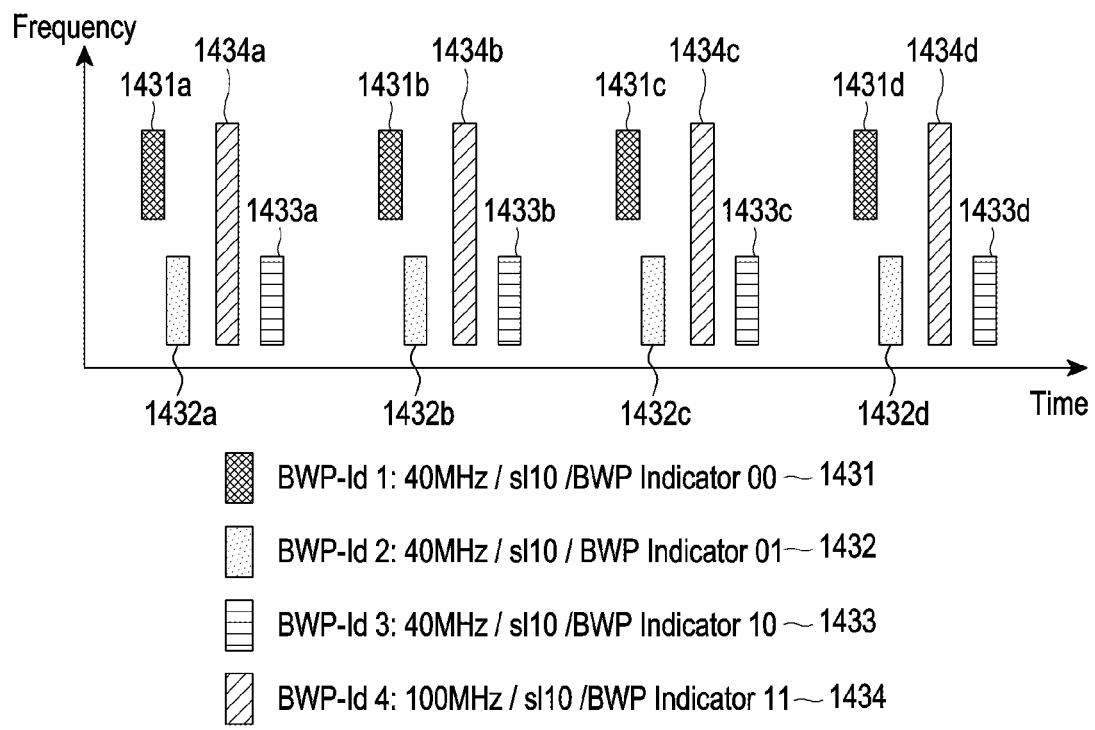
FIG. 14B is a diagram illustrating BWPs available according to various embodiments.

FIG. 14B is a diagram illustrating BWPs available according to various embodiments.

For example, FIG. 14B illustrates BWPs 1431, 1432, 1433, and 1434 that are configured by the network 600 and may be used (or switched to) by the electronic device 101. The first BWP 1431 may have a BWP Id of "1," a bandwidth of 40 MHz of a first center frequency, a monitoring period of 10 slots, and a BWP indicator of 00. The second BWP 1432 may have a BWP Id of "2," a bandwidth of 40 MHz of a second center frequency, a monitoring period of 10 slots, and a BWP indicator of 01. The third BWP 1433 may have a BWP Id of "3," a bandwidth of 40 MHz of a third center frequency, a monitoring period of 10 slots, and a BWP indicator of 10. The fourth BWP 1434 may have a BWP Id of "4," a bandwidth of 100 MHz of a fourth center frequency, a monitoring period of 10 slots, and a BWP indicator of 11. The BWPs 1431, 1432, 1433, and 1434 may be BWPs configured in downlinkBWP-ToAddModList, and the BWP indicator is as described in connection with, e.g., Table 5. Meanwhile, although it is assumed in FIG. 14B that one CORESET and one SearchSpace are matched with one BWP, this is merely an example, and it will be appreciated by one of ordinary skill in the art that the numbers of CORESETs and SearchSpace's matched with one BWP are not limited. Based on the BWP 1431, first RBs 1431a, second RBs 1431b, third RBs 1431c, and fourth RBs 1431d may be defined. Based on the BWP 1432, fifth RBs 1432a, sixth RBs 1432b, seventh RBs 1432c, and eighth RBs 1432d may be defined. Based on the BWP 1433, ninth RBs 1433a, tenth RBs 1433b, eleventh RBs 1433c, and twelfth RBs 1433d may be defined. Based on the BWP 1434, thirteenth RBs 1434a, fourteenth RBs 1434b, fifteenth RBs 1434c, and sixteenth RBs 1434d may be defined.

For example, it is assumed that the electronic device 101 uses the BWP 1433. The electronic device 101 may detect an event requiring a smaller center frequency while using the BWP 1433. The electronic device 101 may request the network 600 to change the BWP based on the existence of the BWP 1432, which is a BWP having a smaller center frequency than the BWP 1433. As described above, in one example, the electronic device 101 may transmit a message including identification information about the BWP 1432 to the network 600. In another example, the electronic device 101 may transmit a message including information indicating a smaller center frequency to the network 600. The network 600 may determine a change to the BWP 1432 based on the message received from the electronic device 101. The network 600 may transmit a DCI for changing to the BWP 1432 to the electronic device 101. The electronic device 101 may communicate with the network 600 using the BWP 1432 based on DCI. Alternatively, the electronic device 101 may detect an event requiring a larger center frequency while using the BWP 1433. The electronic device 101 may request the network 600 to change the BWP based on the existence of the BWP 1431, which is a BWP having a larger center frequency than the BWP 1433. As described above, in one example, the electronic device 101 may transmit a message including identification information about the BWP 1431 to the network 600. In another example, the electronic device 101 may transmit a message including information indicating a larger bandwidth to the network 600. The network 600 may determine a change to the BWP 1431 based on the message received from the electronic device 101. The network 600 may transmit a DCI for changing to the BWP 1431 to the electronic device 101. The electronic device 101 may communicate with the network 600 using the BWP 1431 based on DCI. In one example, the electronic device 101 may change the bandwidth in the order of, e.g., the BWP 1431, BWP 1432, and BWP 1433, but this is merely an example. The order of change is not limited. For example, it is possible to immediately change to the BWP 1433 while using the BWP 1431. In one example, the electronic device 101 may change the bandwidth in the order of, e.g., the BWP 1433, BWP 1432, and BWP 1431, but this is merely an example. The order of change is not limited. For example, it is possible to immediately change to the BWP 1431 while using the BWP 1433.

Figure 15:
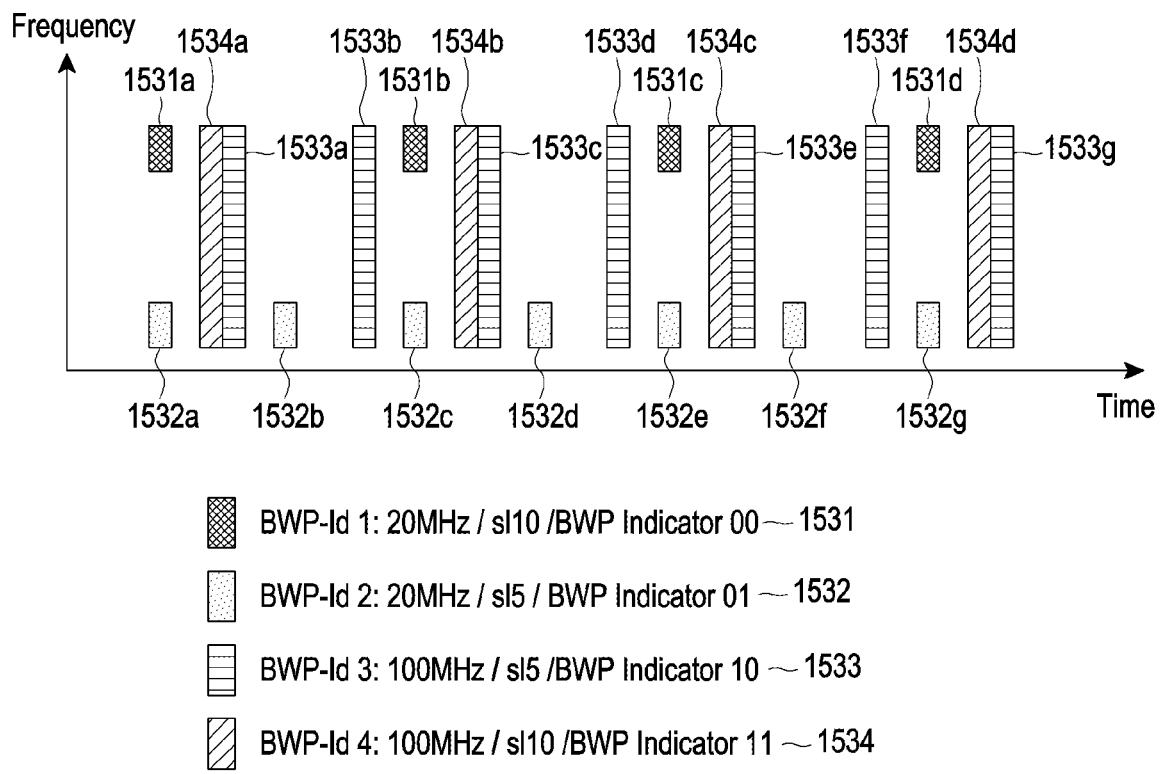
FIG. 15 is a diagram illustrating BWPs available according to various embodiments.

FIG. 15 is a diagram illustrating BWPs available according to various embodiments.

For example, FIG. 15 illustrates BWPs 1531, 1532, 1533, and 1534 that are configured by the network 600 and may be used (or switched to) by the electronic device 101. The first BWP 1531 may have a BWP Id of "1," a bandwidth of 20 MHz of a first center frequency, a monitoring period of 10 slots, and a BWP indicator of 00. The second BWP 1532 may have a BWP Id of "2," a bandwidth of 20 MHz of a second center frequency, a monitoring period of 5 slots, and a BWP indicator of 01. The third BWP 1533 may have a BWP Id of "3," a bandwidth of 100 MHz of a third center frequency, a monitoring period of 5 slots, and a BWP indicator of 10. The fourth BWP 1534 may have a BWP Id of "4," a bandwidth of 100 MHz of a third center frequency, a monitoring period of 10 slots, and a BWP indicator of 11.

The BWPs 1531, 1532, 1533, and 1534 may be BWPs configured in downlinkBWP-ToAddModList, and the BWP indicator is as described in connection with, e.g., Table 5. Meanwhile, although it is assumed in FIG. 15 that one CORESET and one SearchSpace are matched with one BWP, this is merely an example, and it will be appreciated by one of ordinary skill in the art that the numbers of CORESETs and SearchSpace's matched with one BWP are not limited. Based on the BWP 1531, first RBs 1531a, second RBs 1531b, third RBs 1531c, and fourth RBs 1531d may be defined. Based on the BWP 1532, fifth RBs 1532a, sixth RBs 1532b, seventh RBs 1532c, eighth RBs 1532d, ninth RBs 1532e, tenth RBs 1532f, and eleventh RBs 1532g may be defined. Based on the BWP 1533, twelfth RBs 1533a, thirteenth RBs 1533b, fourteenth RBs 1533c, fifteenth RBs 1533d, sixteenth RBs 1533e, seventeenth RBs 1533f, and eighteenth RBs 1533g may be defined. Based on the BWP 1534, nineteenth RBs 1534a, twentieth RBs 1534b, twenty first RBs 1534c, and twenty second RBs 1534d may be defined.

According to various embodiments, the electronic device 101 may identify that an increase in the bandwidth of the BWP and/or an increase in the monitoring period for PDCCH is required to release the over-temperature state or save power. The electronic device 101 may request the network 600 to change BWPs in a first order of "4," "3," "2," and "1," a second order of "4," "2," and "1," a third order of "4," "3," and "1," a fourth order of "3" and "1," a fifth order of "4" and "2," or a sixth order of "3" and "1" based on, e.g., BWP-Id. Here, the electronic device 101 may perform change to the BWP meeting the attribute of any one of a decrease in bandwidth and an increase in monitoring period for PDCCH, but the order is not limited. Meanwhile, the electronic device 101 may perform a change of increasing only the monitoring period of PDCCH (e.g., the seventh order of "3" and "4" or the eighth order of "1" and "2" based on BWP-Id) to reduce communication latency. Meanwhile, the electronic device 101 may perform a change of increasing the bandwidth based on demand for high-volume traffic (e.g., the ninth order of "1" and "3" or the tenth order of "2" and "4" based on BWP-Id).

Embodiments in which a change in BWP is performed based on various events are described below, and context for each embodiment is as shown in Table 7.

TABLE 7

-First embodiment: When an over temperature state C1 or low battery C2 is detected
-Second embodiment: When both C1 and C2 are detected
-Third embodiment: When C1 and C2 are not detected, but application corresponding to designated type (C3) is detected
-Fourth embodiment: When C1 and C2 are not detected, but PDU session (or network slice) corresponding to designated type (C4) is detected
-Fifth embodiment: When C1 and C2 are not detected, but C3 and C4 both are detected
-Sixth embodiment: When C1, C2, C3, and C4 are not detected, but traffic-associated information meeting designated condition (C5) is detected For example, in the non-stand alone (NSA) mode, the electronic device 101 may be implemented to perform the operation (e.g., SCG release) of releasing the 5G cell (or NR cell) where it camped on (or connected) to release the over-temperature state. Or, in the stand alone (SA) mode, the electronic device 101 may be implemented to release registration to 5GS (or 5GC) or connection to NR and perform fallback (e.g., system fallback or RAT fallback) to EPS (or EPC) or E-UTRA. According to various embodiments, the electronic device 101 may be implemented to first perform the above-described BWP change before performing SCG release or fallback operation. Each embodiment disclosed in Table 7 is described below.

First example: When an over temperature state C1 or low battery C2 is detected.

According to various embodiments, the processor 120 of the electronic device 101 may identify that the event of the over-temperature state C1 is detected based on the identified temperature being the threshold temperature or more. Based on the vent of the over-temperature state C1, the processor 120 may provide an indication corresponding thereto to the communication processor (e.g., at least one of the first communication processor 212, the second communication processor 214, or the integrated communication processor 260). Based on identifying that the identified remaining battery level is the threshold level, the processor 120 may identify that the event of low battery C2 is detected. Based on detection of the event of low battery C2, the processor 120 may provide an indication corresponding thereto to the communication processor (e.g., at least one of the first communication processor 212, the second communication processor 214, or the integrated communication processor 260).

According to various embodiments, the communication processor (e.g., at least one of the first communication processor 212, the second communication processor 214, or the integrated communication processor 260) may be implemented to transmit, to the network 600, a UEAssistanceInformation message to address (or mitigate) low battery or the over-temperature state before attempting to change the BWP. The UEAssistanceInformation message may limit the max number of CCs of the electronic device 101, max aggregated bandwidth size, or max number of layers. The electronic device 101 may transmit the UEAssistanceInformation message, in which at least one of the max number of CCs, max aggregated bandwidth size, or max number of layers is adjusted (e.g., set to the minimum value), to the network 600 before attempting to change the BWP, thereby attempting to address (or mitigate) the over-temperature state or low battery before changing the BWP. Meanwhile, the event of the over-temperature state C1 or the event of low battery C2 may still be detected even by performing the operation of adjusting the value of the IE of the UEAssistanceInformation message described above. In this case, the communication processor (e.g., at least one of the first communication processor 212, the second communication processor 214, or the integrated communication processor 260) may attempt the above-described BWP change. Meanwhile, adjusting the value of the IE of the UEAssistanceInformation message before attempting BWP change is merely an example, and it will be appreciated by one of ordinary skill in the art that the performing order may be changed.

As described above, the electronic device 101 may attempt to change the BWP to address (or mitigate) the over-temperature state or low battery. In one example, the electronic device 101 may request the network 600 to change to the BWP having a relatively small bandwidth as shown in FIG. 12B. For example, BWPs 1231, 1232, 1233, and 1234 as shown in FIG. 12B are configured, and while the electronic device 101 uses the BWP 1234, the event of the over-temperature state C1 or the event of low battery C2 may be detected. The electronic device 101 may first attempt to change from the BWP 1234 to the BWP 1233. Even after the change to the BWP 1233, if the event of the over-temperature state C1 or the event of low battery C2 is detected, the electronic device 101 may attempt to change from the BWP 1233 to the BWP 1232. Meanwhile, the sequential change to the BWP 1234, BWP 1233, BWP 1232, and BWP 1231 as described above is merely an example, and the electronic device 101 may attempt to immediately change from the BWP 1234 to the BWP 1232 or the BWP 1231. Meanwhile, if the electronic device 101 already uses the BWP 1231 with the smallest bandwidth, the electronic device 101 may not attempt to change the BWP.

In another example, the electronic device 101 may request the network 600 to change to the BWP having a relatively long monitoring period, as shown in FIG. 13B. For example, BWPs 1331, 1332, 1333, and 1334 as shown in FIG. 13B are configured, and while the electronic device 101 uses the BWP 1234, the event of the over-temperature state C1 or the event of low battery C2 may be detected. The electronic device 101 may first attempt to change from the BWP 1331 to the BWP 1332. Even after the change to the BWP 1332, if the event of the over-temperature state C1 or the event of low battery C2 is detected, the electronic device 101 may attempt to change from the BWP 1332 to the BWP 1333. Meanwhile, the sequential change to the BWP 1331, BWP 1332, BWP 1333, and BWP 1334 as described above is merely an example, and the electronic device 101 may attempt to immediately change from the BWP 1331 to the BWP 1333 or the BWP 1334. Meanwhile, if the electronic device 101 already uses the BWP 1334 with the smallest monitoring period, the electronic device 101 may not attempt to change the BWP.

In another example, as shown in FIG. 15, the electronic device 101 may be configured with the BWPs 1531, 1532, 1533, and 1534 having various bandwidths and monitoring periods. The electronic device 101 may determine the change order through the calculation result for each of the BWPs 1531, 1532, 1533, and 1534. For example, according to a bandwidth change from 100 MHz to 20 MHz, the electronic device 101 may calculate the rate of change in the amount of heat generation as −80%. The electronic device 101 may calculate the rate of change in the amount of heat generation as −80% based on the equation of the inverse relationship between the bandwidth and the amount of heat generation, but the calculation method is not limited. For example, the electronic device 101 may calculate the rate of change in the amount of heat generation as −50% according to the change in monitoring period from five slots to ten slots. The electronic device 101 may calculate the rate of change in the amount of heat generation as −50% based on the equation of the inverse relationship between the monitoring period and the amount of heat generation, but the calculation method is not limited. The electronic device 101 may determine the change order of the BWP based on the calculation result of the rate of change in the amount of heat generation considering both the bandwidth and the monitoring period. Or, the electronic device 101 may allocate a priority to the data throughput and first attempt to increase the monitoring period rather than decreasing the bandwidth. Alternatively, the electronic device 101 may allocate a priority to the data low latency and first attempt to reduce the bandwidth rather than increasing the monitoring period.

According to various embodiments, the electronic device 101 may identify that the event of the over-temperature state C1 or the event of low battery C2 is released (e.g., failure in detection). For example, if the temperature is less than the threshold temperature or remaining battery level is less than the threshold level, the electronic device 101 may attempt to return to the existing BWP. Or, if it is identified that the temperature is less than the threshold temperature or the remaining battery level is less than the threshold level, and the timer as described in connection with FIG. 11 expires, a return to the existing BWP may be attempted. Or, as described above, a plurality of thresholds to have a hysteresis characteristic may be set. In this case, if the temperature is not more than a lower threshold temperature limit among the plurality of thresholds having the hysteresis characteristic or the remaining battery level is an upper threshold level limit among the plurality of thresholds, the electronic device 101 may attempt to return to the existing BWP.

Second Example: When Both C1 and C2 are Detected

According to various embodiments, the processor 120 of the electronic device 101 may identify that the event of the over-temperature state C1 and the event of low battery C2 are at least simultaneously detected based on the identified temperature being the threshold temperature or more. For example, the electronic device 101 may detect an occurrence of another event before release of detection is identified after any one of the two events is detected. In this case, the electronic device 101 may attempt the change of omitting the intermediate step of BWP, rather than attempting a sequential BWP change as described in connection with the first embodiment. For example, the electronic device 101 may attempt to change to the BWP to minimize/reduce heat generation or power consumption (e.g., the BWP 1231 of FIG. 12B, the BWP 1334 of FIG. 13B, or the BWP 1531 of FIG. 15). Meanwhile, this is merely an example, and the electronic device 101 may attempt a sequential BWP change.

Third Example: When C1 and C2 are not Detected, but Application Corresponding to Designated Type (C3) is Detected According to various embodiments, the processor 120 of the electronic device 101 may transmit identification information (e.g., app ID) about the running application to the communication processor (e.g., at least one of the first communication processor 212, the second communication processor 214, or the integrated communication processor 260). The communication processor (e.g., at least one of the first communication processor 212, the second communication processor 214, or the integrated communication processor 260) may identify whether a designated type of application is running based on application identification information in a state in which the event of the over-temperature state C1 and the vent of low battery C2 are not detected. Or, when the designated type of application is running, the processor 120 may provide an indication therefor (e.g., Low_latency or Narrow_BW) to the communication processor (e.g., at least one of the first communication processor 212, the second communication processor 214, or the integrated communication processor 260). For example, a video streaming application may be of the designated type, but the type is not limited.

According to various embodiments, the communication processor (e.g., at least one of the first communication processor 212, the second communication processor 214, or the integrated communication processor 260) may identify the attribute of the required BWP. For example, since the video streaming application requires low latency, the communication processor (e.g., at least one of the first communication processor 212, the second communication processor 214, or the integrated communication processor 260) may identify a relatively short monitoring period as the attribute of the BWP. For example, as in the example of FIG. 13B, a change to the order of the BWP 1334, BWP 1333, BWP 1332, and BWP 1331 may be performed. Alternatively, as an example, as in the example of FIG. 15, a change from the BWP 1534 to the BWP 1533 or a change from the BWP 1431 to the BWP 1432 may be performed.

According to various embodiments, the processor 120 may provide application group identification information (e.g., app group ID) to the communication processor (e.g., at least one of the first communication processor 212, the second communication processor 214, or the integrated communication processor 260). The application group identification information may be divided into, e.g., "low latency group" according to the attribute required by the application. The communication processor (e.g., at least one of the first communication processor 212, the second communication processor 214, or the integrated communication processor 260) may identify the attribute of the BWP required based on the application group identification information.

If the designated type of application terminates execution, the processor 120 may notify the communication processor (e.g., at least one of the first communication processor 212, the second communication processor 214, or the integrated communication processor 260) of this, and the communication processor (e.g., at least one of the first communication processor 212, the second communication processor 214, or the integrated communication processor 260) may attempt to return to the BWP based thereupon.

Fourth Example: When C1 and C2 are not Detected, but PDU Session (or Network Slice) Corresponding to Designated Type (C4) is Detected According to various embodiments, the communication processor (e.g., at least one of the first communication processor 212, the second communication processor 214, or the integrated communication processor 260) may detect the event that the PDU session (or network slice) corresponds to a designated type (C4) in a state in which the event of the over-temperature state C1 and the vent of low battery C2 are not detected. The communication processor (e.g., at least one of the first communication processor 212, the second communication processor 214, or the integrated communication processor 260) may identify the PDU session (or network slice) based on, e.g., the S-NSSAI of the PDU session. For example, the communication processor (e.g., at least one of the first communication processor 212, the second communication processor 214, or the integrated communication processor 260) may identify that a relatively short monitoring period is required when the SST is a value corresponding to URLLC or a value corresponding to V2X. For example, the communication processor (e.g., at least one of the first communication processor 212, the second communication processor 214, or the integrated communication processor 260) may identify that a relatively large bandwidth is required when the SST is a value corresponding to eMBB. If the corresponding PDU session is released, the communication processor (e.g., at least one of the first communication processor 212, the second communication processor 214, or the integrated communication processor 260) may identify that the event of C4 is released.

The communication processor (e.g., at least one of the first communication processor 212, the second communication processor 214, or the integrated communication processor 260) may detect the event of C4 based on QoS. For example, if the 5QI value in the QoS flow description of the PDU session matches the QoS ID requiring the low latency set in the electronic device 101, the communication processor (e.g., at least one of the first communication processor 212, the second communication processor 214, or the integrated communication processor 260) may identify that the C4 event is detected. 5QI may include 5QIs with a packet delay budget of 100 ms or less in the "standardized 5QI QoS characteristics mapping" table of 3GPP TS 23.501, but this is merely an example and is not limited. If the corresponding PDU session is released, it may be identified that the C4 event is released.

For example, if relatively low latency is required, as in the example of FIG. 13B, a change to the order of the BWP 1334, BWP 1333, BWP 1332, and BWP 1331 may be performed. Alternatively, as an example, as in the example of FIG. 15, a change from the BWP 1534 to the BWP 1533 or a change from the BWP 1431 to the BWP 1432 may be performed. For example, when a relatively large bandwidth is required, e.g., as in the example of FIG. 12B, a change to the order of the BWP 1231, BWP 1232, BWP 1233, and BWP 1234 may be performed or, as in the example of FIG. 15, a change from the BWP 1531 or BWP 1532 to the BWP 1533 or BWP 1534 may be performed.

Fifth Example: When C1 and C2 are not Detected, but C3 and C4 Both are Detected

According to various embodiments, the electronic device 101 may detect the event of the application corresponding to the designated type (C3) and the event of the PDU session (or network slice) corresponding to the designated type (C4) in a state in which the event of the over-temperature state (C1) and the event of low battery (C2) are not detected. The electronic device 101 may allocate a higher priority to one of the two events and attempt to change the BWP. For example, in this embodiment, it is assumed that the electronic device 101 allocates a higher priority to the event of the PDU session (or network slice) corresponding to the designated type (C4).

If both the C3 event and the C4 event require the attribute (e.g., a shorter monitoring period) of the same BWP, the electronic device 101 may be operated as described in connection with the third embodiment or fourth embodiment described above. Meanwhile, if a relatively long monitoring period is required by the C4 event in a state in which a change to the BWP having a relatively large bandwidth is performed by, e.g., the C3 event, the electronic device 101 may attempt to change from the BWP having a large bandwidth, being currently used, to the BWP having a relatively long monitoring period corresponding to the C4 event. As another example, if a relatively short monitoring period is required by the C4 event in a state in which a change to the BWP having a relatively small bandwidth is performed by the C3 event, the electronic device 101 may attempt to change from the BWP having a small bandwidth, being currently used, to the BWP having a relatively short monitoring period, corresponding to the C4 event. As another example, if a relatively short monitoring period is required by the C4 event in a state in which a change to the BWP having a relatively long monitoring period is performed by the C3 event, the electronic device 101 may attempt to change from the BWP having a large monitoring period, being currently used to the BWP having a relatively short monitoring period corresponding to the C4 event having a relatively higher priority. As another example, if a relatively long monitoring period is required by the C4 event in a state in which a change to the BWP having a relatively short monitoring period is performed by, e.g., the C3 event, the electronic device 101 may attempt to change from the BWP having a short monitoring period, being currently used, to the BWP having a relatively longer monitoring period corresponding to the C4 event.

Sixth Example: When C1, C2, C3, and C4 are not Detected, but Traffic-Associated Information Meeting Designated Condition (C5) is Detected According to various embodiments, the electronic device 101 may detect the event of the traffic-associated information meeting a designated condition (C5) in a state in which the event of the over-temperature state (C1), the event of low battery (C2), the application corresponding to the designated type (C3), and the PDU session (or network slice) corresponding to the designated type (C4) are not detected. If the electronic device 101 is in a data activity state in which data is relatively frequently transmitted/received, the electronic device 101 may maintain the BWP being currently used or attempt to change to the BWP having a relatively shorter monitoring period, so that the possibility of communication latency may be reduced. Meanwhile, if the electronic device 101 is in a data inactivity state in which data is relatively less transmitted/received, the electronic device 101 may attempt a change to the BWP having a relatively longer monitoring period, so that power consumption may be reduced.

In one example, the electronic device 101 may monitor the size of the packet transmitted and/or received with the network 600 on a per-predetermined time unit basis (e.g., one second) and, if a packet having a size larger than a specific size is transmitted and/or received more times than a threshold number of times, identify that it is in the data activity state. Monitoring of packets may be performed by, e.g., the processor 120 or the interface between the processor 120 and the communication processor, and an indication corresponding to the data activity state or data inactivity state may be provided to the communication processor (e.g., at least one of the first communication processor 212, the second communication processor 214, or the integrated communication processor 260). Or, packet monitoring may be measured by the higher layer (e.g., upper layer, NAS-U layer, or L3 layer) of the communication processor (e.g., at least one of the first communication processor 212, the second communication processor 214, or the integrated communication processor 260) or in the SN unit of PDCP in the communication processor (e.g., at least one of the first communication processor 212, the second communication processor 214, or the integrated communication processor 260).

According to an embodiment, upon identifying the data inactivity state, the electronic device 101 may perform BWP change in the order of the BWP 1234, BW 1233, BWP 1232, and BWP 1231 in FIG. 12B or in the order of the BWP 1331, BWP 1332, BWP 1333, and BWP 1334 in FIG. 13B. Thereafter, if the data activity state is identified, the electronic device 101 may maintain use of the current BWP or attempt to return to the existing BWP. Or, if another event (e.g., at least one of C1, C2, C3, or C4) is detected, the electronic device 101 may disregard the event of C5 and perform the operation corresponding to the detected event.

Figure 16A:
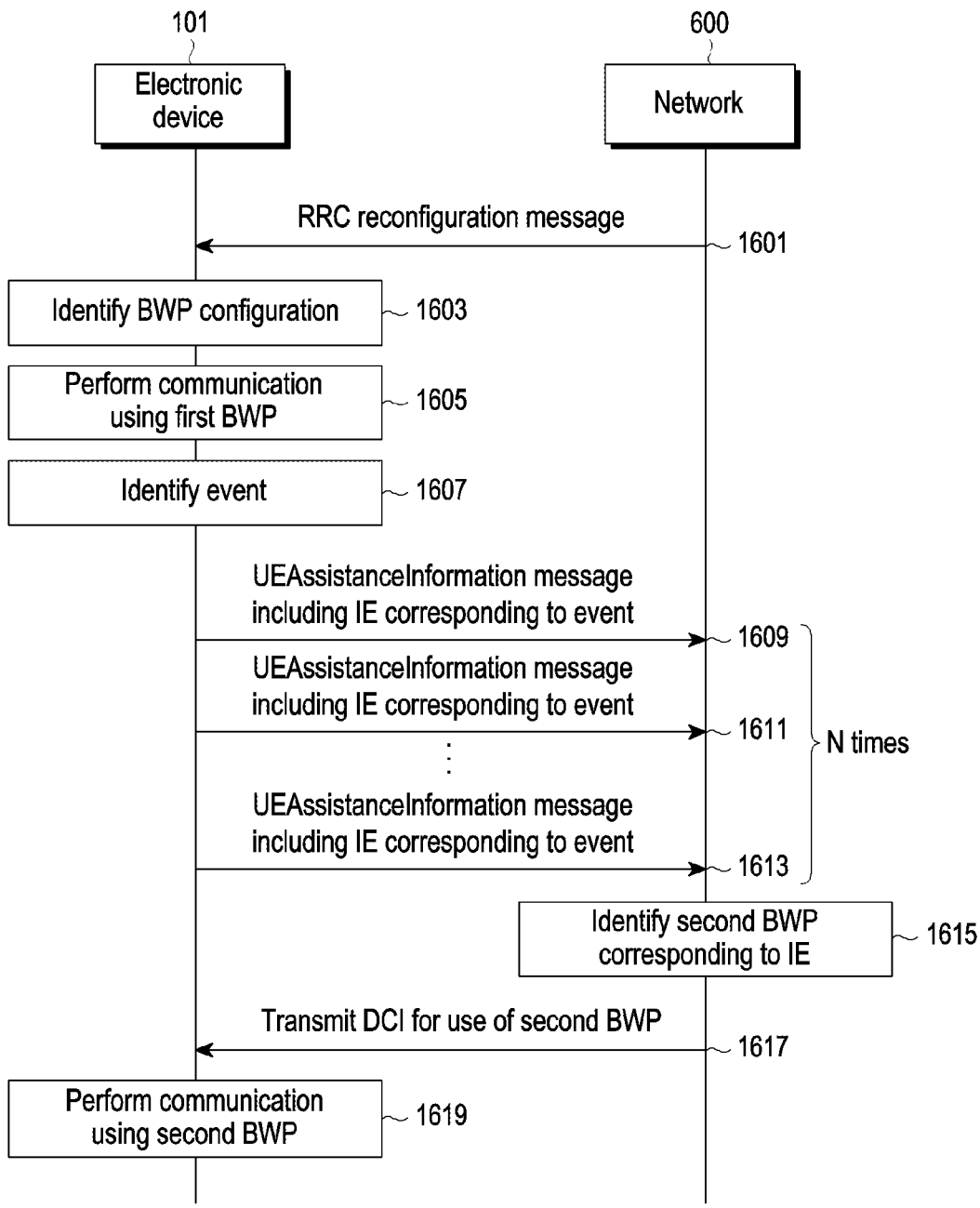
FIG. 16A is a signal flow diagram illustrating an example method of operating an electronic device and a network according to various embodiments.

FIG. 16A is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260)

may receive an RRC reconfiguration message in operation 1601. In operation 1603, the electronic device 101 may identify a BWP configuration. Based on the BWP configuration, at least one available BWP may be identified. In operation 1605, the electronic device 101 may perform communication with the network 600 using the first BWP. In operation 1607, the electronic device 101 may identify the event. As described above, the event is not limited as long as it leads a change in BWP.

According to various embodiments, the electronic device 101 may transmit the UEAssistanceInformation message including the IE corresponding to the event, N times, in operations 1609, 1611, and 1613. Upon identifying the UEAssistanceInformation message including the IE having a specific value N times, the network 600 may be configured to identify it as a BWP change request. The specific value of the IE may be used to identify the configuration of the BWP which is changed, for example. For example, the electronic device 101 and the network 600 may previously store association information between the IE and the required BWP configuration. Table 8 shows an example of association information between the IE and the required BW configuration.

TABLE 8

| IE and IE value | required BWP attribute |
|---|---|
| reducedCCsDL: 0 (or minimum value), or reducedCCsUL: 0 (or minimum value) | relatively longer monitoring period than existing |
| reducedCCsDL: 31 (or maximum value), or reducedCCsUL: 31 (or maximum value) | relatively shorter monitoring period than existing |
| reducedMaxBW-DL: 0 (or minimum value), or reducedMaxBW-UL: 0 (or minimum value) | relatively smaller bandwidth than existing |
| reducedMaxBW-DL: 400 (or maximum value), or reducedMaxBW-UL: 400 (or maximum value) | relatively larger bandwidth than existing |

For example, the network 600 may receive the UEAssistanceInformation message, in which the reducedCCsDL or the IE of the reducedCCsUL has a value of 0 (or minimum value), once, in which case the number of the DL Scell's of the electronic device 101 may be set to 0 (or minimum value). Meanwhile, upon receiving the UEAssistanceInformation message, in which the reducedCCsDL or the IE of the reducedCCsUL has a value of 0 (or minimum value), N times (where N is a natural number of 2 or more), the network 600 may identify that the electronic device 101 requests a change to the BWP having a relatively longer monitoring period than the existing one. For example, the network 600 may perform a change in the configuration corresponding to the first received UEAssistanceInformation message, for the UEAssistanceInformation message, and based on reception of it N times later, identify a request to change the BWP.

For example, the network 600 may receive the UEAssistanceInformation message, in which the reducedCCsDL or the IE of the reducedCCsUL has a value of 31 (or maximum value), once, in which case the number of the DL Scell's of the electronic device 101 may be set to 31 (or maximum value). Meanwhile, upon receiving the UEAssistanceInformation message, in which the reducedCCsDL or the IE of the reducedCCsUL has a value of 31 (or maximum value), N times, the network 600 may identify that the electronic device 101 requests a change to the BWP having a relatively shorter monitoring period than the existing one.

For example, the network 600 may receive the UEAssistanceInformation message, in which the reducedMaxBW-DL or the IE of the reducedMaxBW-UL has a value of 0 (or minimum value), once, in which case the maximum bandwidth (Max BW) of the electronic device 101 may be set to 0 (or minimum value). Meanwhile, upon receiving the UEAssistanceInformation message, in which the reducedMaxBW-DL or the IE of the reducedMaxBW-UL has a value of 0 (or minimum value), N times, the network 600 may identify that the electronic device 101 requests a change to the BWP having a relatively smaller bandwidth than the existing one.

For example, the network 600 may receive the UEAssistanceInformation message, in which the reducedMaxBW-DL or the IE of the reducedMaxBW-UL has a value of 400 (or maximum value), once, in which case the maximum bandwidth (Max BW) of the electronic device 101 may be set to 400 MHZ (or maximum value). Meanwhile, upon receiving the UEAssistanceInformation message, in which the reducedMaxBW-DL or the IE of the reducedMaxBW-UL has a value of 400 (or maximum value), N times, the network 600 may identify that the electronic device 101 requests a change to the BWP having a relatively larger bandwidth than the existing one. Meanwhile, the IE and the IE value described above in connection with Table 8 are merely an example, and it will be appreciated by one of ordinary skill in the art that the type of IE to indicate the specific attribute of the BWP and/or its value is not limited. Upon receiving the UEAssistanceInformation message including the IE having a specific value in, e.g., a specific time, N times (continuous reception or discontinuous reception), the network 600 may identify that the electronic device 101 requests to change the BWP. Or, upon continuously receiving the UEAssistanceInformation message including the IE having the specific value N times, the network 600 may identify that the electronic device 101 requests to change the BWP.

According to various embodiments, in operation 1615, the network 600 may identify the second BWP corresponding to the IE. The network 600 may select the second BWP having the attribute identified based on the value included in the IE among the BWPs available to the electronic device 101. In operation 1617, the network 600 may transmit a DCI for using the second BWP to the electronic device 101. In operation 1619, the electronic device 101 may perform communication with the network 600 using the second BWP.

Figure 16B:
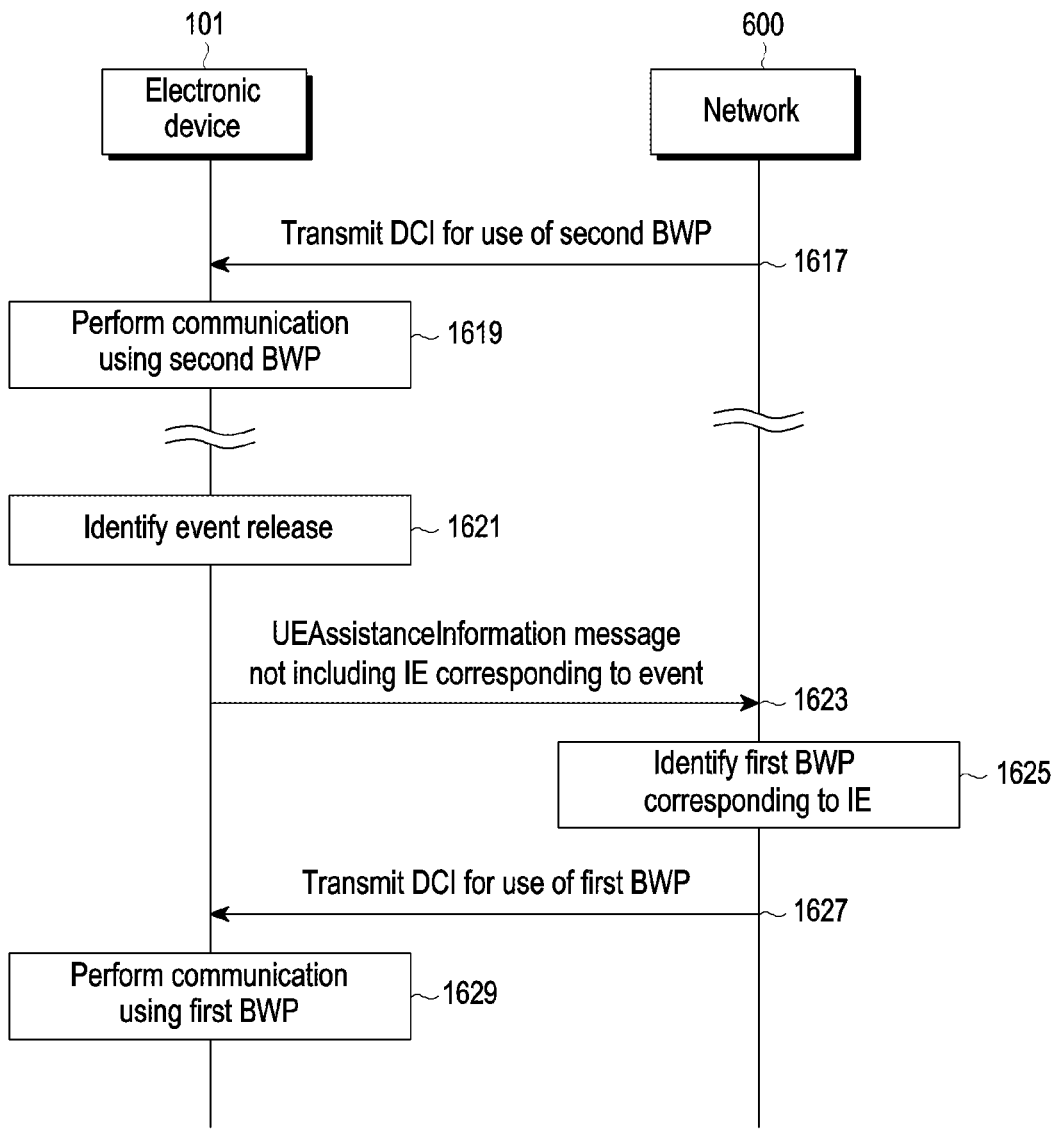
FIG. 16B is a signal flow diagram illustrating an example method of operating an electronic device and a network according to various embodiments.

FIG. 16B is a signal flow diagram illustrating an example method of operating an electronic device and a network according to various embodiments.

According to various embodiments, the electronic device 101 (e.g., at least one of the processor 120, the first communication processor 212, the second communication processor 214, or the integrated communication processor 260) may receive the DCI for use of the second BWP from the network 600 in operation 1617. In operation 1619, the electronic device 101 may perform communication with the network 600 using the second BWP. Operations 1617 and 1619 may be as described above in connection with FIG. 16A, for example.

According to various embodiments, in operation 1621, the electronic device 101 may identify release of the event that has caused a change to the second BWP. For example, the electronic device 101 may identify failure to detect the event which has caused the change to the second BWP, as release of the event. The electronic device 101 may identify the release of the event based on detection an event release condition having a hysteresis characteristic. The electronic device 101 may also identify the release of the event based on expiration of the timer after detection of the event fails or expiration of the timer after the event release condition. In operation 1623, the electronic device 101 may transmit a UEAssistanceInformation message not including the IE corresponding to the event. Table 9 shows an example of association information between the IE, which is not included, and the corresponding network operation.

TABLE 9

| excluded IE | network operation |
| --- | --- |
| reducedMaxCCs: not included or reducedCCsDL: not included or reducedCCsUL: not included | identifies that a change to a BWP with a different monitoring period is not required, maintains use of the current BWP or returns to the existing used BWP |
| reducedMaxBW: not included, or reducedMaxBW-DL: not included or reducedMaxBW-UL: not included | identifies that a change to a BWP with a different bandwidth is not required, maintains use of the current BWP or returns to the existing used BWP |

According to various embodiments, the network 600 may identify the existing first BWP used, corresponding to the IE based on reception of the UEAssistanceInformation message not including the specific IE in operation 1625. In operation 1627, the network 600 may transmit a DCI for using the first BWP to the electronic device 101. In operation 1629, the electronic device 101 may perform communication with the network 600 using the first BWP.

According to various embodiments, the electronic device 101 may transmit, to the network 600, a UEAssistanceInformation message not including the specific IE to return to the existing BWP and transmit a UEAssistanceInformation message including the IE having the value required by the electronic device 101 to the network. For example, the electronic device 101 may perform a change to the BWP having a relatively long monitoring period and transmit, to the network 600, the UEAssistanceInformation message not including the IE of the reducedMaxCCs (or reducedCCsDL) to return to the existing BWP. The electronic device 101 may receive the DCI for returning to the existing BWP from the network 600 and may thus perform communication with the network 600 using the existing BWP. The electronic device 101 may later transmit a UEAssistanceInformation message including the IE of the reducedCCsDL having a required value to the network 600. The network 600 may set the value requested by the electronic device 101 or set a designated value (or existing value).

Figure 17A:
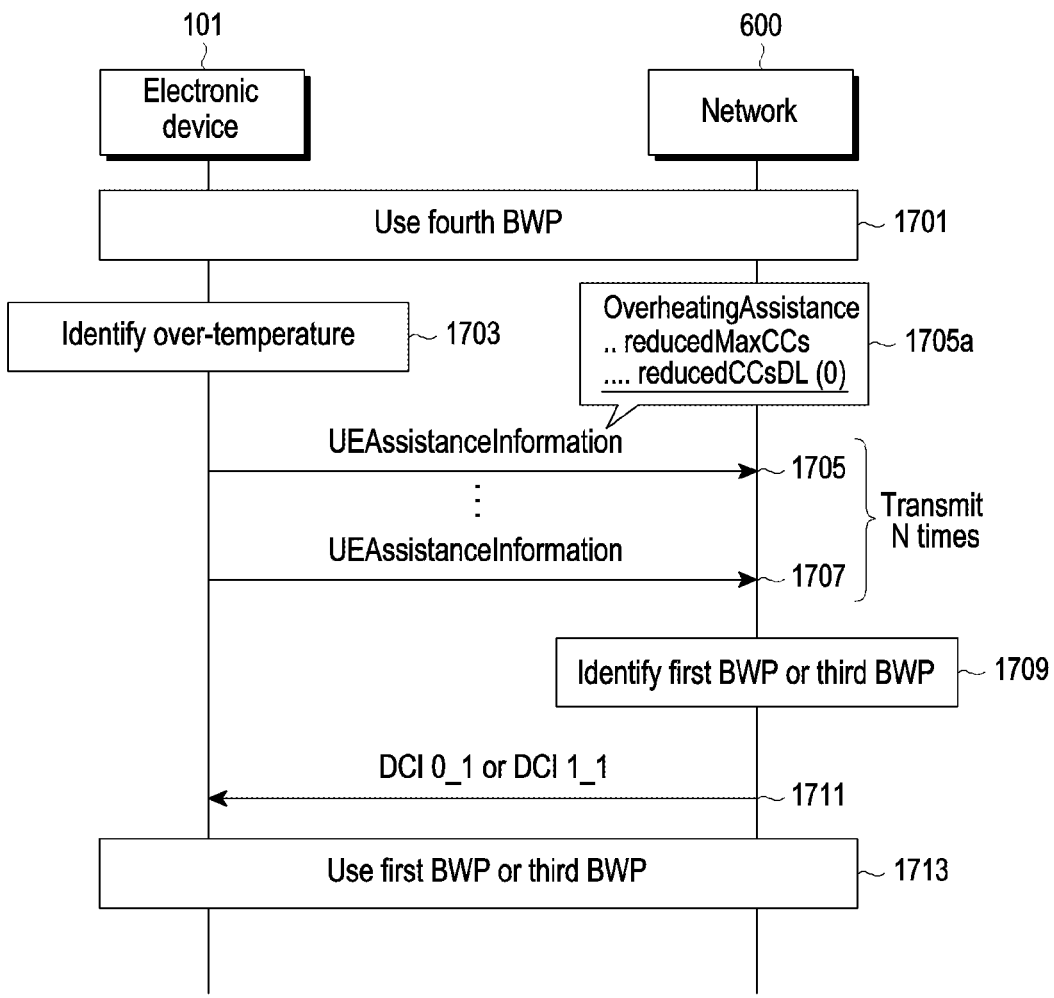
FIG. 17A is a signal flow diagram illustrating an example method of operating an electronic device and a network according to various embodiments.

FIG. 17A is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the fourth BWP in operation 1701. The electronic device 101 may identify over-temperature in operation 1703. The electronic device 101 may transmit the UEAssistanceInformation message to the network 600 N times in operations 1705 to 1707. Referring to information 1705a about the UEAssistanceInformation message, the reducedMaxCCs may be included in the OverheatingAssistance, and the IE of the reducedCCsDL having "0" (or minimum value) may be included in the reducedMaxCCs. The network 600 may identify the first BWP or third BWP corresponding to the value of "0" of the IE of the reducedCCsDL in operation 1709, based on reception of the UEAssistanceInformation message N times. For example, the "0" value of the IE of the reducedCCsDL may refer, for example, to a BWP having a relatively longer monitoring period than the existing BWP being required, so that the network 600 may identify the first BWP or the third BWP having a longer monitoring period than the fourth BWP being used in operation 1709. In operation 1711, the network 600 may transmit the DCI (e.g., DCI 0_1 or DCI 1_1) indicating use of the first BWP or third BWP to the electronic device 101. In operation 1713, the electronic device 101 may perform communication with the network 600 using the first BWP or the third BWP based on the DCI.

Figure 17B:
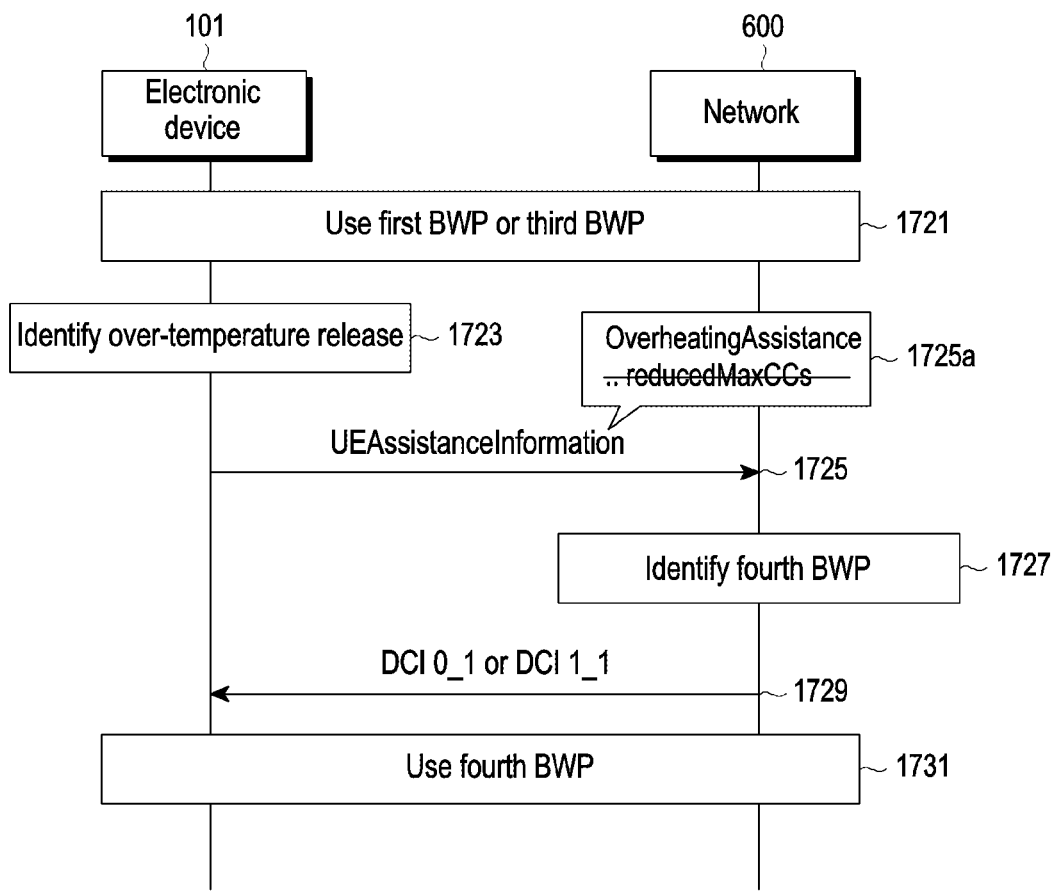
FIG. 17B is a signal flow diagram illustrating an example method of operating an electronic device and a network according to various embodiments.

FIG. 17B is a signal flow diagram illustrating an example method of operating an electronic device and a network according to various embodiments. The embodiment of FIG. 17B may be an operation subsequent to, e.g., FIG. 17A, but is not limited thereto.

According to various embodiments, an electronic device 101 (e.g., at least one of the processor 120, the first communication processor 212, the second communication processor 214, or the integrated communication processor 260) may perform communication with the network 600 using the first BWP or third BWP in operation 1721. For example, the first BWP or the third BWP may be a BWP changed by a request of the electronic device 101. In operation 1723, the electronic device 101 may identify over-temperature release. In operation 1725, the electronic device 101 may transmit an UEAssistanceInformation message to the network 600. Referring to the information 1725a of the UEAssistacneInformation message, reducedMaxCCs may not be included in OverheatingAssistance. The network 600 may identify the fourth BWP which is the BWP used before change in operation 1727, based on the reception of the UEAssistanceInformation message not including the reducedMaxCCs which is the specific IE. In operation 1729, the network 600 may transmit the DCI (e.g., DCI 0_1 or DCI 4_1) indicating use of the fourth BWP to the electronic device 101. In operation 1731, the electronic device 101 may perform communication with the network 600 using the fourth BWP identified based on the DCI.

Figure 18A:
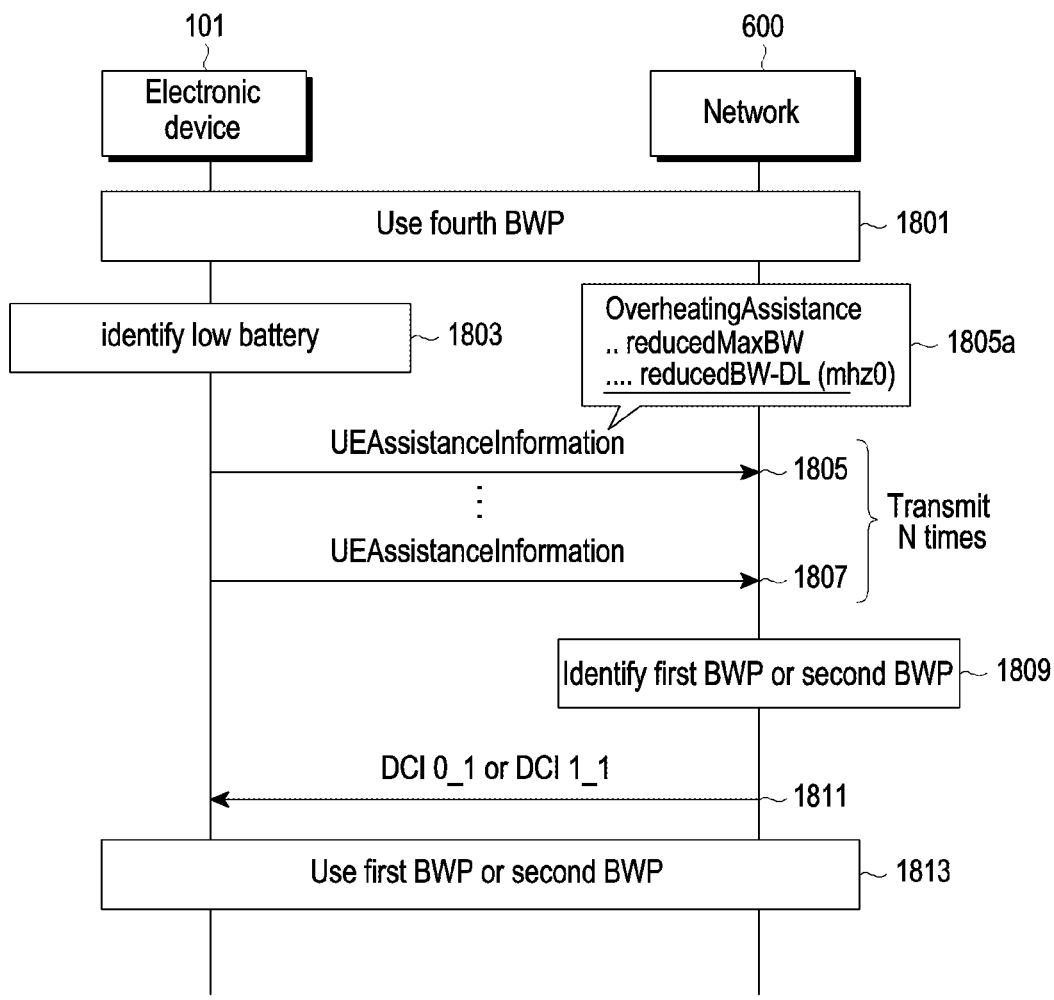
FIG. 18A is a signal flow diagram illustrating an example method of operating an electronic device and a network according to various embodiments.

FIG. 18A is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the fourth BWP in operation 1801. In operation 1803, the electronic device 101 may identify low battery. The electronic device 101 may transmit the UEAssistanceInformation message to the network 600 N times in operations 1805 to 1807. Referring to information 1805a about the UEAssistanceInformation message, the reducedMaxBW may be included in the OverheatingAssistance, and the IE of the reducedBW-DL having "0 (mhz)" (or minimum value) may be included in the reducedMaxBW. The network 600 may identify the first BWP or second BWP corresponding to the value of "0 (mhz)" of the IE of the reducedBW-DL in operation 1809, based on reception of the UEAssistanceInformation message N times. For example, the "0 (mhz)" value of the IE of the reducedBW-DL may refer, for example, to a BWP having a relatively smaller BWP than the existing BWP being required, so that the network 600 may identify the first BWP or the second BWP having a smaller bandwidth than the fourth BWP being used. In operation 1811, the network 600 may transmit the DCI (e.g., DCI 0_1 or DCI 1_1) indicating use of the first BWP or second BWP to the electronic device 101. In operation 1813, the electronic device 101 may perform communication with the network 600 using the first BWP or the second BWP based on the DCI.

Figure 18B:
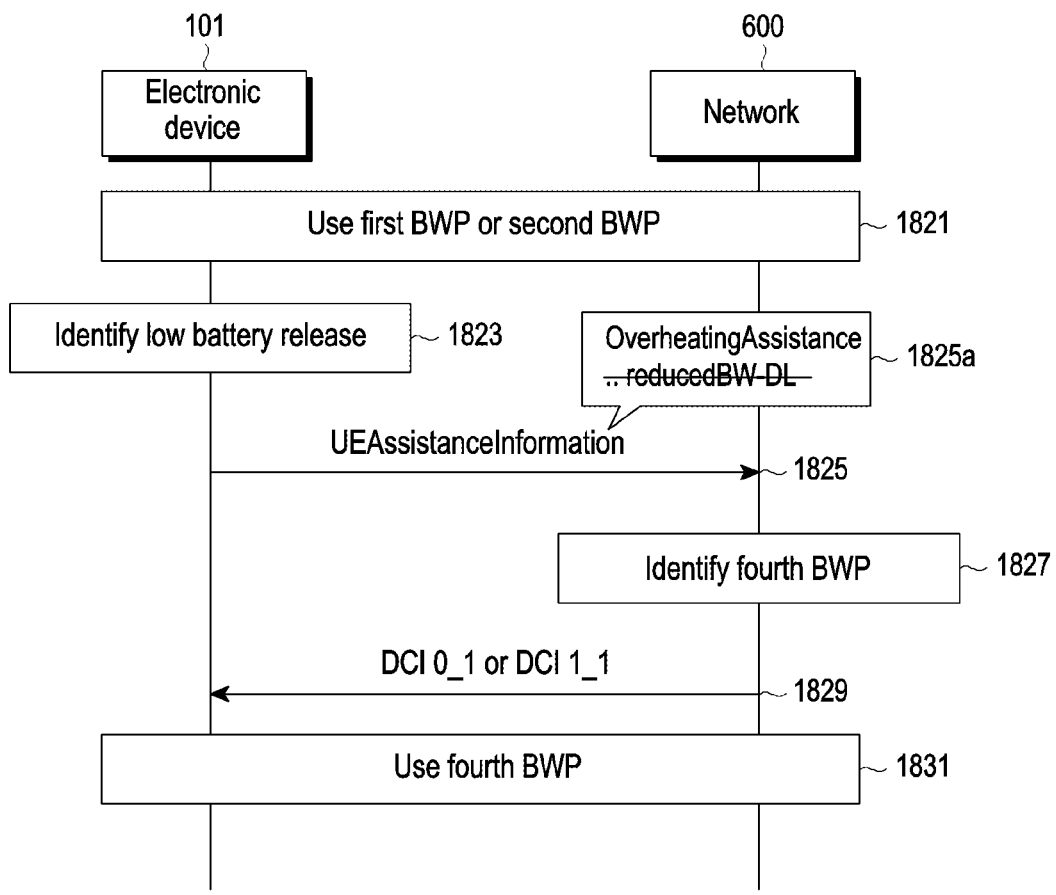
FIG. 18B is a signal flow diagram illustrating an example method of operating an electronic device and a network according to various embodiments.

FIG. 18B is a signal flow diagram illustrating an example method of operating an electronic device and a network according to various embodiments. The embodiment of FIG. 18B may be an operation subsequent to, e.g., FIG. 18A, but is not limited thereto.

According to various embodiments, an electronic device 101 (e.g., at least one of the processor 120, the first communication processor 212, the second communication processor 214, or the integrated communication processor 260) may perform communication with the network 600 using the first BWP or second BWP in operation 1821. For example, the first BWP or the second BWP may be a BWP changed by a request of the electronic device 101. In operation 1823, the electronic device 101 may identify release of low battery. In operation 1825, the electronic device 101 may transmit an UEAssistanceInformation message to the network 600. Referring to the information 1825a of the UEAssistacneInformation message, reducedBW-DL may not be included in OverheatingAssistance. The network 600 may identify the fourth BWP which is the BWP used before change in operation 1827, based on the reception of the UEAssistanceInformation message not including the reducedBW-DL which is the specific IE. In operation 1829, the network 600 may transmit the DCI (e.g., DCI 0_1 or DCI 4_1) indicating use of the fourth BWP to the electronic device 101. In operation 1831, the electronic device 101 may perform communication with the network 600 using the fourth BWP identified based on the DCI.

Figure 19A:
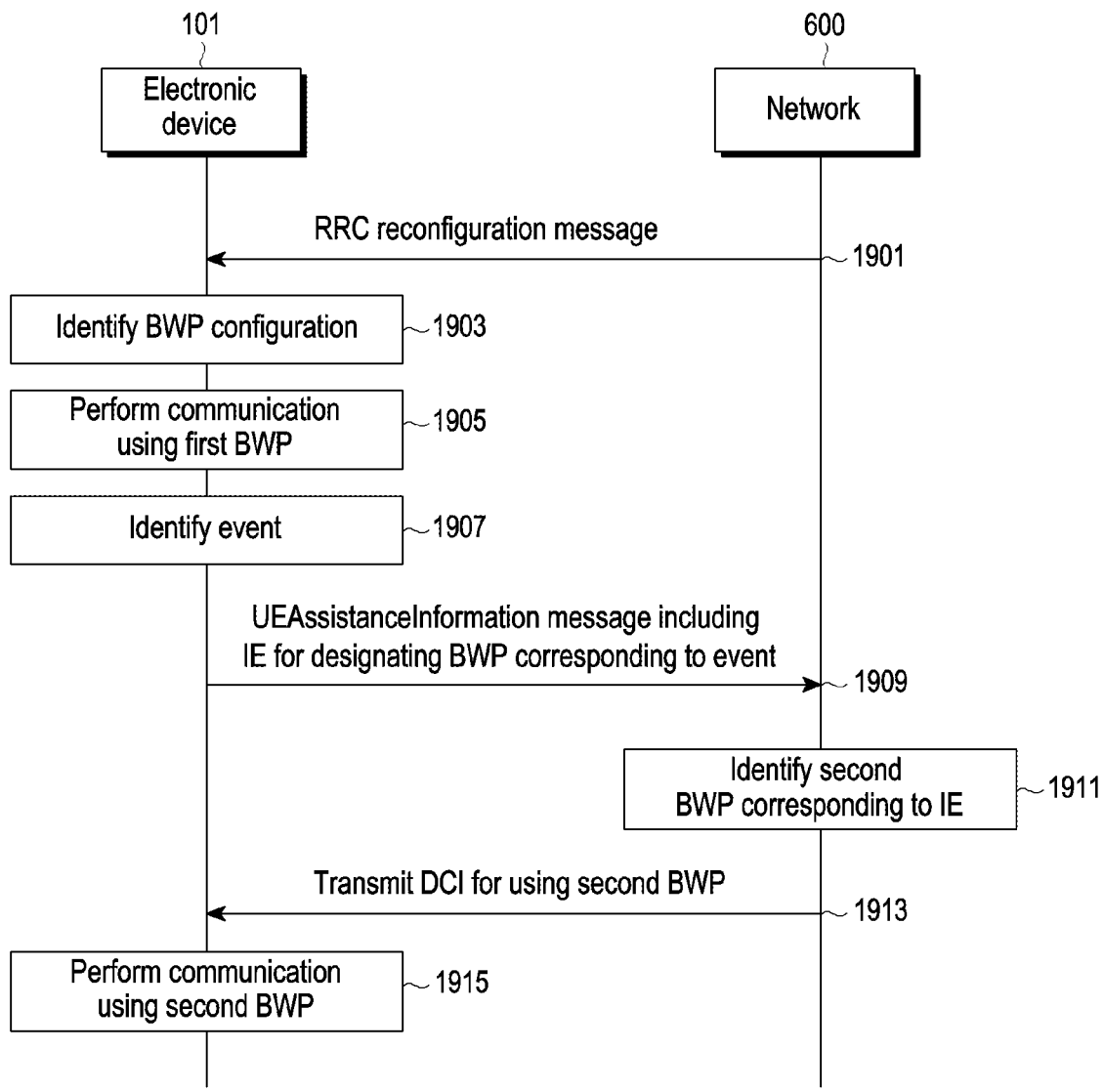
FIG. 19A is a signal flow diagram illustrating an example method of operating an electronic device and a network according to various embodiments.

FIG. 19A is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may receive an RRC reconfiguration message in operation 1901. In operation 1903, the electronic device 101 may identify a BWP configuration. Based on the BWP configuration, at least one available BWP may be identified. In operation 1905, the electronic device 101 may perform communication with the network 600 using the first BWP. In operation 1907, the electronic device 101 may identify the event. As described above, the event is not limited as long as it leads a change in BWP.

According to various embodiments, the electronic device 101 may transmit the UEAssistanceInformation message including the IE for designating the BWP corresponding to the event to the network 600 in operation 1909. For example, the UEAssistanceInformation message may be as shown in Table 10.

TABLE 10

```
UEAssistanceInformation-v1610-IEs ::= SEQUENCE {
idc-Assistance-r16 IDC-Assistance-r16 OPTIONAL,
drx-Preference-r16 DRX-Preference-r16 OPTIONAL,
maxBW-Preference-r16 MaxBW-Preference-r16 OPTIONAL,
maxCC-Preference-r16 MaxCC-Preference-r16 OPTIONAL,
maxMIMO-LayerPreference-r16 MaxMIMO-LayerPreference-r16 OPTIONAL,
minSchedulingOffsetPreference-r16 MinSchedulingOffsetPreference-r16 OPTIONAL,
releasePreference-r16 ReleasePreference-r16 OPTIONAL,
sl-UE-AssistanceInformationNR-r16          SL-UE-AssistanceInformationNR-r16
OPTIONAL,
referenceTimeInfoPreference-r16 BOOLEAN OPTIONAL,
BWP-Preference-r16 BWP-Preference-r16 OPTIONAL,
nonCriticalExtension SEQUENCE { } OPTIONAL
}
BWP-Preference-r16 ::= SEQUENCE {
BWP-Id-FR1-r16 INTEGER (0..4),
BWP-Id-FR2-r16 INTEGER (0..4)
}
```

The IE of "BWP-Preference-r16" underlined in Table 10 may refer, for example, to a BWP which is requested to be changed by the electronic device 101 (or UE) and may be set for FR1 and/or FR2. The value may be any one of the integers 0 to 4 and may be expressed as, e.g., BWP Id (or BWP Indicator), but there is no limitation. For example, if the event of the over-temperature state is detected, the electronic device 101 may identify that a BWP having a relatively longer monitoring period and/or a relatively smaller bandwidth is required. The electronic device 101 may identify the respective monitoring periods and/or bandwidths of the BWPs configured by the network 600 and may identify the BWP having a longer monitoring period and/or a smaller bandwidth among the BWPs. The electronic device 101 may transmit a message (e.g., UEAssistanceInformation message) including identification information about the identified BWP to the network 600. In operation 1911, the network 600 may identify the second BWP corresponding to the IE. In operation 1913, the network 600 may transmit a DCI for using the second BWP to the electronic device 101. In operation 1915, the electronic device 101 may perform communication with the network 600 using the second BWP. Meanwhile, even after the change in BWP is performed, the electronic device 101 may transmit a UEAssistanceInformation message for an additional change in BWP to the network 600. Meanwhile, the IE of "BWP-Preference-r16" is merely an example, and the type and value of the IE are not limited.

Figure 19B:
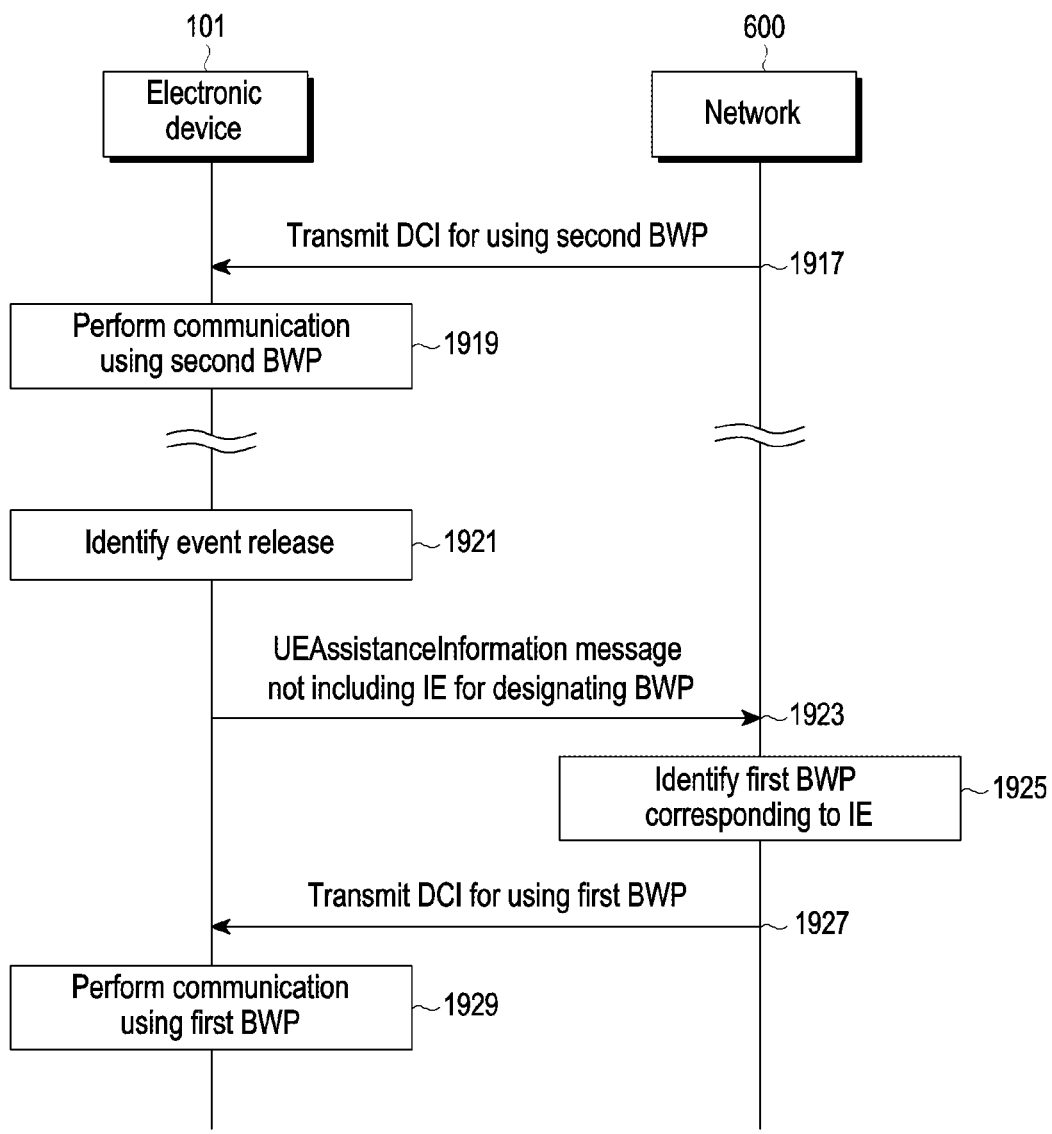
FIG. 19B is a signal flow diagram illustrating an example method of operating an electronic device and a network according to various embodiments.

FIG. 19B is a signal flow diagram illustrating an example method of operating an electronic device and a network according to various embodiments.

According to various embodiments, the electronic device 101 (e.g., at least one of the processor 120, the first communication processor 212, the second communication processor 214, or the integrated communication processor 260) may receive the DCI for use of the second BWP from the network 600 in operation 1917. In operation 1919, the electronic device 101 may perform communication with the network 600 using the second BWP. Operations 1917 and 1919 may be as described above in connection with operations 1913 and 1915 of FIG. 19A, for example.

According to various embodiments, in operation 1921, the electronic device 101 may identify release of the event that has caused a change to the second BWP. For example, the electronic device 101 may identify failure to detect the event which has caused the change to the second BWP, as release of the event. The electronic device 101 may identify the release of the event based on detection an event release condition having a hysteresis characteristic. The electronic device 101 may also identify the release of the event based on expiration of the timer after detection of the event fails or expiration of the timer after the event release condition. In operation 1923, the electronic device 101 may transmit a UEAssistanceInformation message which does not include the IE for designating the BWP to the network 600. For example, the electronic device 101 may transmit a UEAssistanceInformation message not including the IE of BWP-Preference-r16 in Table 10 to the network 600. The network 600 may identify that the electronic device 101 requests to return to the existing BWP, based on the UEAssistanceInformation message not including the IE of BWP-Preference-r16. In operation 1925, the network 600 may identify the first BWP corresponding to the IE not included in the message, e.g., the BWP used before change. In operation 1927, the network 600 may transmit a DCI for using the first BWP to the electronic device 101. In operation 1929, the electronic device 101 may perform communication with the network 600 using the second BWP. Or, if the UEAssistanceInformation message not including the IE of BWP-Preference-r16 is received, the network 600 may maintain the BWP being currently used.

In an embodiment, the electronic device 101 may transmit, to the network 600, a message including information about the previously used BWP (e.g., the first BWP) to return to the previously used BWP (e.g., the first BWP) based on detection of event release. For example, the electronic device 101 may transmit the UEAssistanceInformation message including identification information about the previously used BWP (e.g., the first BWP) to the network 600. The network 600 may transmit, to the electronic device 101, a DCI triggering a change to the first BWP identified based on the message, so that a change in BWP may be performed.

Figure 20A:
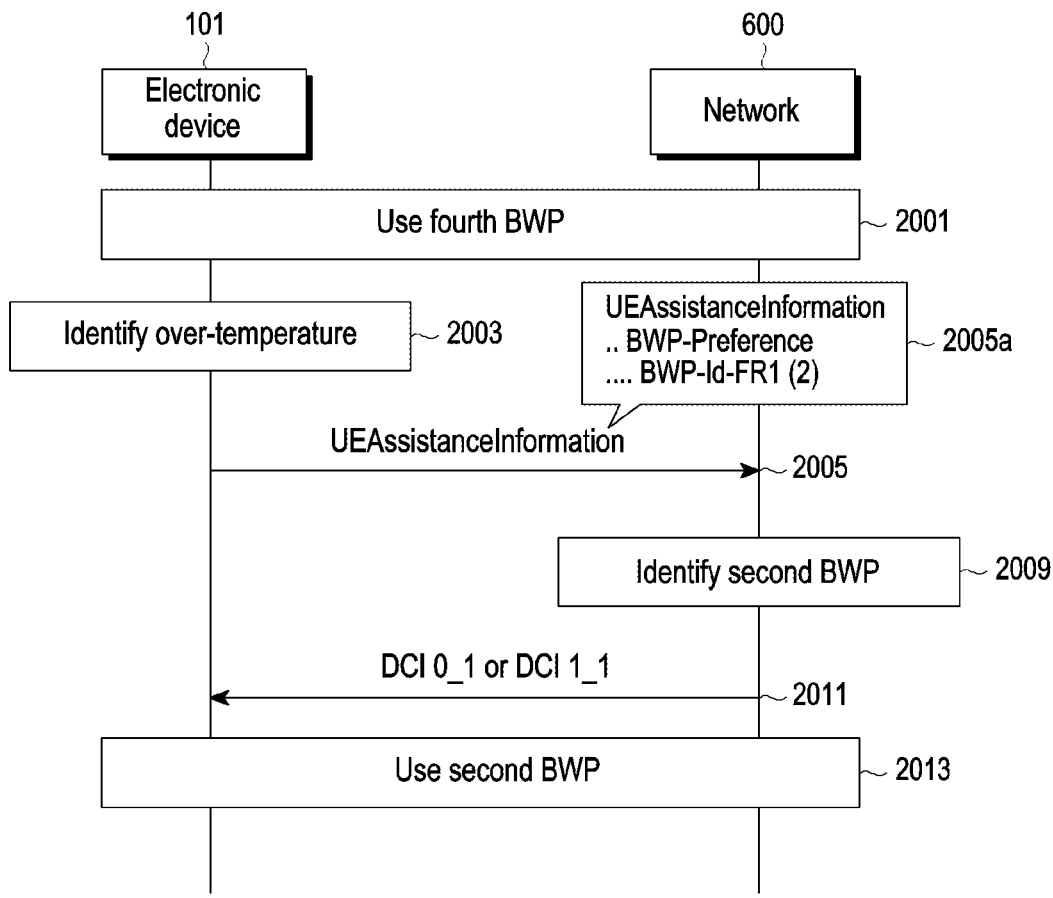
FIG. 20A is a signal flow diagram illustrating an example method of operating an electronic device and a network according to various embodiments.

FIG. 20A is a flowchart illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the fourth BWP in operation 2001. The electronic device 101 may identify over-temperature in operation 2003. In operation 2005, the electronic device 101 may transmit an UEAssistanceInformation message to the network 600. Referring to the information 2005a of the UEAssistanceInformation message, the BWP-Preference may be included in the IEs of the UEAssistanceInformation, and the BWP-Preference may include identification information (BWP-Id-FR1) about the BWP in FR1 having a value of "2." In operation 2009, the network 600 may identify the second BWP based on the information 2005a of the UEAssistanceInformation message. In operation 2011, the network 600 may transmit the DCI (e.g., DCI 0_1 or DCI 2_1) indicating use of the fourth BWP to the electronic device 101. In operation 2013, the electronic device 101 may perform communication with the network 600 using the second BWP identified based on the DCI.

Figure 20B:
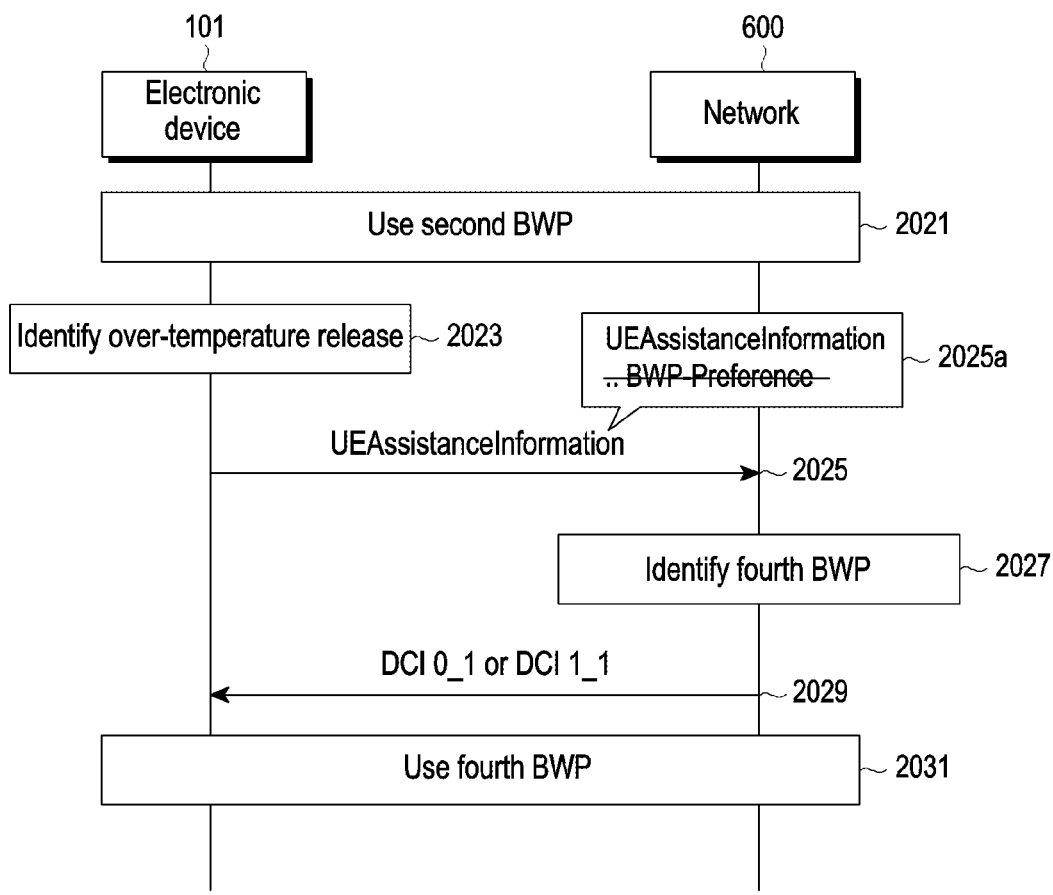
FIG. 20B is a signal flow diagram illustrating an example method of operating an electronic device and a network according to various embodiments.

FIG. 20B is a signal flow diagram illustrating an example method of operating an electronic device and a network according to various embodiments. The embodiment of FIG. 20B may be an operation subsequent to, e.g., FIG. 20A, but is not limited thereto.

According to various embodiments, an electronic device 101 (e.g., at least one of the processor 120, the first communication processor 212, the second communication processor 214, or the integrated communication processor 260) may perform communication with the network 600 using the second BWP in operation 2021. For example, the second BWP may be a BWP changed by a request of the electronic device 101. In operation 2023, the electronic device 101 may identify over-temperature release. In operation 2025, the electronic device 101 may transmit an UEAssistanceInformation message to the network 600. Referring to the information 2025a of the UEAssistanceInformation message, the BWP-Preference may not be included in the IEs of the UEAssistanceInformation. Meanwhile, as described above, the electronic device 101 may alternatively transmit the UEAssistanceInformation message including identification information about the fourth BWP. The network 600 may identify the fourth BWP which is the BWP used before change in operation 2027, based on the reception of the UEAssistanceInformation message not including the BWP-Preference which is the specific IE. In operation 2029, the network 600 may transmit the DCI (e.g., DCI 0_1 or DCI 4_1) indicating use of the fourth BWP to the electronic device 101. In operation 2031, the electronic device 101 may perform communication with the network 600 using the fourth BWP identified based on the DCI.

Figure 21A:
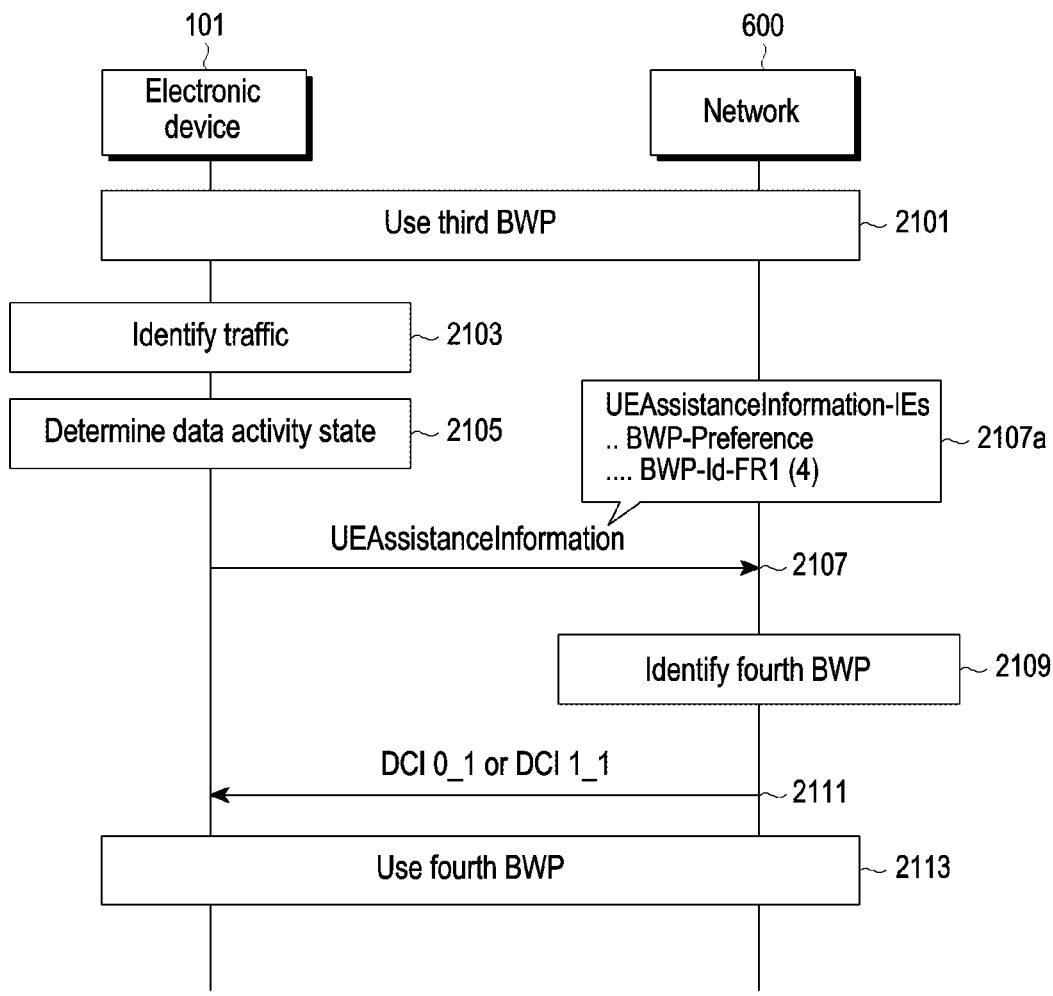
FIG. 21A is a signal flow diagram illustrating an example method of operating an electronic device and a network according to various embodiments.

FIG. 21A is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the third BWP in operation 2101. In operation 2103, the electronic device 101 may identify generated traffic. In operation 2105, the electronic device 101 may determine the data activity state based on the generated traffic. In operation 2107, the electronic device 101 may transmit an UEAssistanceInformation message to the network 600. Referring to the information 2107a of the UEAssistanceInformation message, the BWP-Preference may be included in the IEs of the UEAssistanceInformation, and the BWP-Preference may include identification information (BWP-Id-FR1) about the BWP in FR1 having a value of "4."

In operation 2109, the network 600 may identify the fourth BWP based on the information 2107*a* of the UEAssistanceInformation message. In operation 2111, the network 600 may transmit the DCI (e.g., DCI 0_1 or DCI 4_1) indicating use of the fourth BWP to the electronic device 101. In operation 2113, the electronic device 101 may perform communication with the network 600 using the fourth BWP identified based on the DCI.

Figure 21B:
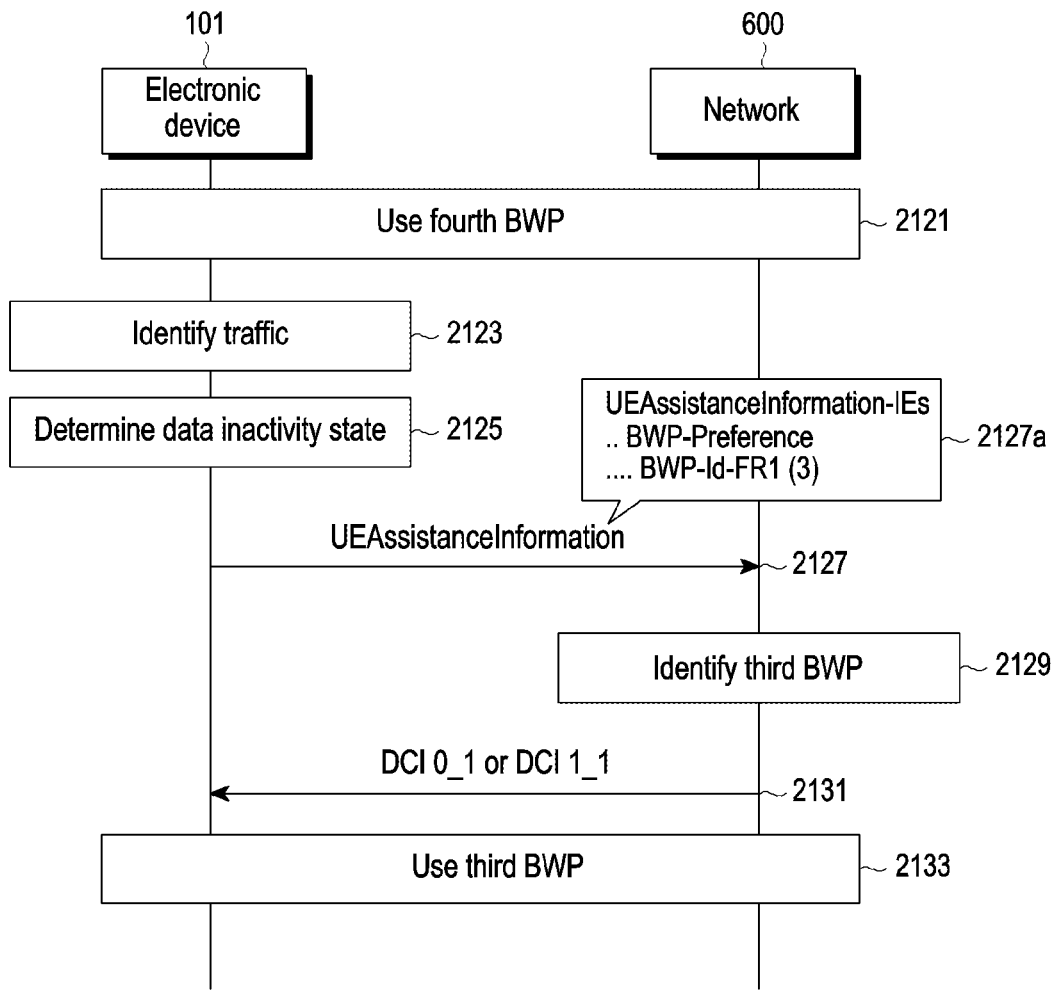
FIG. 21B is a signal flow diagram illustrating an example method of operating an electronic device and a network according to various embodiments.

FIG. 21B is a signal flow diagram illustrating an example method of operating an electronic device and a network according to various embodiments. The embodiment of FIG. 21B may be an operation subsequent to, e.g., FIG. 21A, but is not limited thereto.

According to various embodiments, an electronic device 101 (e.g., at least one of the processor 120, the first communication processor 212, the second communication processor 214, or the integrated communication processor 260) may perform communication with the network 600 using the fourth BWP in operation 2121. For example, the fourth BWP may be a BWP changed by a request of the electronic device 101. In operation 2123, the electronic device 101 may identify generated traffic. In operation 2125, the electronic device 101 may determine the data inactivity state based on the generated traffic. In operation 2127, the electronic device 101 may transmit an UEAssistanceInformation message to the network 600. Referring to the information 2127*a* of the UEAssistanceInformation message, the BWP-Preference may be included in the IEs of the UEAssistanceInformation, and the BWP-Preference may include identification information (BWP-Id-FR1) about the BWP in FR1 having a value of "3."

In operation 2129, the network 600 may identify the third BWP based on the information 2127*a* of the UEAssistanceInformation message. In operation 2131, the network 600 may transmit the DCI (e.g., DCI 0_1 or DCI 3_1) indicating use of the fourth BWP to the electronic device 101. In operation 2133, the electronic device 101 may perform communication with the network 600 using the third BWP identified based on the DCI.

Figure 22:
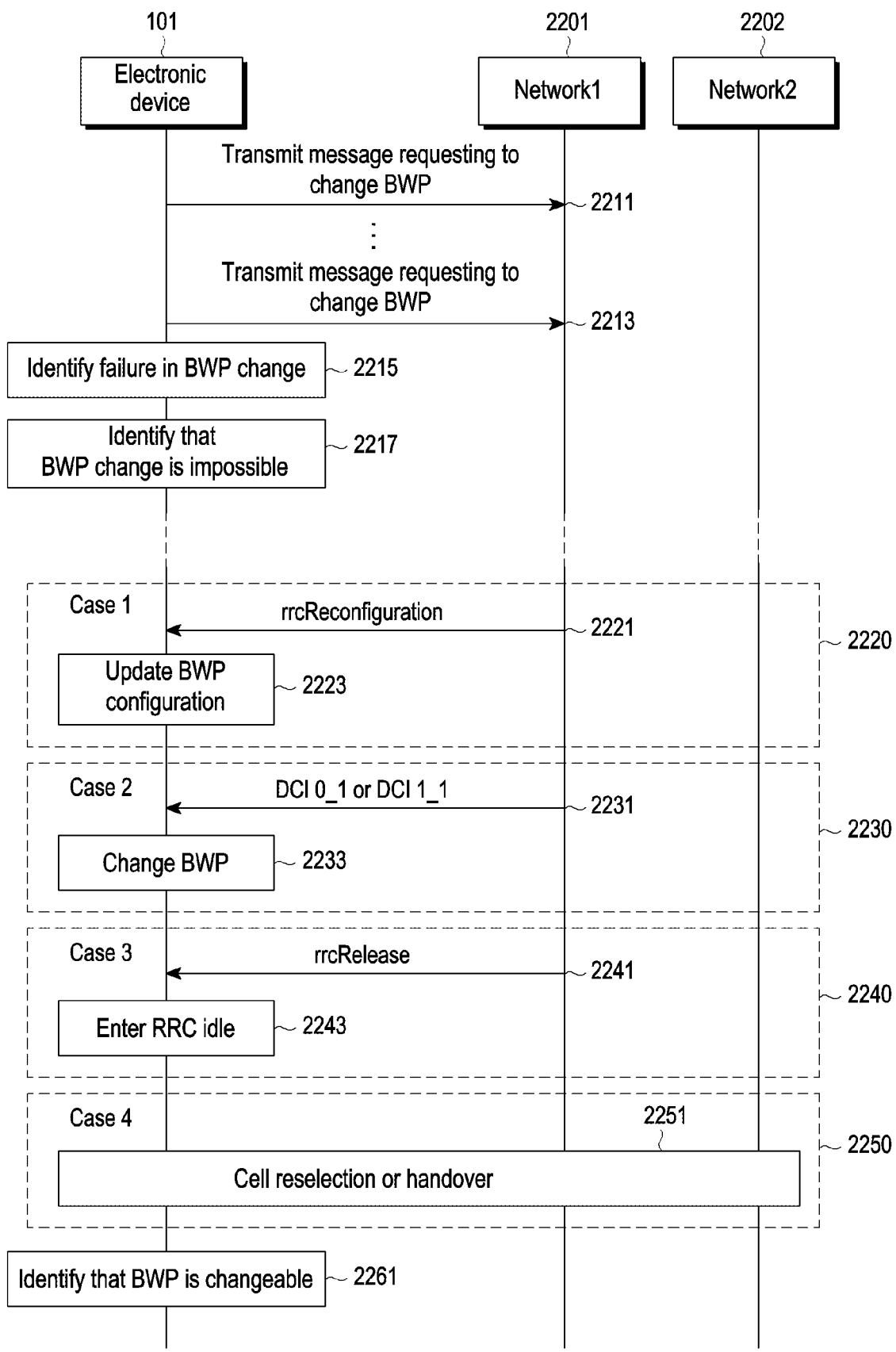
FIG. 22 is a signal flow diagram illustrating an example method of operating an electronic device and a network according to various embodiments.

FIG. 22 is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may transmit an RRC reconfiguration message. In operations 2211 and 2213, the electronic device 101 may transmit a message requesting a change in BWP to the first cell 2201. In operation 2215, the electronic device 101 may identify a failure to change the BWP. In one example, the electronic device 101 may perform a BWP change request based on transmitting the UEAssistanceInformation message including the value of the specific IE corresponding to the event, N times. The electronic device 101 may fail to receive the DCI triggering a change in BWP despite repetition, M times (where M is an integer of 1 or more), of transmission of the UEAssistanceInformation message N times (where N is an integer of 2 or more). In another example, the electronic device 101 may perform a request for change in BWP based on transmission of the UEAssistanceInformation message including the identification information about the BWP required to be changed. The electronic device 101 may fail to receive the DCI triggering a change in BWP despite repetition, M times (where M is an integer of 1 or more), of transmission of the UEAssistanceInformation message. According to various embodiments, in operation 2217, the electronic device 101 may identify that it is impossible to change the BWP. Thereafter, the electronic device 101 may stop performing the BWP change request operation.

According to various embodiments, as in the first case (Case 1) 2220, the electronic device 101 may also receive an RRC reconfiguration message having a new BWP configuration from the first cell 2201 after event detection and before BWP change or after change and before returning to the existing BWP in operation 2221. In operation 2223, the electronic device 101 may identify the BWP configuration based on the RRC reconfiguration message. In the second case (Case 2) 2230, the electronic device 101 may receive, from the first cell 2201, a DCI (e.g., DCI 0_1 or DCI 1_1) triggering a change in BWP after identifying that it is impossible to change the BWP in operation 2231. In this case, the electronic device 101 may change the BWP based on the DCI in operation 2233. In the third case (Case 3) 2240, the electronic device 101 may receive an RRC release message from the first cell 2201 in operation 2241. The electronic device 101 may enter the RRC idle state in operation 2243. In the fourth case (Case 4) 2250, the electronic device 101 may perform cell reselection or handover from the first cell 2201 to the second cell 2202 in operation 2251. After the first to fourth cases, the electronic device 101 may identify that it is possible to change the BWP in operation 2261.

Figure 23:
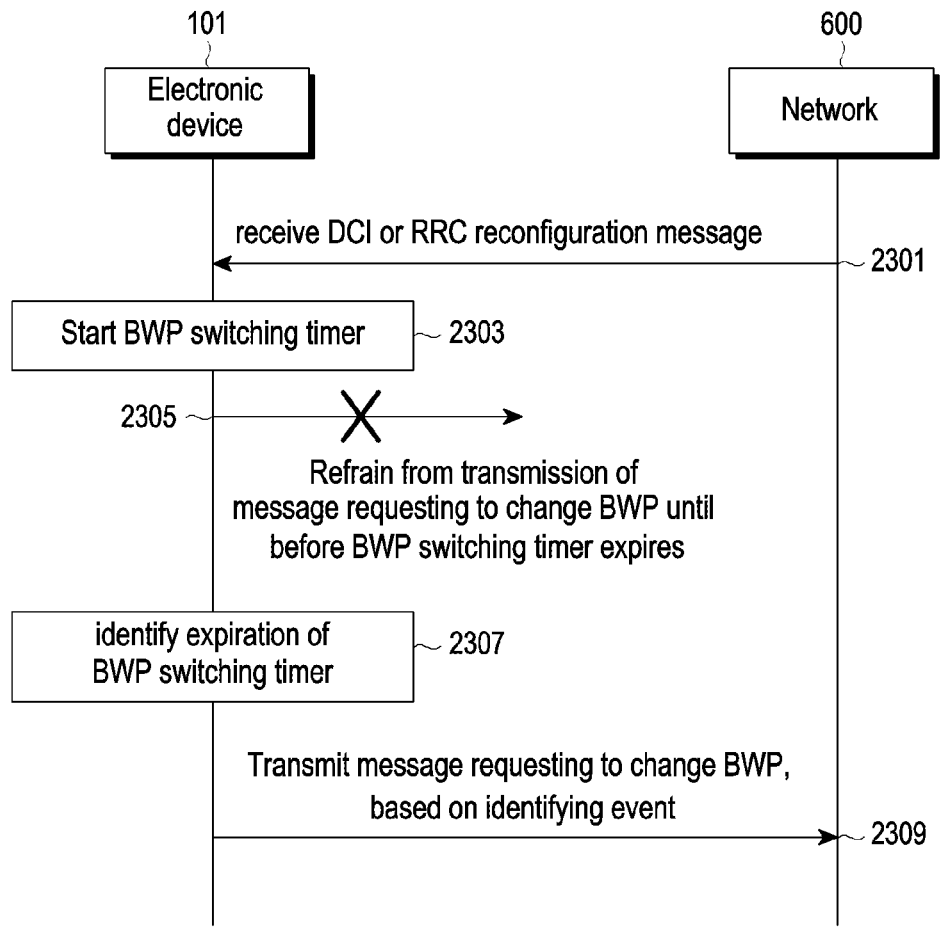
FIG. 23 is a signal flow diagram illustrating an example method of operating an electronic device and a network according to various embodiments.

FIG. 23 is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may receive an RRC reconfiguration message or DCI in operation 2301. Accordingly, the electronic device 101 may identify a new BWP configuration or change the active BWP. In operation 2303, the electronic device 101 may start the BWP switching timer based on identifying the new BWP configuration or change in active BWP. In operation 2305, the electronic device 101 may refrain from transmitting a message to request to change the BWP until before the BWP switching timer expires. If a change in BWP relatively frequently occurs even thereafter, data loss or an increase in power consumption is likely to increase, so that the BWP switching timer may be used to prevent and/or reduce frequent changes in BWP. In operation 2307, the electronic device 101 may identify expiration of the BWP switching timer. In operation 2309, after the BWP switching timer expires, the electronic device 101 may transmit a message requesting to change the BWP to the network 600 based on identification of the event.

Figure 24A:
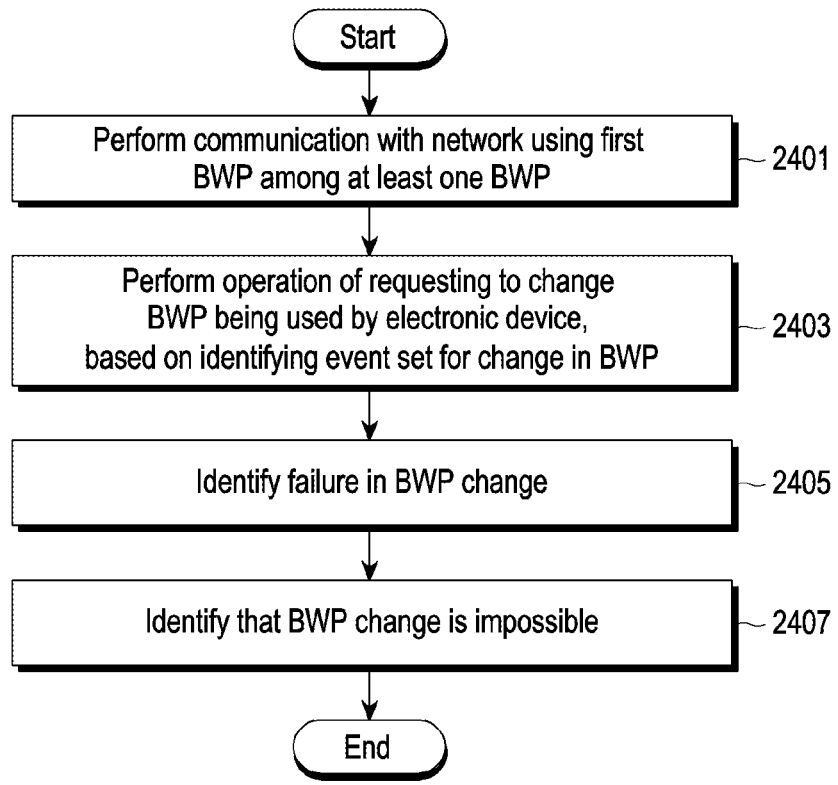
FIG. 24A is a flowchart illustrating an example method of operating an electronic device according to various embodiments.

FIG. 24A is a flowchart illustrating an example method of operating an electronic device according to various embodiments.

According to various embodiments, an electronic device 101 (e.g., at least one of the processor 120, the first communication processor 212, the second communication processor 214, or the integrated communication processor 260) may perform communication with the network 600 using the first BWP among at least one BWP in operation 2401. The electronic device 101 may perform the operation of requesting to change the BWP being used by the electronic device 101, based on identifying the event configured to change the BWP, in operation 2403. In one example, the electronic device 101 may perform a BWP change request based on transmitting the UEAssistanceInformation message including the value of the specific IE corresponding to the event, N times. In another example, the electronic device 101 may perform a request for change in BWP based on transmission of the UEAssistanceInformation message including the identification information about the BWP required to be changed. In operation 2405, the electronic device 101 may identify a failure to change the BWP. For example, the electronic device 101 may identify a BWP change failure based on the failure to receive the DCI triggering a change in BWP corresponding to at least one BWP change attempt. In operation 2407, the electronic device 101 may identify that it is impossible to change the BWP.

Figure 24B:
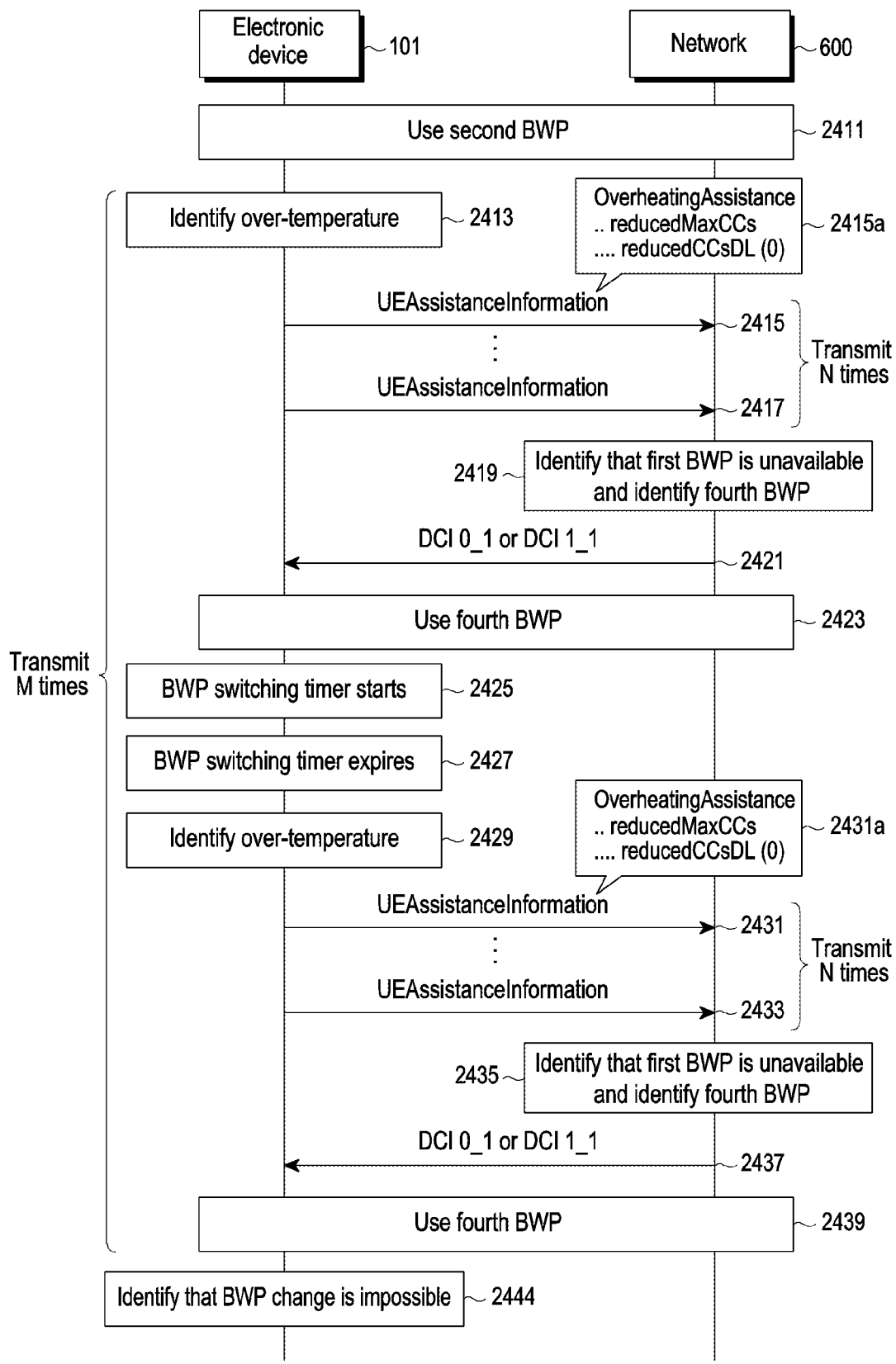
FIG. 24B is a signal flow diagram illustrating an example method of operating an electronic device and a network according to various embodiments.

FIG. 24B is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the second BWP in operation 2411. The electronic device 101 may identify over-temperature in operation 2413. The electronic device 101 may transmit the UEAssistanceInformation message to the network 600 N times in operations 2415 to 2417. Referring to information 2415*a* about the UEAssistanceInformation message, the reducedMaxCCs may be included in the OverheatingAssistance, and the IE of the reducedCCsDL having "0" (or minimum value) may be included in the reducedMaxCCs. The network 600 may identify the first BWP or fourth BWP corresponding to the value of "0" of the IE of the reducedCCsDL in operation 2419, based on reception of the UEAssistanceInformation message N times. For example, the "0" value of the IE of the reducedCCsDL may refer, for example, to a BWP having a relatively longer monitoring period than the existing BWP being required, so that the network 600 may identify the first BWP or the fourth BWP having a longer monitoring period than the second BWP being used. However, the network 600 may identify that the first BWP may not be currently allocated to the electronic device 101. For example, there is a possibility that some BWPs may not be allocated depending on a burden on the network 600 or another UE connected to the network 600. In operation 2419, the network 600 may identify that it is impossible to use the first BWP and may identify the fourth BWP for the electronic device 101. In operation 2421, the network 600 may transmit the DCI (e.g., DCI 0_1 or DCI 4_1) indicating use of the fourth BWP to the electronic device 101. In operation 2423, the electronic device 101 may perform communication with the network 600 using the fourth BWP identified based on the DCI. The electronic device 101 may be configured to first use a BWP designated by the network 600.

According to various embodiments, the electronic device 101 may start the BWP switching timer in operation 2425. The electronic device 101 may identify that the BWP switching timer expires in operation 2427. Until before the BWP switching timer expires, the electronic device 101 may refrain from the operation for changing the BWP even when an event is detected. The electronic device 101 may identify over-temperature after the BWP switching timer expires in operation 2429. The electronic device 101 may transmit the UEAssistanceInformation message to the network 600 N times in operations 2431 to 2433. Referring to information 2431*a* about the UEAssistanceInformation message, the reducedMaxCCs may be included in the OverheatingAssistance, and the IE of the reducedCCsDL having "0" (or minimum value) may be included in the reducedMaxCCs. The network 600 may identify the first BWP or fourth BWP corresponding to the value of "0" of the IE of the reducedCCsDL in operation 2435, based on reception of the UEAssistanceInformation message N times. However, it may be in a state in which it is still impossible to allocate the first BWP to the electronic device 101. In operation 2435, the network 600 may identify that it is impossible to allocate the first BWP and identify the fourth BWP. In operation 2437, the network 600 may transmit the DCI (e.g., DCI 0_1 or DCI 4_1) indicating use of the fourth BWP to the electronic device 101. In operation 2439, the electronic device 101 may perform communication with the network 600 using the fourth BWP identified based on the DCI. In operation 2441, the electronic device 101 may identify that it is impossible to change the BWP. For example, the electronic device 101 may determine that it is impossible to change the BWP based on M BWP change attempts and failure in change. The electronic device 101 may stop performing the operation for changing the BWP based on determining that it is impossible to change the BWP.

Figure 25A:
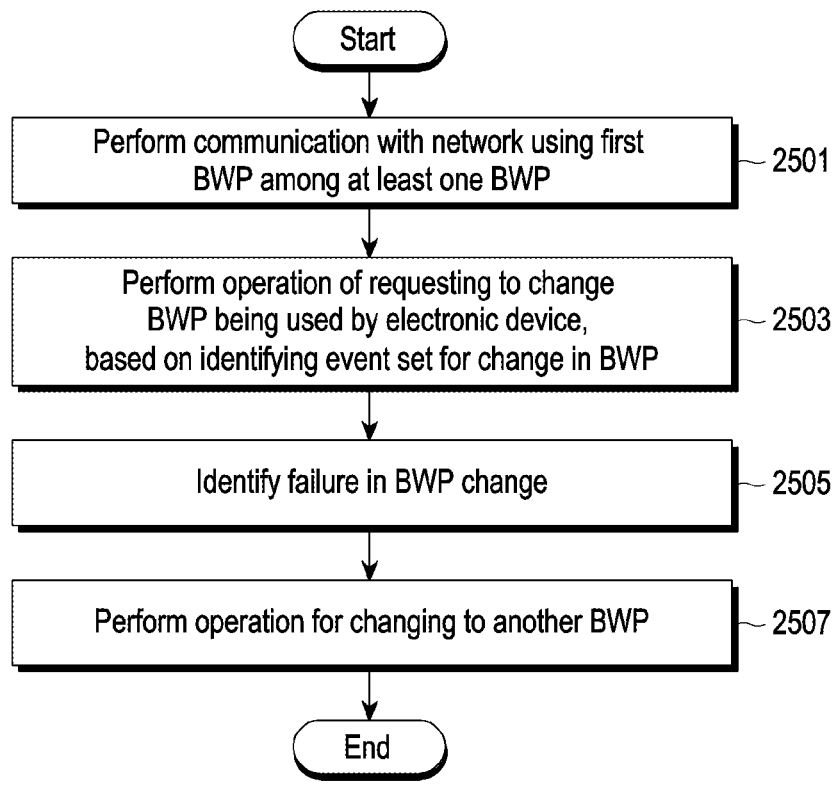
FIG. 25A is a flowchart illustrating an example method of operating an electronic device according to various embodiments.

FIG. 25A is a flowchart illustrating an example method of operating an electronic device according to various embodiments.

According to various embodiments, an electronic device 101 (e.g., at least one of the processor 120, the first communication processor 212, the second communication processor 214, or the integrated communication processor 260) may perform communication with the network 600 using the first BWP among at least one BWP in operation 2501. The electronic device 101 may perform the operation of requesting to change the BWP being used by the electronic device 101, based on identifying the event configured to change the BWP, in operation 2503. As described above, the electronic device 101 may transmit, N times, the UEAssistanceInformation message including a specific IE value corresponding to the event or transmit the UEAssistanceInformation message including identification information about the BWP required to be changed. In operation 2505, the electronic device 101 may identify a failure to change the BWP. For example, the electronic device 101 may identify a BWP change failure based on the failure to receive the DCI triggering a change in BWP corresponding to at least one BWP change attempt. In operation 2507, the electronic device 101 may perform the operation for changing to another BWP.

Figure 25B:
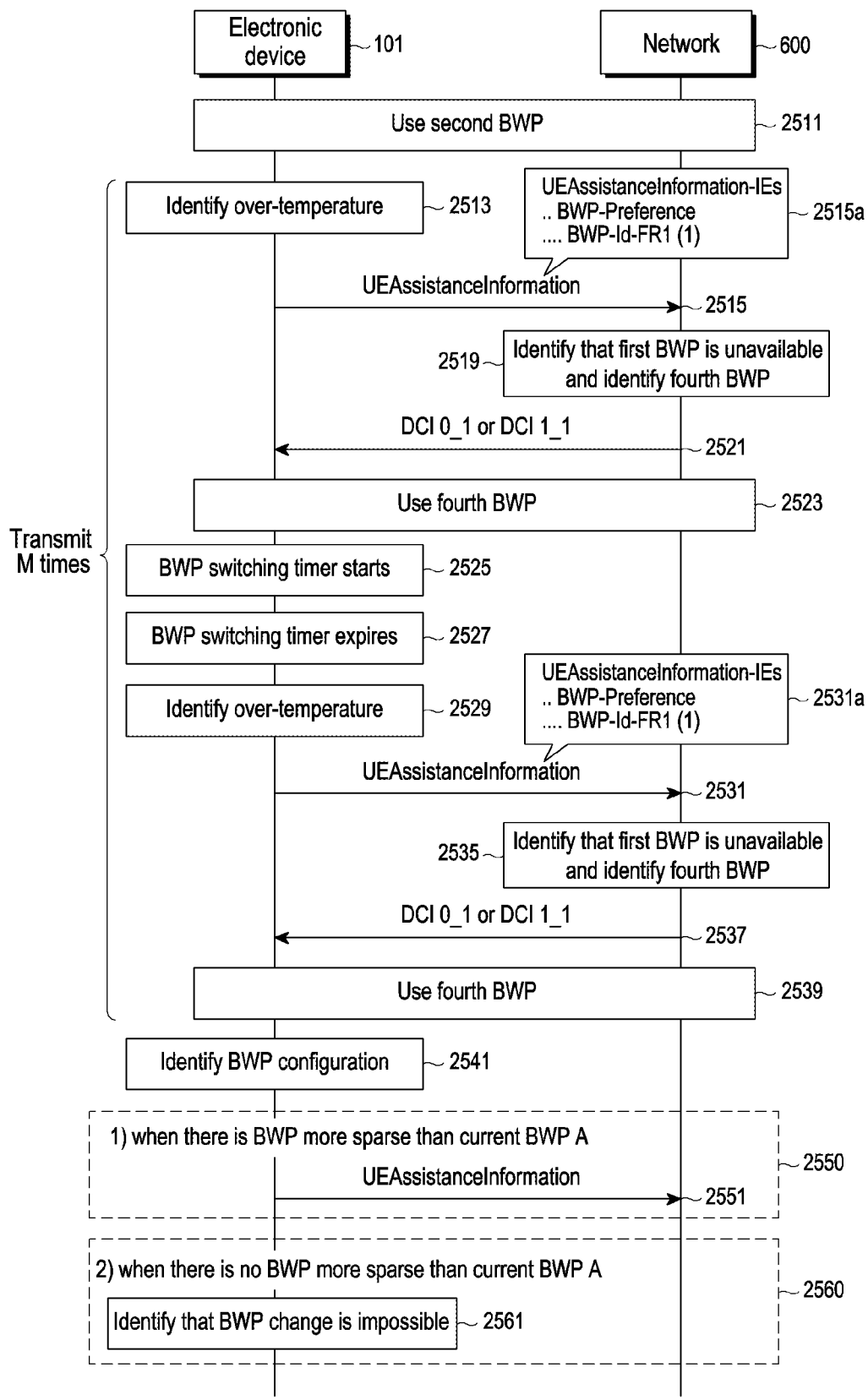
FIG. 25B is a signal flow diagram illustrating an example method of an electronic device and a network according to various embodiments.

FIG. 25B is a signal flow diagram illustrating an example method of operating an electronic device and a network according to various embodiments.

According to various embodiments, an electronic device 101 (e.g., at least one of the processor 120, the first communication processor 212, the second communication processor 214, or the integrated communication processor 260) may perform communication with the network 600 using the second BWP in operation 2511. The electronic device 101 may identify over-temperature in operation 2513. In operation 2515, the electronic device 101 may transmit an UEAssistanceInformation message to the network 600. Referring to the information 2515*a* of the UEAssistanceInformation message, the BWP-Preference may be included in the IEs of the UEAssistanceInformation, and the BWP-Preference may include identification information (BWP-Id-FR1) about the BWP in FR1 having a value of "1." The network 600 may identify the first BWP or fourth BWP based on the information 2515*a* of the UEAssistanceInformation message. However, the network 600 may identify that the first BWP may not be currently allocated to the electronic device 101. In operation 2519, the network 600 may identify that it is impossible to use the first BWP and may identify the fourth BWP for the electronic device 101. In operation 2521, the network 600 may transmit the DCI (e.g., DCI 0_1 or DCI 4_1) indicating use of the fourth BWP to the electronic device 101. In operation 2523, the electronic device 101 may perform communication with the network 600 using the fourth BWP identified based on the DCI. The electronic device 101 may be configured to first use a BWP designated by the network 600.

According to various embodiments, the electronic device 101 may start the BWP switching timer in operation 2525. The electronic device 101 may identify that the BWP switching timer expires in operation 2527. Until before the BWP switching timer expires, the electronic device 101 may refrain from the operation for changing the BWP even when an event is detected. The electronic device 101 may identify over-temperature after the BWP switching timer expires in operation 2529. In operation 2531, the electronic device 101 may transmit an UEAssistanceInformation message to the network 600. Referring to the information 2531a of the UEAssistanceInformation message, the BWP-Preference may be included in the IEs of the UEAssistanceInformation, and the BWP-Preference may include identification information (BWP-Id-FR1) about the BWP in FR1 having a value of "1." The network 600 may identify the first BWP or fourth BWP based on the information 2531a of the UEAssistanceInformation message. However, the network 600 may identify that the first BWP may not be currently allocated to the electronic device 101. In operation 2535, the network 600 may identify that it is impossible to use the first BWP and may identify the fourth BWP for the electronic device 101. In operation 2537, the network 600 may transmit the DCI (e.g., DCI 0_1 or DCI 4_1) indicating use of the fourth BWP to the electronic device 101. In operation 2539, the electronic device 101 may perform communication with the network 600 using the fourth BWP identified based on the DCI. In operation 2541, the electronic device 101 may identify a BWP configuration. If there is a BWP having a relatively longer monitoring period than the fourth BWP, e.g., as in the first case 2550, the electronic device 101 may transmit a UEAssistanceInformation message including the identification information about the BWP to the network 600 in operation 2551. If there is no BWP having a relatively longer monitoring period than the fourth BWP, e.g., as in the second case 2560, the electronic device 101 may identify that it is impossible to change the BWP in operation 2561.

According to various example embodiments, an electronic device (e.g., electronic device 101) may comprise at least one processor (e.g., at least one of the processor 120, the first communication processor 212, the second communication processor 214, or the integrated communication processor 260). The at least one processor may be configured to: receive, from a network, a radio resource control (RRC) reconfiguration message including information about at least one bandwidth part (BWP) available to the electronic device, control the electronic device to perform communication with the network using a first BWP among the at least one BWP, control the electronic device to transmit, to the network, a message requesting to change a BWP being used by the electronic device, based on identifying an event set for a change in BWP, receive, from the network, a downlink control indicator (DCI) indicating a change from the first BWP to a second BWP included in the at least one BWP, and control the electronic device to perform communication with the network using the second BWP, based on the reception of the DCI.

According to various example embodiments, the at least one processor may be configured to control the electronic device, as at least part of transmitting, to the network, the message requesting to change the BWP being used by the electronic device, based on identifying the event, based on a number of the at least one BWP available to the electronic device being more than one, transmit, to the network, the message requesting to change the BWP being used by the electronic device, based on identifying the event.

According to various example embodiments, the at least one processor may be further configured to, based on the number of the at least one BWP available to the electronic device being one, control the electronic device to refrain from transmitting the message requesting to change the BWP being used by the electronic device although the event is identified.

According to various example embodiments, the at least one processor may be configured to, based on the number of the at least one BWP available to the electronic device being one, request the network to perform an RRC reconfiguration for changing a BWP configuration, based on identifying the event.

According to various example embodiments, the at least one processor may be further configured to identify a temperature of the electronic device and identify the identified temperature being a threshold temperature or more, as the event.

According to various example embodiments, the at least one processor may be further configured to identify a remaining battery level of the electronic device and identify the remaining battery level being a threshold level or less, as the event.

According to various example embodiments, the at least one processor may be further configured to execute a first application and identify the first application corresponding to a designated type, as the event.

According to various example embodiments, the at least one processor may be further configured to establish a protocol data unit (PDU) session with the network and identify the PDU session corresponding to a designated type, as the event.

According to various example embodiments, the at least one processor may be further configured to identify an occurrence of traffic and identify information associated with the traffic meeting a designated condition, as the event.

According to various example embodiments, the at least one processor may be further configured to: identify a release of the event, control the electronic device to transmit, to the network, another message requesting to change to the first BWP, based on the release of the event, receive, from the network, another DCI indicating the change to the first BWP, and control the electronic device to perform communication to the network using the first BWP, based on the reception of the other DCI.

According to various example embodiments, the at least one processor may be configured to, as at least part of transmitting, to the network, the other message requesting to change to the first BWP, based on the release of the event, start a timer, based on the release of the event, and control the electronic device to transmit, to the network, the other message requesting to change to the first BWP, based on a failure to redetect the event until before the timer expires.

According to various example embodiments, at least one of a bandwidth, a monitoring period for a physical downlink control channel (PDCCH), and/or a center frequency of the first BWP respectively may differ from at least one of a bandwidth, a monitoring period for a PDCCH, and/or a center frequency of the second BWP.

According to various example embodiments, the at least one processor may be configured to, as at least part of transmitting, to the network, the message requesting to change the BWP being used by the electronic device, based on identifying the event, repeat the transmission of the message including information corresponding to the event, a designated number of times.

According to various example embodiments, the message may include a UEAssistanceInformation message, and the information may be a designated value of at least one information element defined for the UEAssistanceInformation message mapped to the event.

According to various example embodiments, the at least one processor may be further configured to identify a release of the event, control the electronic device to transmit, to the network, another message requesting to change to the first BWP, based on the release of the event, receive, from the network, another DCI indicating the change to the first BWP, and control the electronic device to perform communication to the network using the first BWP, based on the reception of the other DCI. The other message may be another UEAssistanceInformation message, and the other UEAssistanceInformation message may not include the information element.

According to various example embodiments, the at least one processor may be configured to, as at least part of transmitting, to the network, the message requesting to change the BWP being used by the electronic device, based on identifying the event, identify the second BWP corresponding to the event, and control the electronic device to transmit the message including identification information about the second BWP to the network.

According to various example embodiments, the message may be a UEAssistanceInformation message, and the information may be an information element including the identification information about the second BWP.

According to various example embodiments, the at least one processor may be further configured to identify a release of the event, control the electronic device to transmit, to the network, another message requesting to change to the first BWP, based on the release of the event, receive, from the network, another DCI indicating the change to the first BWP, and control the electronic device to perform communication to the network using the first BWP, based on the reception of the other DCI. The other message may be another UEAssistanceInformation message, and the other UEAssistanceInformation message may not include the information element or includes an information element including identification information about the first BWP.

According to various example embodiments, a method for operating an electronic device may comprise: receiving, from a network, a radio resource control (RRC) reconfiguration message including information about at least one bandwidth part (BWP) available to the electronic device, performing communication with the network using a first BWP among the at least one BWP, transmitting, to the network, a message requesting to change a BWP being used by the electronic device, based on identifying an event set for a change in BWP, receiving, from the network, a downlink control indicator (DCI) indicating a change from the first BWP to a second BWP included in the at least one BWP, and performing communication with the network using the second BWP, based on the reception of the DCI.

According to various example embodiments, a method for operating a network may comprise: transmitting, to an electronic device, a radio resource control (RRC) reconfiguration message including information about at least one bandwidth part (BWP) available to the electronic device, performing communication with the electronic device using a first BWP among the at least one BWP, receiving, from the electronic device, a message requesting to change a BWP being used by the electronic device, based on identifying an event set for a change in BWP, transmitting, to the electronic device, a downlink control indicator (DCI) indicating a change from the first BWP to a second BWP included in the at least one BWP, and performing communication with the electronic device using the second BWP.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
at least one processor comprising processing circuitry, wherein the at least one processor is configured to:
receive, from a network, a radio resource control (RRC) reconfiguration message including information about at least one bandwidth part (BWP) available to the electronic device,
perform communication with the network using a first BWP among the at least one BWP,
based on a number of the at least one BWP available to the electronic device being more than one, control the electronic device to transmit, to the network, a message requesting to change a BWP being used by the electronic device, based on identifying an event being set for a BWP change,
based on the number of the at least one BWP available to the electronic device being one, control the electronic device to refrain from transmitting the message requesting to change the BWP being used by the electronic device although the event is identified,
receive, from the network in response to the message, a downlink control indicator (DCI) indicating a change from the first BWP to a second BWP included in the at least one BWP, and
control the electronic device to perform communication with the network using the second BWP, based on the reception of the DCI.

2. The electronic device of claim 1, wherein the at least one processor is configured to, based on the number of the at least one BWP available to the electronic device being one, request the network to perform an RRC reconfiguration for changing a BWP configuration, based on identifying the event.

3. The electronic device of claim 1, wherein the at least one processor is further configured to:
identify a temperature of the electronic device, and
identify the identified temperature being a threshold temperature or more, as the event.

4. The electronic device of claim 1, wherein the at least one processor is further configured to:
identify a remaining battery level of the electronic device, and
identify the remaining battery level being a threshold level or less, as the event.

5. The electronic device of claim 1, wherein the at least one processor is further configured to:
execute a first application, and
identify the first application corresponding to a designated type, as the event.

6. The electronic device of claim 1, wherein the at least one processor is further configured to:
establish a protocol data unit (PDU) session with the network, and
identify the PDU session corresponding to a designated type, as the event.

7. The electronic device of claim 1, wherein the at least one processor is further configured to:
identify an occurrence of traffic, and
identify information associated with the traffic meeting a designated condition, as the event.

8. The electronic device of claim 1, wherein the at least one processor is further configured to:
identify a release of the event,
control the electronic device to transmit, to the network, another message requesting to change to the first BWP, based on the release of the event,
receive, from the network, another DCI indicating the change to the first BWP, and
control the electronic device to perform communication to the network using the first BWP, based on the reception of the other DCI.

9. The electronic device of claim 8, wherein the at least one processor is configured, as at least part of transmitting; to the network, the another message requesting to change to the first BWP, based on the release of the event, to:

start a timer, based on the release of the event, and
control the electronic device to transmit, to the network, the another message requesting to change to the first BWP, based on a failure to redetect the event until before the timer expires.

10. The electronic device of claim 1, wherein at least one of a bandwidth, a monitoring period for a physical downlink control channel (PDCCH), and/or a center frequency of the first BWP respectively differs from at least one of a bandwidth, a monitoring period for a PDCCH, and/or a center frequency of the second BWP.

11. The electronic device of claim 1, wherein the at least one processor is configured to, as at least part of transmitting, to the network, the message requesting to change the BWP being used by the electronic device, based on identifying the event:
control the electronic device to repeat the transmission of the message including information corresponding to the event, a designated number of times.

12. The electronic device of claim 11, wherein the message includes a UEAssistanceInformation message, and
wherein the information corresponding to the event is a designated value of at least one information element defined for the UEAssistanceInformation message mapped to the event.

13. The electronic device of claim 12, wherein the at least one processor is further configured to:
identify a release of the event,
control the electronic device to transmit, to the network, another message requesting to change to the first BWP, based on the release of the event,
receive, from the network, another DCI indicating the change to the first BWP, and
control the electronic device to perform communication to the network using the first BWP, based on the reception of the another DCI,
wherein the another message is another UEAssistanceInformation message, and
the another UEAssistanceInformation message does not include the information element.

14. The electronic device of claim 1, wherein the at least one processor is configured, as at least part of transmitting, to the network, the message requesting to change the BWP being used by the electronic device, based on identifying the event, to:
identify the second BWP corresponding to the event, and
control the electronic device to transmit, to the network, a message including identification information about the second BWP.

15. The electronic device of claim 14, wherein the message includes a UEAssistanceInformation message, and
wherein the information about the at least one BWP is an information element including the identification information about the second BWP.

16. The electronic device of claim 14, wherein the at least one processor is further configured to:
identify a release of the event,
control the electronic device to transmit, to the network, another message requesting to change to the first BWP, based on the release of the event,
receive, from the network, another DCI indicating the change to the first BWP, and
control the electronic device to perform communication to the network using the first BWP, based on the reception of the other DCI,
wherein the another message is another UEAssistanceInformation message, and
wherein the another UEAssistanceInformation message does not include the information element or includes an information element including identification information about the first BWP.

17. A method for operating an electronic device, the method comprising,
receiving, from a network, a radio resource control (RRC) reconfiguration message including information about at least one bandwidth part (BWP) available to the electronic device,
performing communication with the network using a first BWP among the at least one BWP,
based on a number of the at least one BWP available to the electronic device being more than one, transmitting, to the network, a message requesting to change a BWP being used by the electronic device, based on identifying an event set for a change in BWP,
based on the number of the at least one BWP available to the electronic device being one, refraining from transmitting the message requesting to change the BWP being used by the electronic device although the event is identified,
receiving, from the network in response to the message, a downlink control indicator (DCI) indicating a change from the first BWP to a second BWP included in the at least one BWP, and
performing communication with the network using the second BWP, based on the reception of the DCI.

18. A method for operating a network, the method comprising,
transmitting, to an electronic device, a radio resource control (RRC) reconfiguration message including information about at least one bandwidth part (BWP) available to the electronic device,
performing communication with the electronic device using a first BWP among the at least one BWP,
receiving, from the electronic device, a message requesting to change a BWP being used by the electronic device, based on identifying an event being set for a BWP change,
upon receiving the message, transmitting, to the electronic device, a downlink control indicator (DCI) indicating a change from the first BWP to a second BWP included in the at least one BWP, and
performing communication with the electronic device using the second BWP.

* * * * *